US012777486B2

(12) United States Patent
Yi et al.

(10) Patent No.: US 12,777,486 B2
(45) Date of Patent: Oct. 27, 2026

(54) PUCCH SCell CONFIGURATION IN MULTI-TRP SCENARIO

(71) Applicant: Ofinno, LLC, Reston, VA (US)

(72) Inventors: Yunjung Yi, Vienna, VA (US); Esmael Dinan, McLean, VA (US); Hua Zhou, Herndon, VA (US); Ali Cagatay Cirik, Herndon, VA (US); Hyoungsuk Jeon, Centreville, VA (US); Kyungmin Park, Vienna, VA (US); Kai Xu, Herndon, VA (US); Youngwoo Kwak, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 181 days.

(21) Appl. No.: 16/992,154

(22) Filed: Aug. 13, 2020

(65) Prior Publication Data

US 2021/0051650 A1 Feb. 18, 2021

Related U.S. Application Data

(60) Provisional application No. 62/886,911, filed on Aug. 14, 2019.

(51) Int. Cl.
*H04W 72/21* (2023.01)
*H04L 1/1812* (2023.01)

(52) U.S. Cl.
CPC ........... *H04W 72/21* (2023.01); *H04L 1/1812* (2013.01)

(58) Field of Classification Search
CPC ......................... H04L 1/1812; H04W 72/0413
See application file for complete search history.

(56) References Cited

U.S. PATENT DOCUMENTS 11,569,951 B2 * 1/2023 Yi ........................... H04L 5/001
2013/0308550 A1 * 11/2013 Yin ....................... H04L 1/1861 370/329

(Continued)

FOREIGN PATENT DOCUMENTS

CA 3079375 A1 * 5/2019 ........... H04L 1/1812

OTHER PUBLICATIONS

"3GPP TSG-RAN2 Meeting #105bis R2-1904756; Xi'an, China, Apr. 8-12, 2019; CR-Form-v11.4 Change Request".

(Continued)

*Primary Examiner* — Noel R Beharry
*Assistant Examiner* — Rodrick Mak
(74) *Attorney, Agent, or Firm* — Patrick Moon; Kavon Nasabzadeh; Jacob L. Mangan

(57) ABSTRACT

A wireless device receives one or more radio resource control messages. The one or more radio resource control messages indicating: a first control resource set (coreset) group; a second coreset group; a first physical uplink control channel (PUCCH) cell associated with a first index indicating the first coreset group; and a second PUCCH cell associated with a second index indicating the second coreset group. one or more transport blocks are received. A determination is made of a PUCCH cell for transmitting hybrid automatic repeat request (HARQ) feedback of the one or more transport blocks. The determining comprises: determining the first PUCCH cell in response to the one or more transport blocks being scheduled via the first coreset group; and determining the second PUCCH cell in response to the one or more transport blocks being scheduled via the second coreset group. The HARQ feedback is transmitted via the determined PUCCH cell.

20 Claims, 30 Drawing Sheets

(56) References Cited

U.S. PATENT DOCUMENTS

| | | | | |
|---|---|---|---|---|
| 2017/0208582 | A1* | 7/2017 | Liang | H04L 5/0055 |
| 2017/0289993 | A1* | 10/2017 | Yerramalli | H04L 1/1864 |
| 2018/0063830 | A1* | 3/2018 | Lee | H04L 1/1812 |
| 2018/0098266 | A1* | 4/2018 | Futaki | H04W 76/15 |
| 2018/0212742 | A1* | 7/2018 | Takeda | H04L 5/0057 |
| 2019/0215871 | A1* | 7/2019 | Aiba | H04W 48/16 |
| 2020/0305168 | A1* | 9/2020 | Liou | H04W 76/11 |
| 2020/0314860 | A1* | 10/2020 | Zhou | H04W 72/1289 |
| 2020/0337077 | A1* | 10/2020 | Yoshimura | H04L 1/1864 |
| 2020/0350972 | A1* | 11/2020 | Yi | H04L 1/12 |
| 2020/0413409 | A1* | 12/2020 | Zhou | H04W 72/0493 |
| 2021/0022124 | A1* | 1/2021 | Miao | H04W 72/04 |
| 2021/0022167 | A1* | 1/2021 | Khoshnevisan | H04W 72/23 |
| 2021/0058113 | A1* | 2/2021 | Jung | H04W 72/23 |
| 2022/0104228 | A1* | 3/2022 | Ling | H04L 5/0055 |
| 2022/0150926 | A1* | 5/2022 | Mondal | H04W 72/044 |
| 2022/0158775 | A1* | 5/2022 | Xiong | H04L 1/1864 |
| 2022/0256573 | A1* | 8/2022 | Frenne | H04L 5/0053 |
| 2022/0287030 | A1* | 9/2022 | Ling | H04L 5/0055 |
| 2022/0321303 | A1* | 10/2022 | Matsumura | H04L 5/0053 |
| 2022/0330163 | A1* | 10/2022 | Liu | H04W 52/146 |
| 2025/0105983 | A1* | 3/2025 | Liu | H04L 1/1864 |

OTHER PUBLICATIONS

3GPP TS 38.211 V15.4.0 (Dec. 2018); Technical Specification; 3rd Generation Partnership Project; Technical Specification Group Radio Access Network; NR; Physical channels and modulation; (Release 15).

"3GPP TS 38.213 V15.5.0 (Mar. 2019); Technical Specification; 3rd Generation Partnership Project; Technical Specification Group Radio Access Network; NR;Physical layer procedures for control (Release 15); //".

3GPP TS 38.214 V15.5.0 (Mar. 2019); Technical Specification; 3rd Generation Partnership Project; Technical Specification Group Radio Access Network; NR; Physical layer procedures for data; (Release 15).

3GPP TS 38.300 V15.6.0 (Jun. 2019); Technical Specification; 3rd Generation Partnership Project; Technical Specification Group Radio Access Network; NR; NR and NG-RAN Overall Description; Stage 2; (Release 15).

"3GPP TSG RAN WG1 Meeting #97 R1-1906816; Reno, USA, May 13-17, 2019; Source: Intel Corporation Title: On Beam Management Enhancement Agenda item: 7.2.8.3; Document for: Discussion and Decision".

"R1-1810104; 3GPP TSG RAN WG1 Meeting #94bis; Chengdu, China, Oct. 8-12, 2018; ; Agenda Item:7.2.8.2; Source:Huawei, HiSilicon; Title: Enhancements on multi-TRP/panel transmission".

"R1-1810221 Enhancements on multi-beam operation; 3GPP TSG RAN WG1 Meeting #94bis ; Chengdu, China, Oct. 8-12, 2018; Source:ZTE; Title: Enhancements on multi-beam operation; Agenda Item: 7.2.8.3; Document for: Discussion and Decision".

"R1-1810402_Discussion on Enhancements on Multi-TRP Panel transmissions; 3GPP TSG RAN WG1 #94b; Chengdu, China, Oct. 8-Oct. 12, 2018; ; Source:vivo; Title:Discussion on Enhancements on Multi-TRP/Panel Transmission; Agenda Item:7.2.8.2".

"R1-1810682 Overview of Multi-TRP_Panel Enhancements; 3GPP TSG RAN WG1 Meeting #94bis; Chengdu, China, Oct. 8-12, 2018 ; ; Agenda item:7.2.8.2; Source: AT&T ; Title: Overview of Multi-TRP/Panel Enhancements".

"R1-1811277 Multi-TRP Enhancements; 3GPP TSG-RAN WG1 Meeting #94bis; Oct. 8- 12, 2018 ; Chengdu, China; ; Agenda item:7.2.8.2; Source: Qualcomm Incorporated".

"R1-1811348; 3GPP TSG RAN WG1 Meeting #94bis ; Chengdu, China, Oct. 8-12, 2018; ; Source:NTT Docomo, Inc.; Title: Enhancements on multi-TRP/panel transmission ; Agenda Item:7.2.8.2."

"R1-1903104; 3GPP TSG RAN WG1 Meeting #96; Athens, Greece, Feb. 25-Mar. 1, 2019; ; Agenda Item:7.2.8.6; Source:Huawei, HiSilicon; Title: Discussion on RAN2 impacts for NR-MIMO enhancements in Rel-16."

"R1-1906522; 3GPP TSG RAN WG1 #97 ; Reno, USA, May 13-17, 2019; Agenda item:7.2.8.3; Source: CMCC; Title: Enhancements on multi-beam operation; Document for:Discussion and Decision."

"R1-1906731 Multi-beam_final; 3GPP TSG RAN WG1 Meeting #97; Reno, USA, May 13-17, 2019; Agenda item: 7.2.8.3; Source: LG Electronics; Title: Discussion on multi-beam based operations and enhancements; Document for: Discussion and Decision."

"R1-1906887; 3GPP TSG RAN WG1 #97; Reno, USA, May 13-17, 2019; ; Agenda item:7.2.8.3; Source:China Telecom; Title: Enhancements on multi-beam operation."

"R1-1906969 R16 Multi-Beam; 3GPP TSG RAN WG1 97; Reno, USA, May 13-17, 2019; ; Agenda item:7.2.8.3; Source: Samsung; Title: Enhancements on multi-beam operations."

"R1-1907032_Panasonic_NR_MIMO_multi_beam_enhancements_vfinal; 3GPP TSG RAN WG1 #97; Reno, USA, May 13-17, 2019; ; Source: Panasonic; Title: On enhancements for multi-beam operations for NR MIMO in Rel. 16; Agenda Item: 7.2.8.3."

"R1-1907052-UE_MultiBeam; 3GPP TSG RAN WG1 Meeting #97; Reno, USA May 13-17, 2019; ; Agenda Item: 7.2.8.3—Enhancements on Multi-beam Operation; Source: Fraunhofer IIS, Fraunhofer HHI; Title:Enhancements on UE multi-beam operation."

"R1-1907156 Enhancements on Multi-beam Operation; 3GPP TSG RAN WG1 Meeting # 97 ; Reno, Nevada, May 13-May 17, 2019; Agenda Item:7.2.8.3; Source:AT Title:Enhancements on Multi Beam Operation ; Document for: Discussion/Approval."

"R1-1907205; 3GPP TSG RAN WG1 #97; Reno, USA, May 13-17, 2019; ; Agenda Item:7.2.8.3; Source: CAICT; Title:Further discussion on Scell BFR and 1-SINR."

"R1-1907290 Enhancements on Multi-beam Operation; 3GPP TSG-RAN WG1 Meeting #97; Reno, USA, May 13-17, 2019; ; ; Agenda item:7.2.8.3; Source: Qualcomm Incorporated."

"R1-1907317; 3GPP TSG RAN WG1 #97 Meeting; Reno, Nevada, USA, May 13-May 17, 2019; ; Agenda item:7.2.8.3; Source:Nokia, Nokia Shanghai Bell; Title: Enhancements on Multi-beam Operation."

"R1-1907423 On MAC-CE signaling impact of Rel-16 TCI indication framework; 3GPP TSG RAN WG1 Meeting #97; Reno, USA, May 13-17, 2019; ; Source: Ericsson; Title:On MAC-CE signaling impact of Rel-16 TCI indication framework; Agenda Item:7.2.8.5."

"R1-1907475 Signalling reduction for beam-based power control; 3GPP TSG-RAN WG1 Meeting #97Tdoc ; Reno, USA, May 13-May 17, 2019; ; Agenda Item:7.2.8.5; Source: Ericsson; Title:Signalling reduction for beam-based UL power control."

"R1-1907533; 3GPP TSG RAN WG1 Meeting #97 ; Reno, USA, May 13-17, 2019; ; Agenda Item:7.2.8.5; Source:Huawei, HiSilicon; Title:Beam failure recovery for SCell with new beam information."

"R1-1907552; 3GPP TSG RAN WG1 Meeting #97; Reno, USA, May 13-17, 2019; ; Agenda Item:7.2.8.5; Source: Huawei, HiSilicon; Title: UL/DL BM for overhead reduction."

"R1-1907837 Summary of Offline Discussion for M-TRP_v2; Summary of Offline Discussion for M-TRP based MIMO Enhancement M-DCI based NCJT; ; Possible Agreement; For separate ACK/NACK feedback for PDSCHs received from different TRPs, the UE should be able to generate separate ACK/NACK codebooks identified by an index, if the Index is configured and applied across all CCs."

"R2-1907714 Support of multiple beam indication for multiple TRPs; 3GPP TSG-RAN WG2 Meeting #106; Reno, USA, May 13-17, 2019 (Revision of R2-1904729); ; Agenda item: 11.16; Source:Samsung; Title:Support of Multiple Beam Indication for Multiple TRPs."

3GPP TSG-RAN WG2 Meeting #106 R2-1907715; Reno, USA May 3-17, 2019; 38.321 CR 0647; Current version 15.4.0.

* cited by examiner

```
PDSCH-ServingCellConfig ::=          SEQUENCE {
   codeBlockGroupTransmission            SetupRelease { PDSCH-
CodeBlockGroupTransmission }
   xOverhead                          ENUMERATED { xOh6, xOh12, xOh18 }
nrofHARQ-ProcessesForPDSCH           ENUMERATED {n2, n4, n6, n10, n12, n16}
   pucch-Cell                        ServCellIndex          //for TRP1, a first coreset group
   pucch-Cell2                       ServCellIndex          //for TRP2, a second coreset group
   ...,
   [[
   maxMIMO-Layers                    INTEGER (1..8)
   processingType2Enabled               BOOLEAN                              ]]
}
```

FIG. 25

PUCCH SCell CONFIGURATION IN MULTI-TRP SCENARIO

CROSS-REFERENCE TO RELATED APPLICATIONS

This application claims the benefit of U.S. Provisional Application No. 62/886,911, filed Aug. 14, 2019, which is hereby incorporated by reference in its entirety.

BRIEF DESCRIPTION OF THE DRAWINGS

Examples of several of the various embodiments of the present disclosure are described herein with reference to the drawings.

FIG. 25 illustrates an example of radio resource control configuration parameters.

DETAILED DESCRIPTION

Figure 1A:
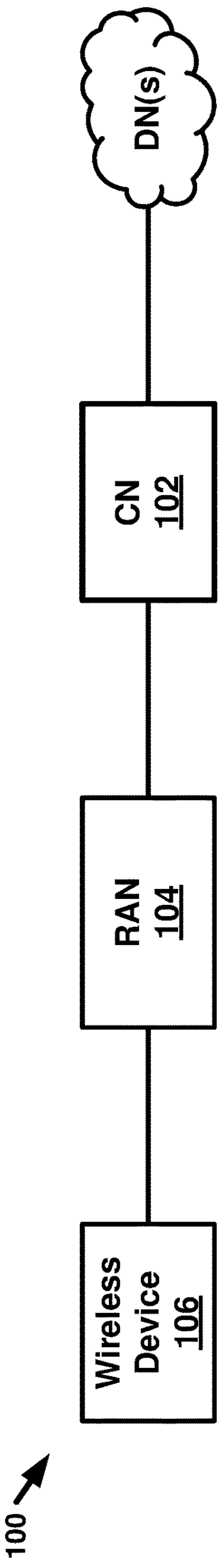
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
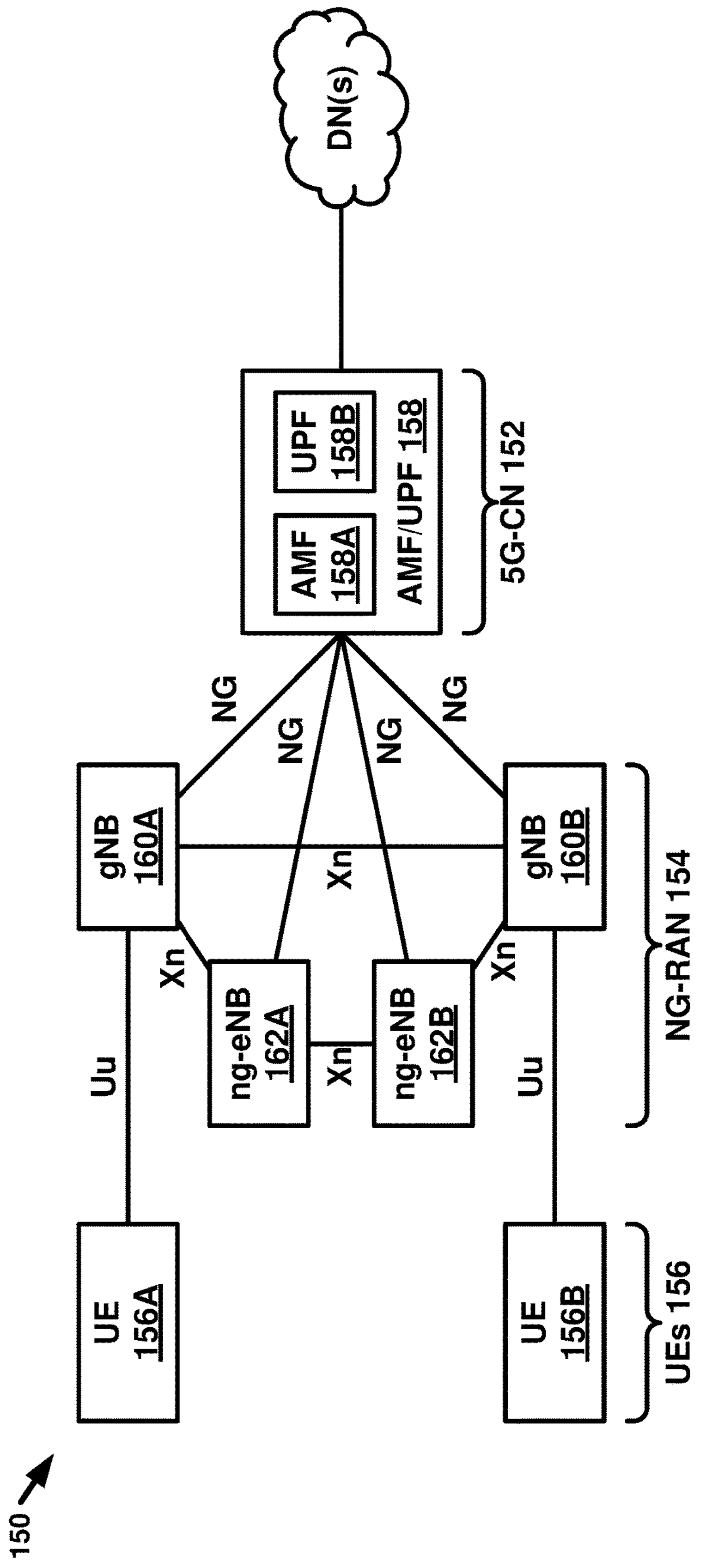

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNB s 160 and ng-eNBs 162 may include one or more sets of antennas for communicating with the UEs 156 over an air interface. For example, one or more of the gNB s 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
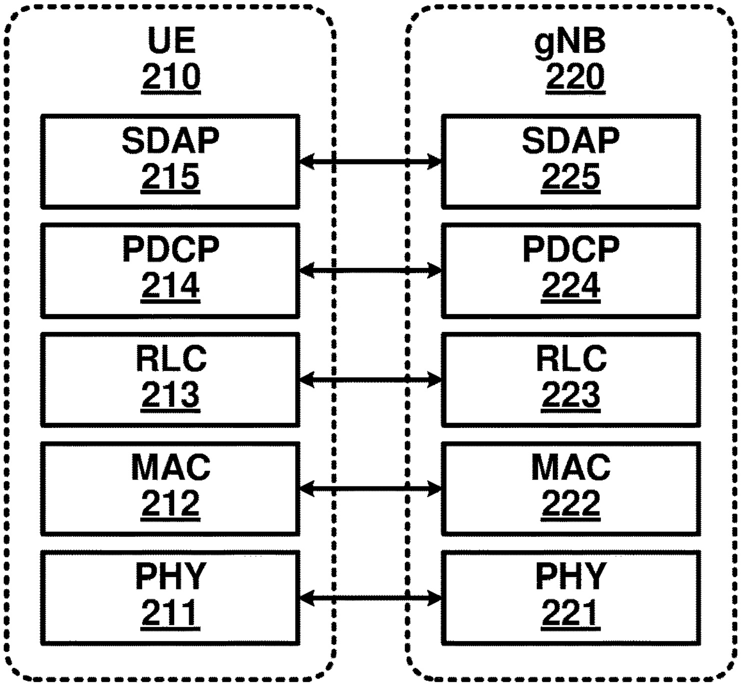
FIG. 2A and FIG. 2B respectively illustrate a New Radio (NR) user plane and control plane protocol stack.
Figure 2B:
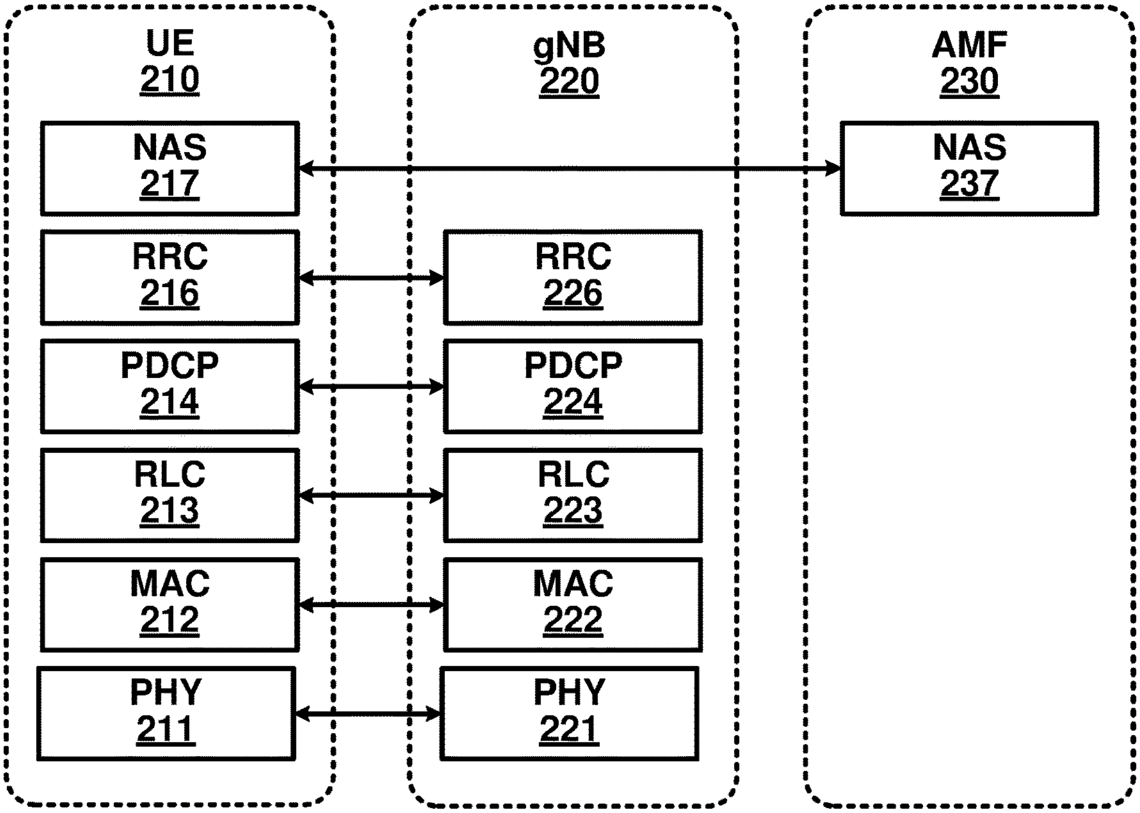

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
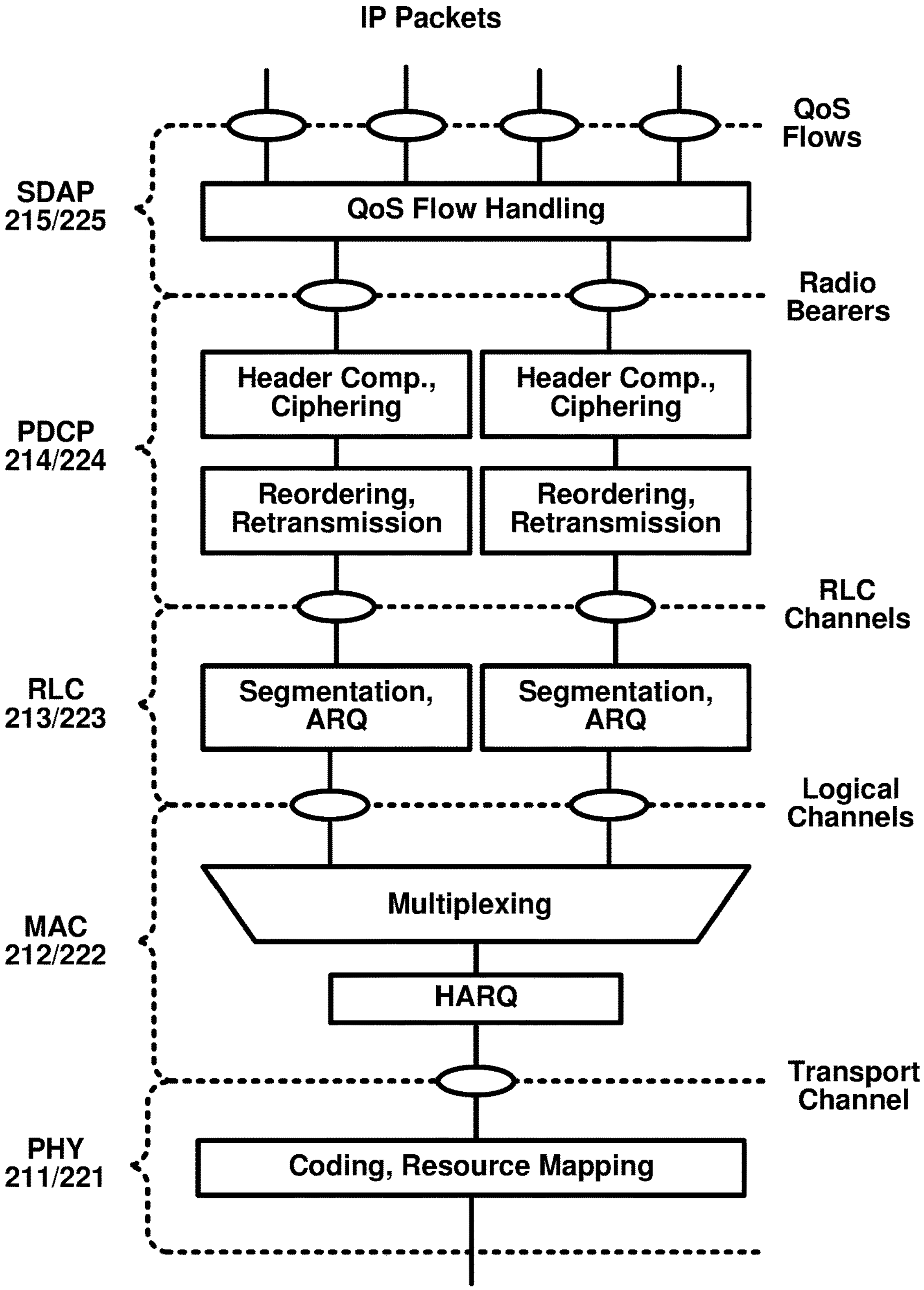
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
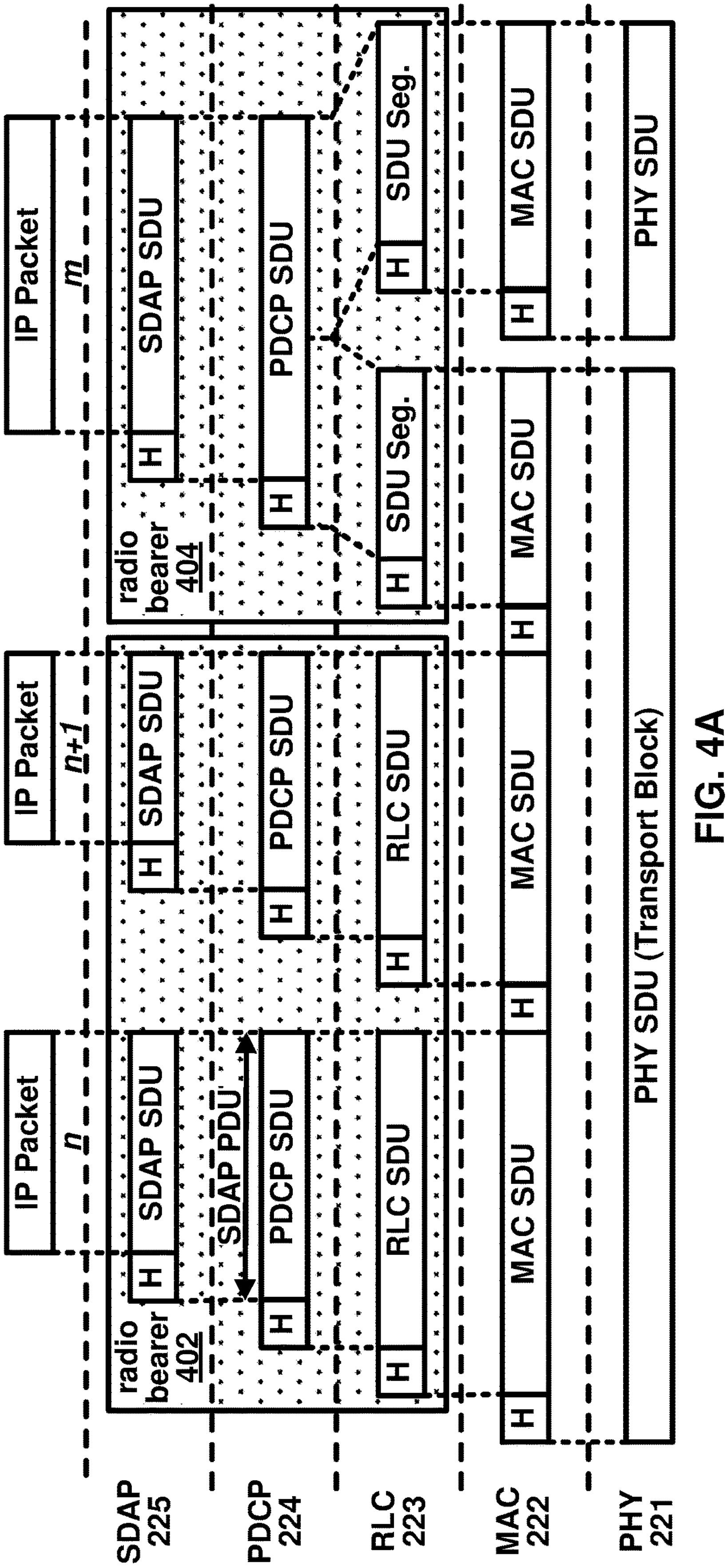
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A.

In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
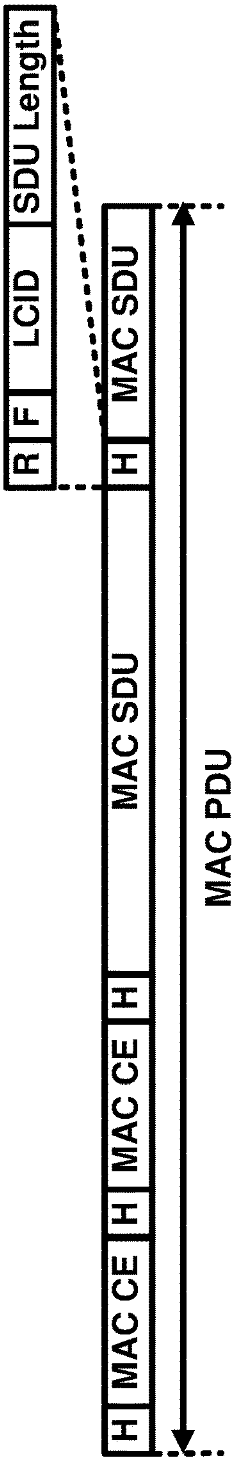
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
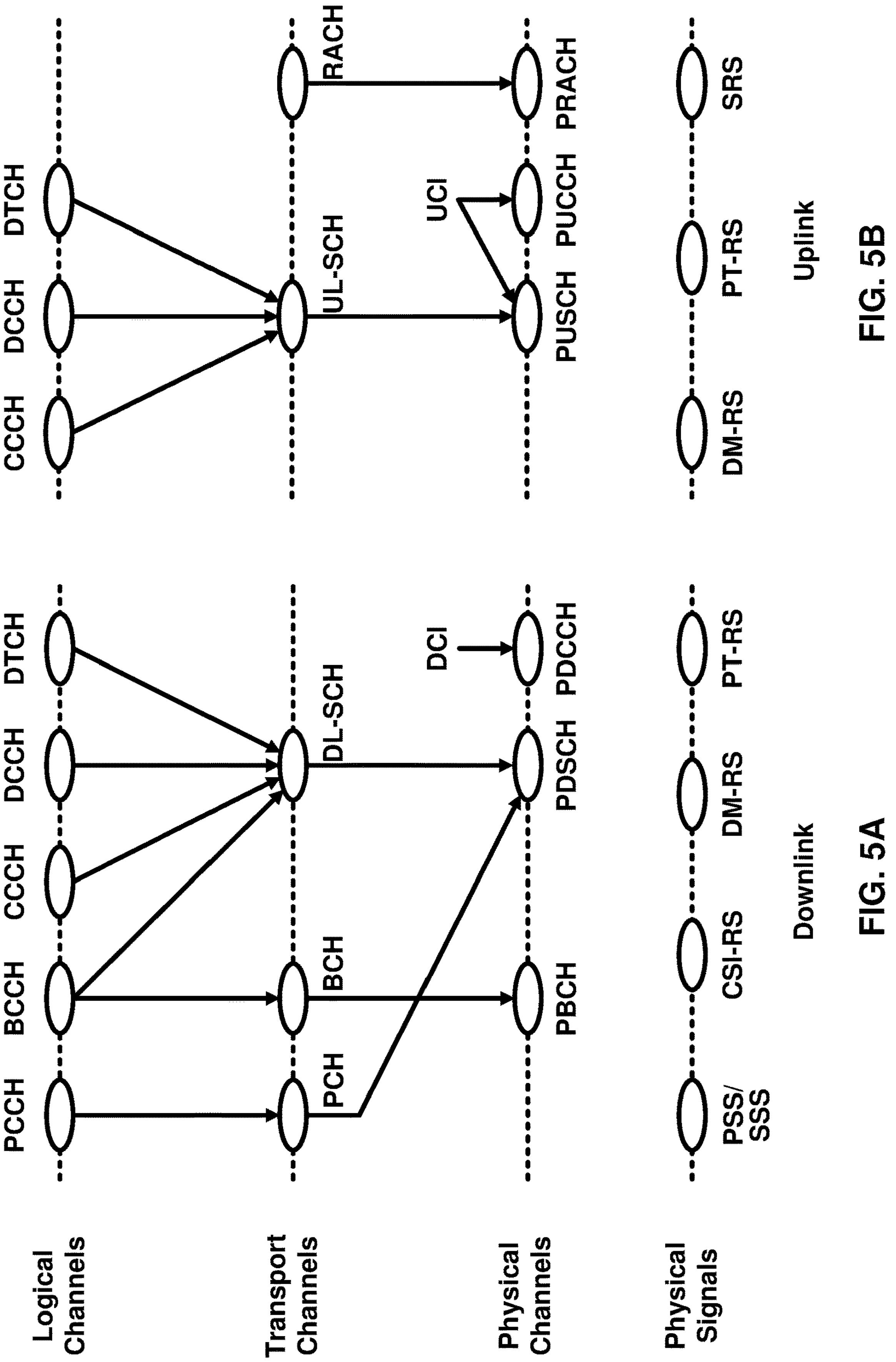
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
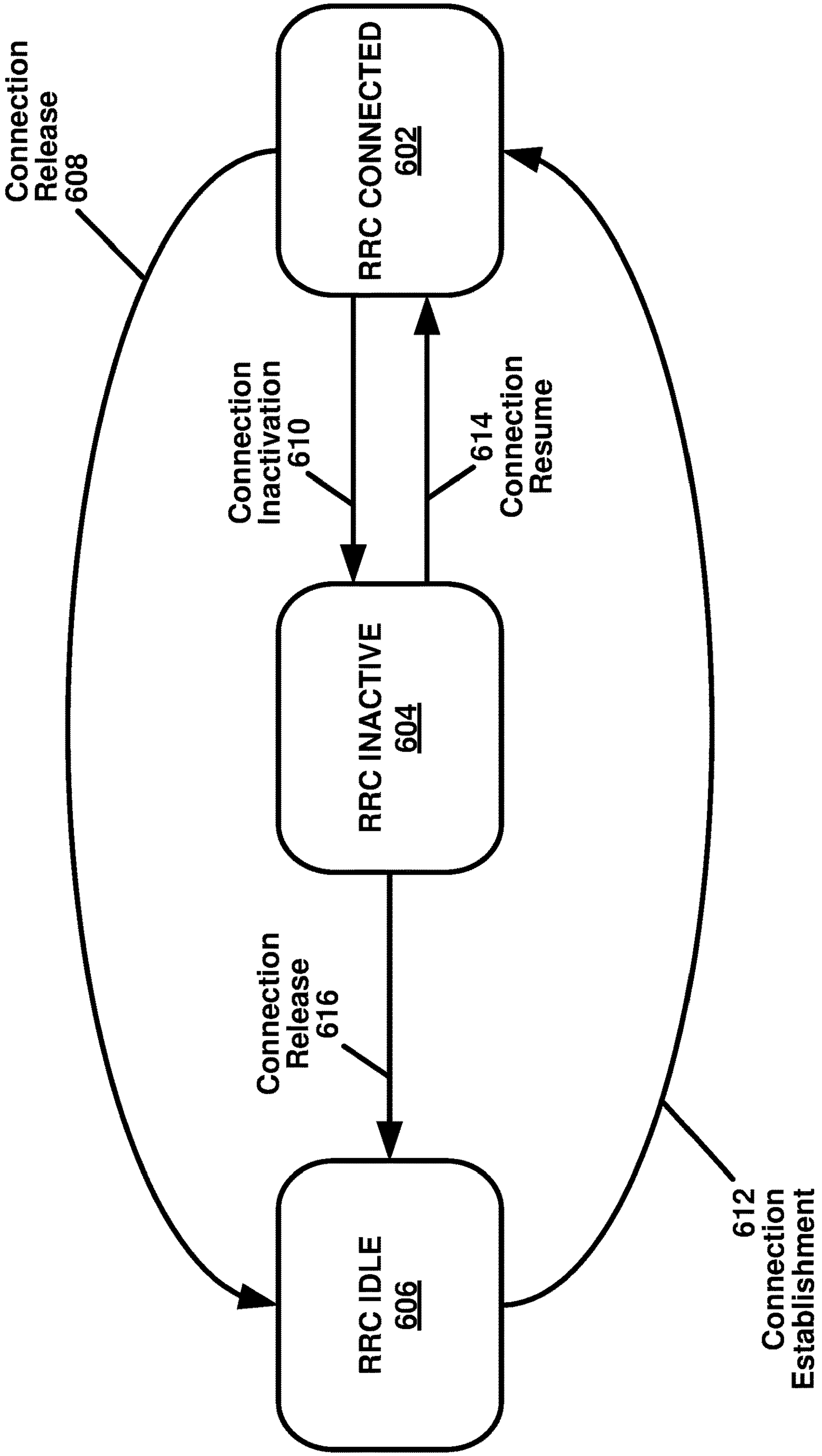
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
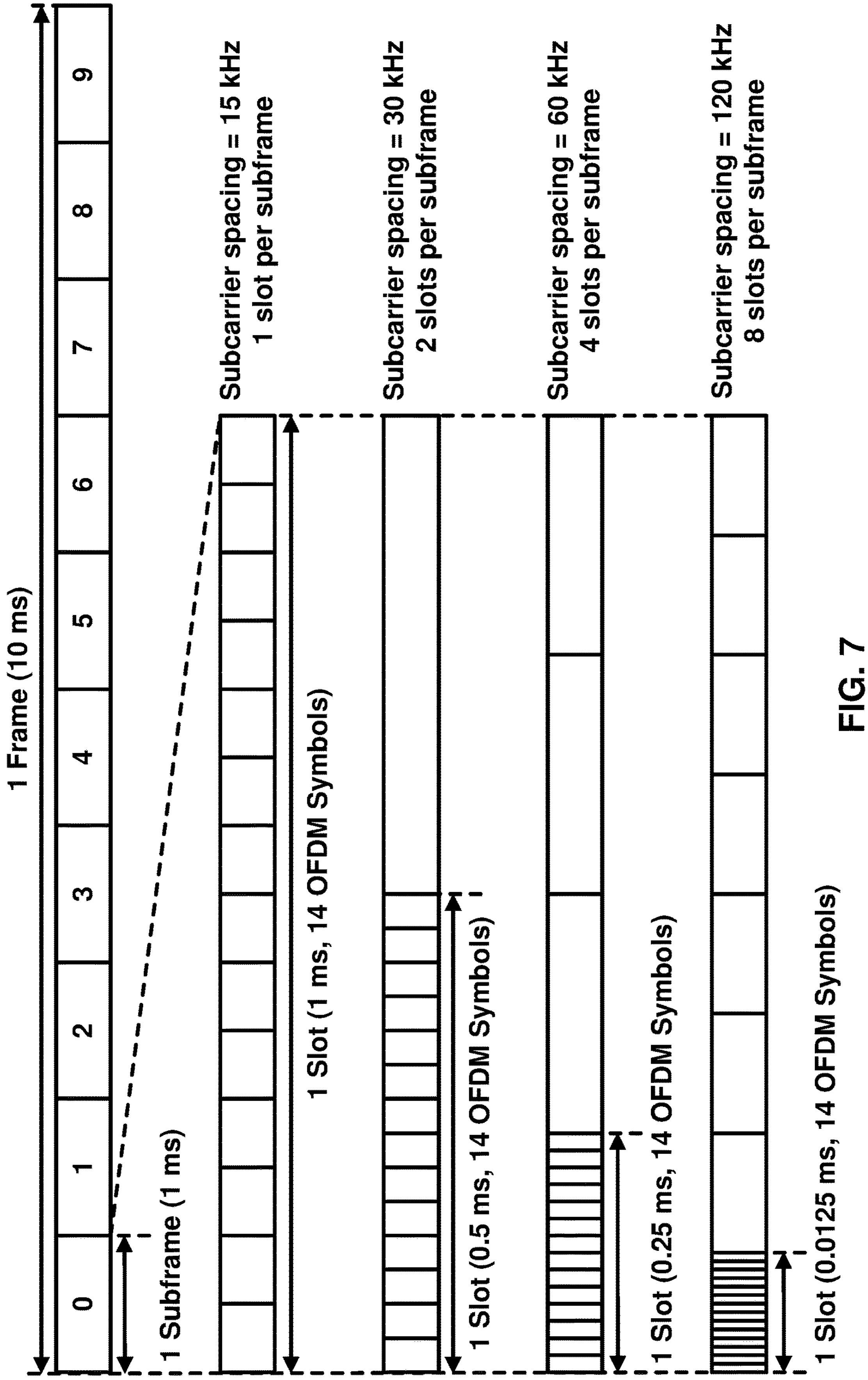
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
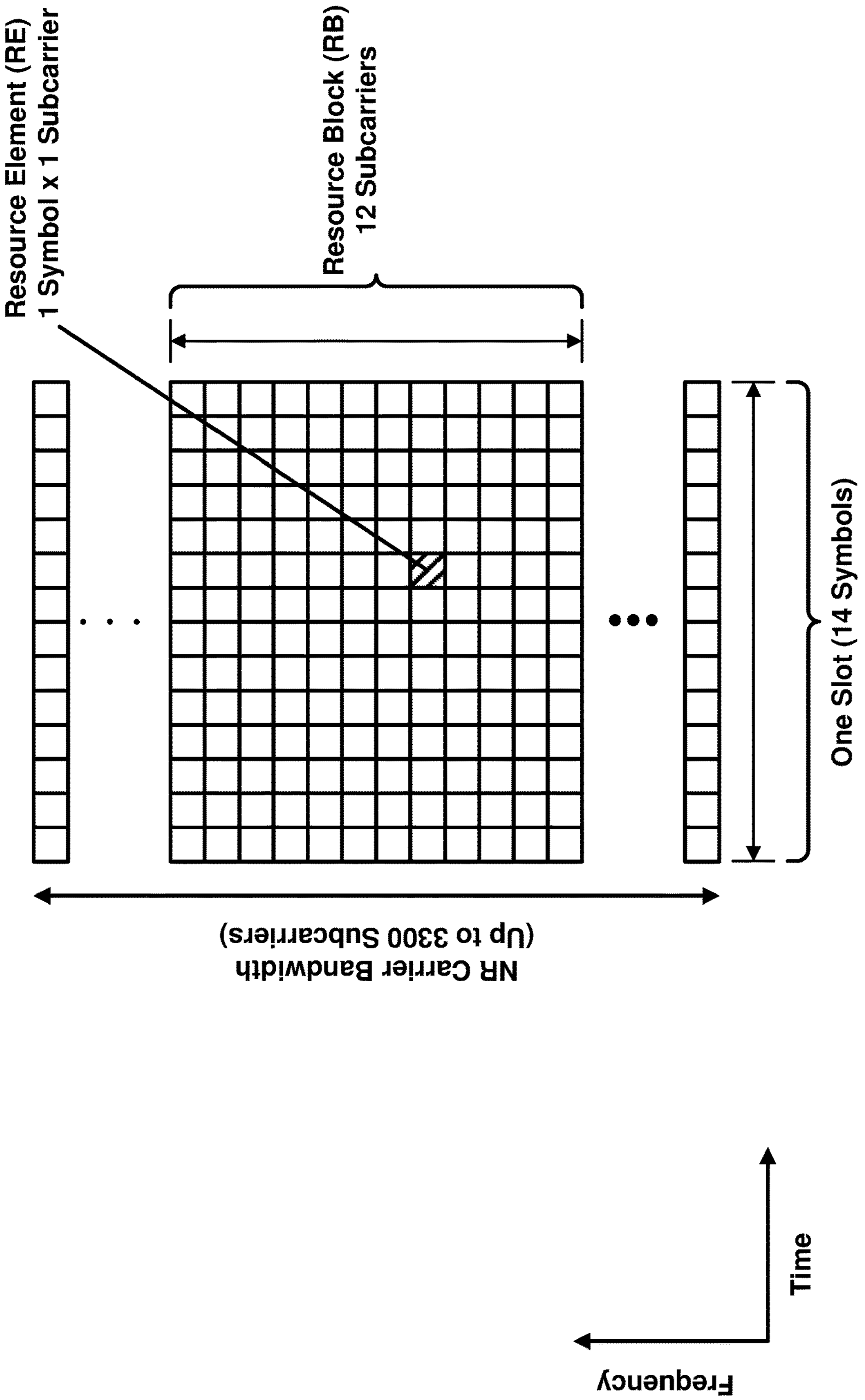
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
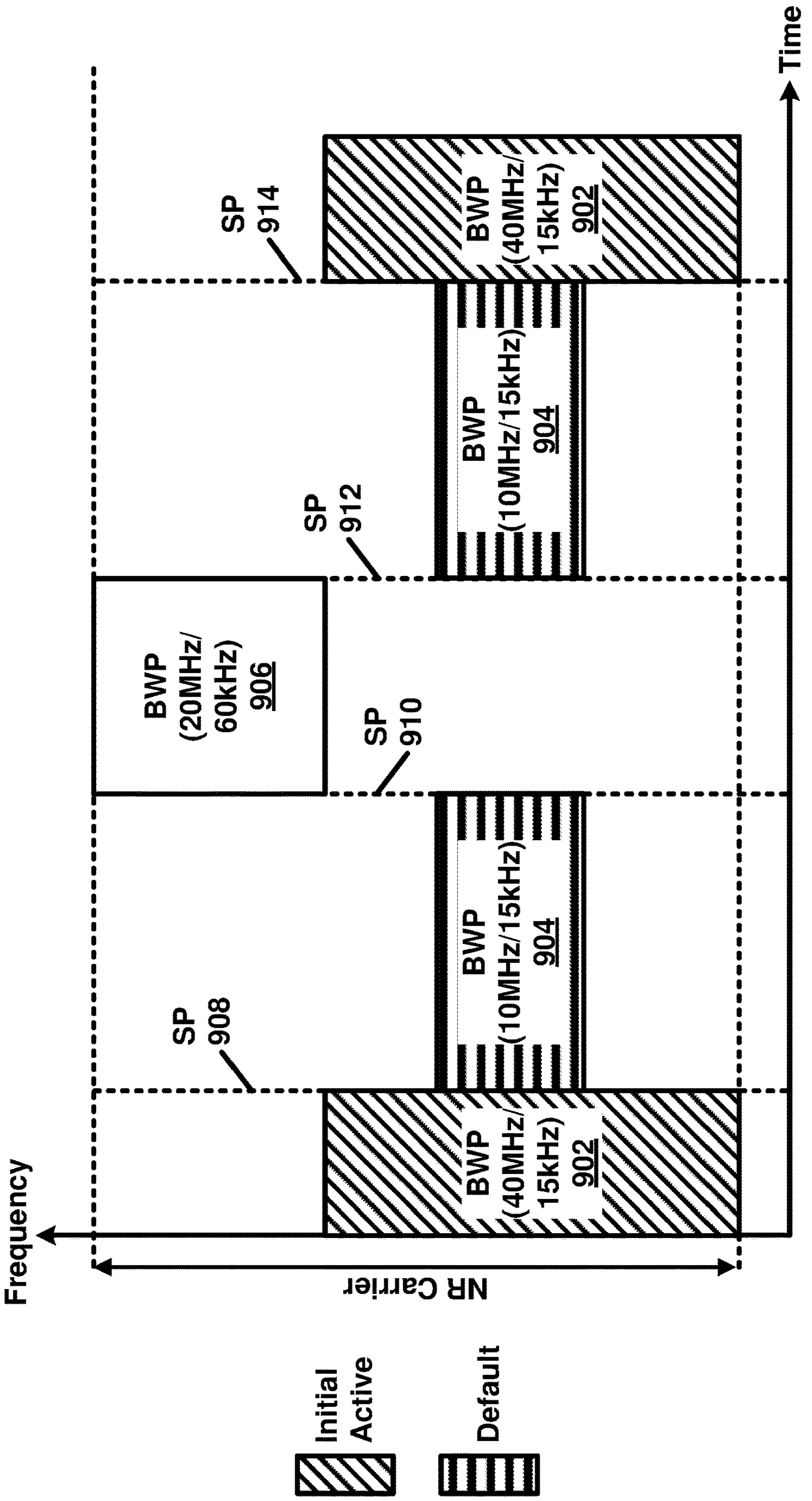
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
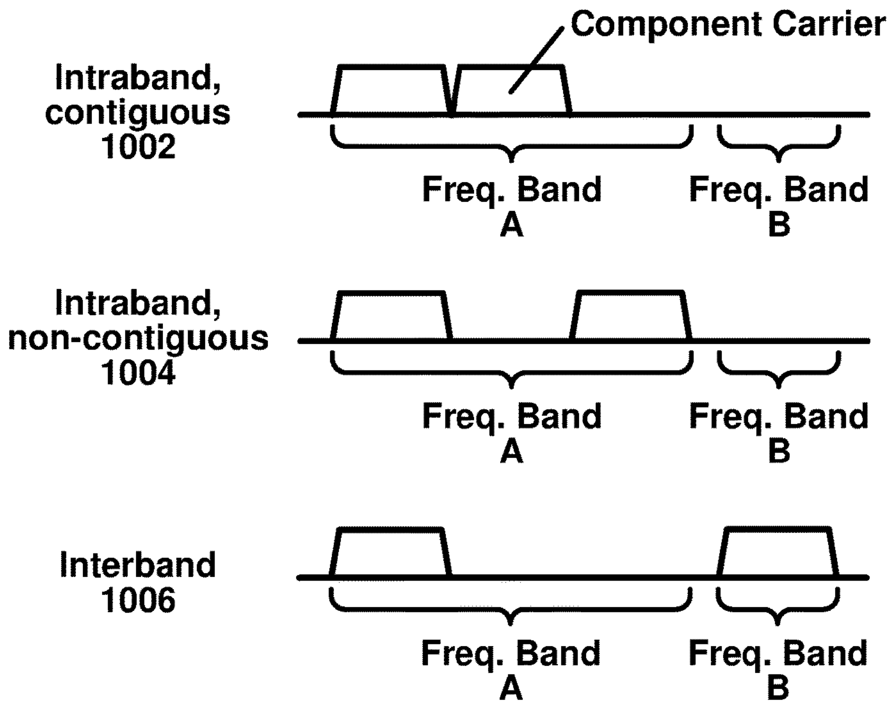
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
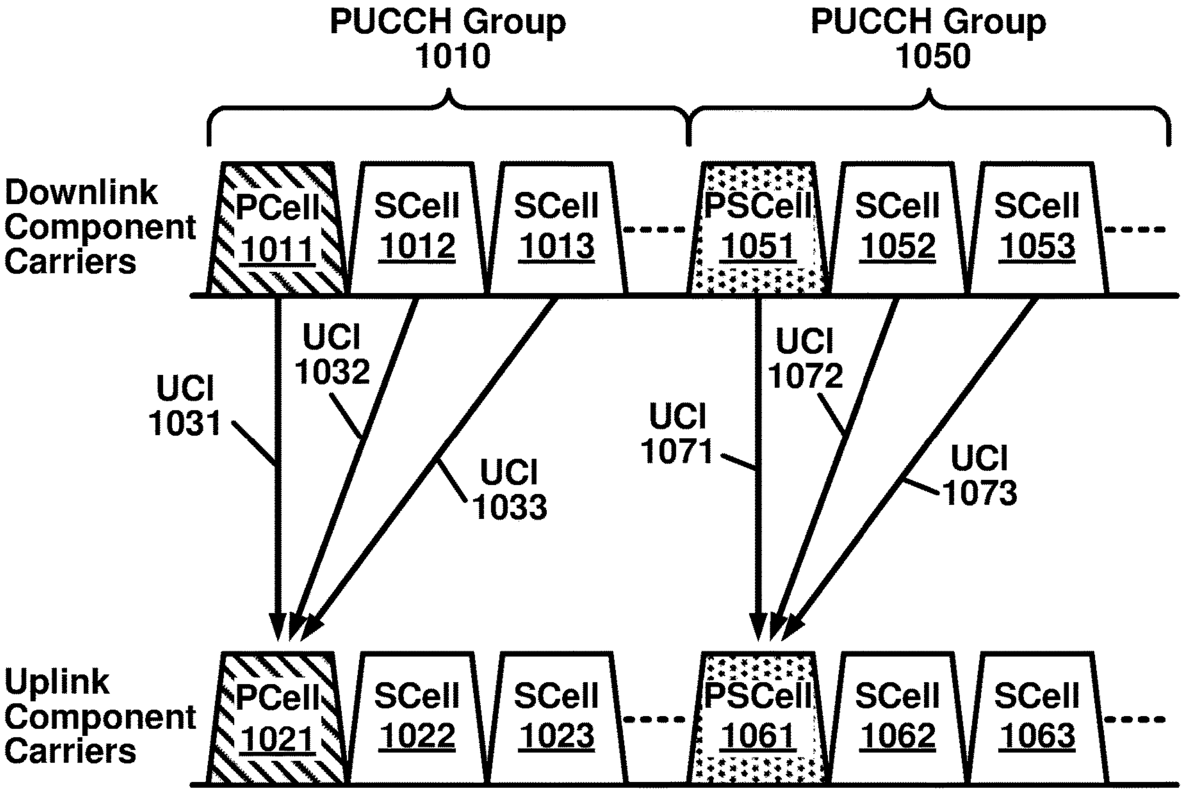
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
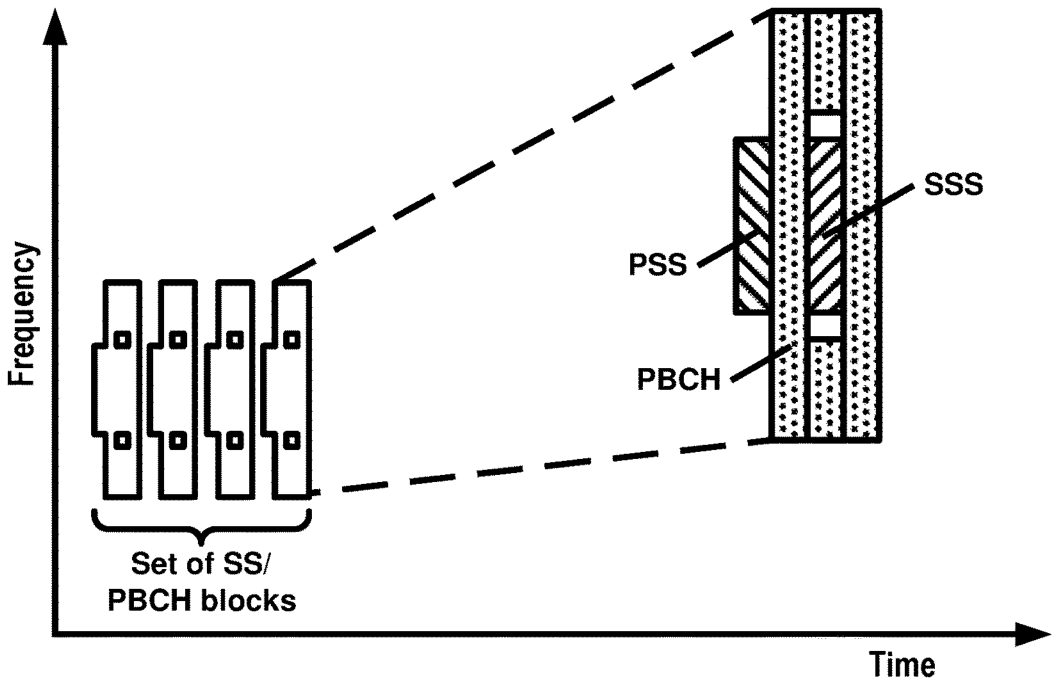
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
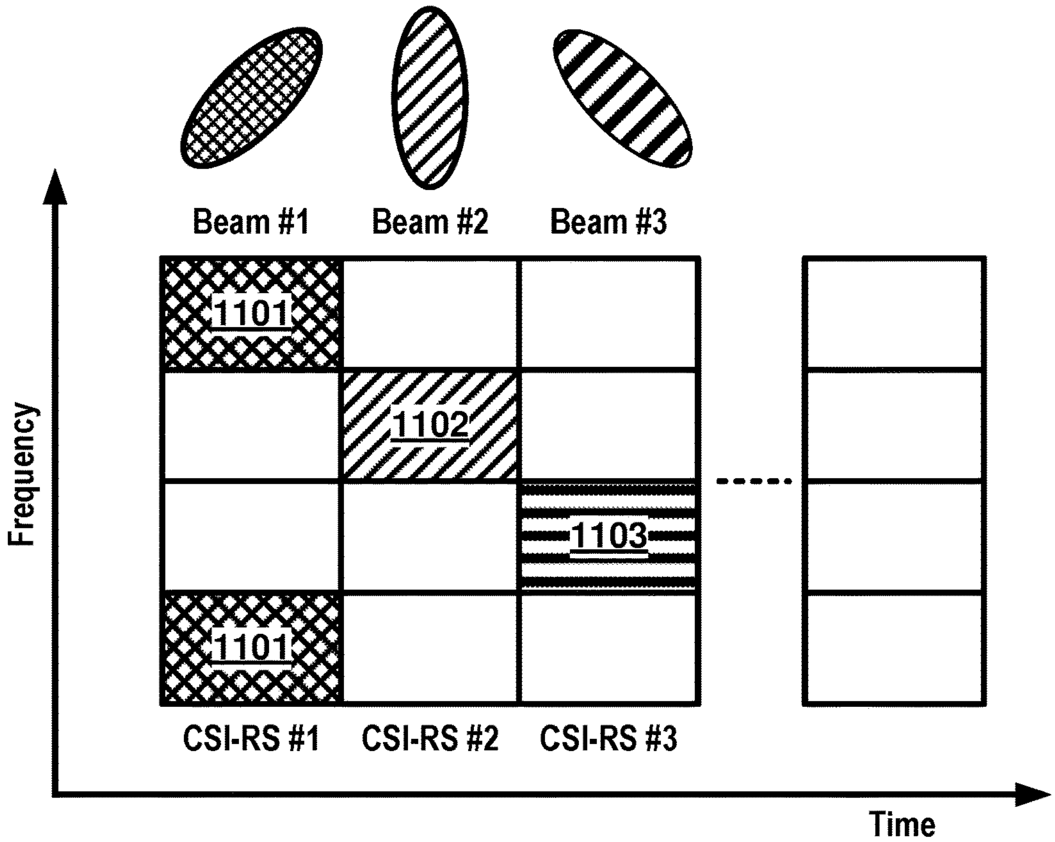
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
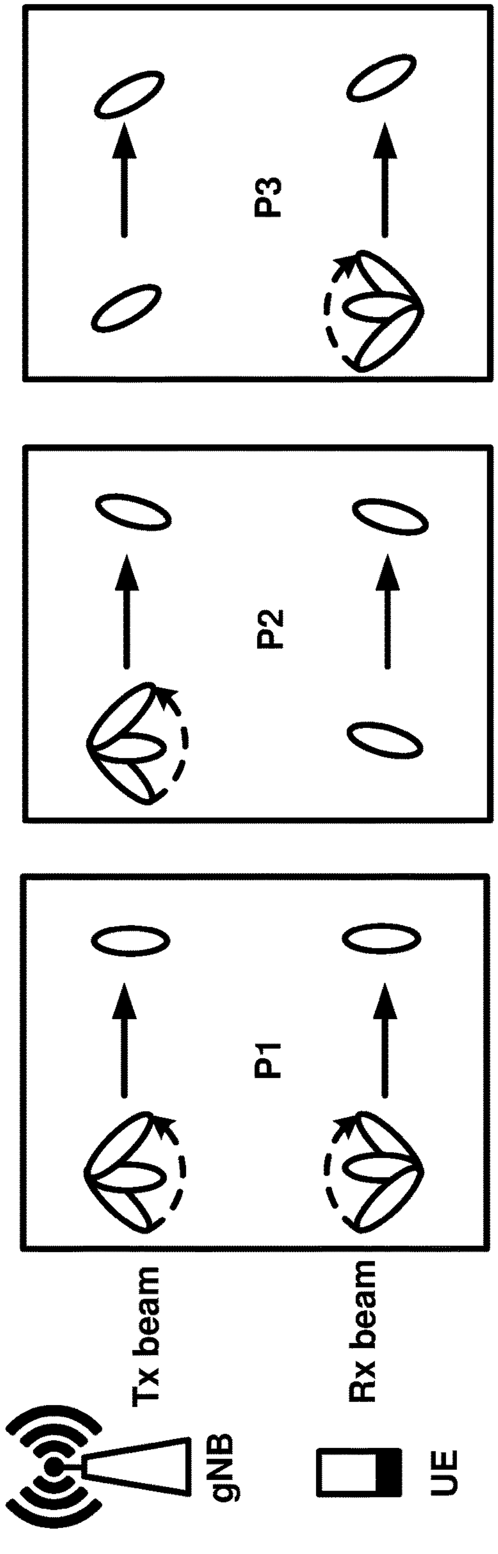
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
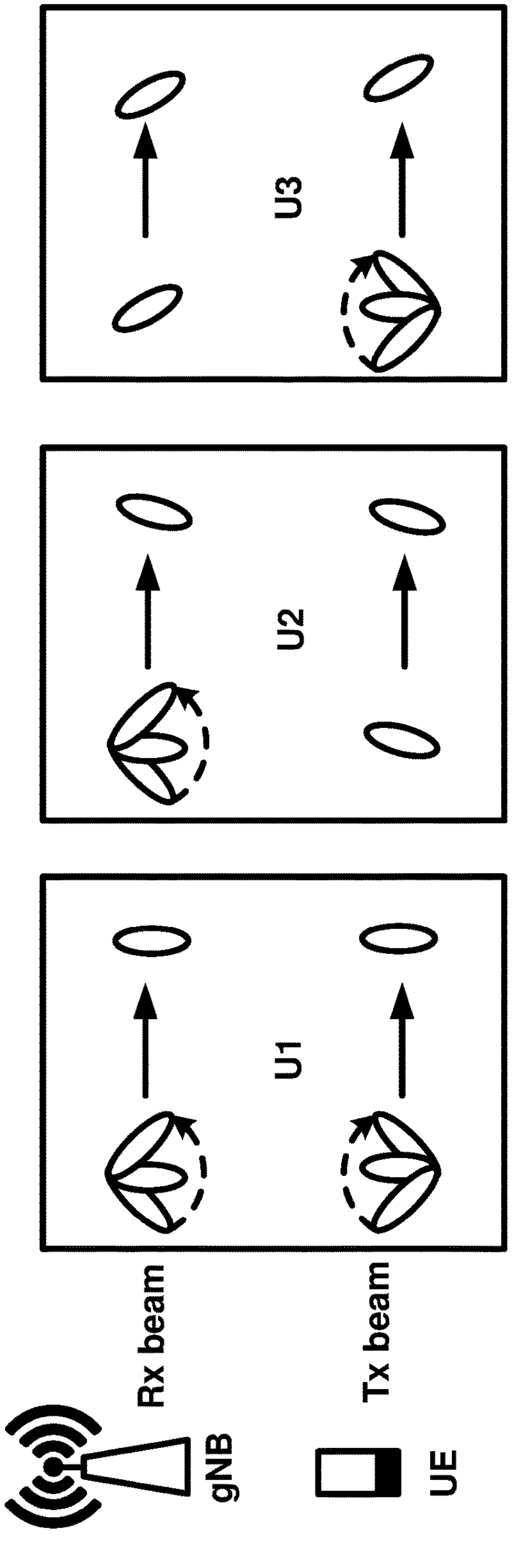

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
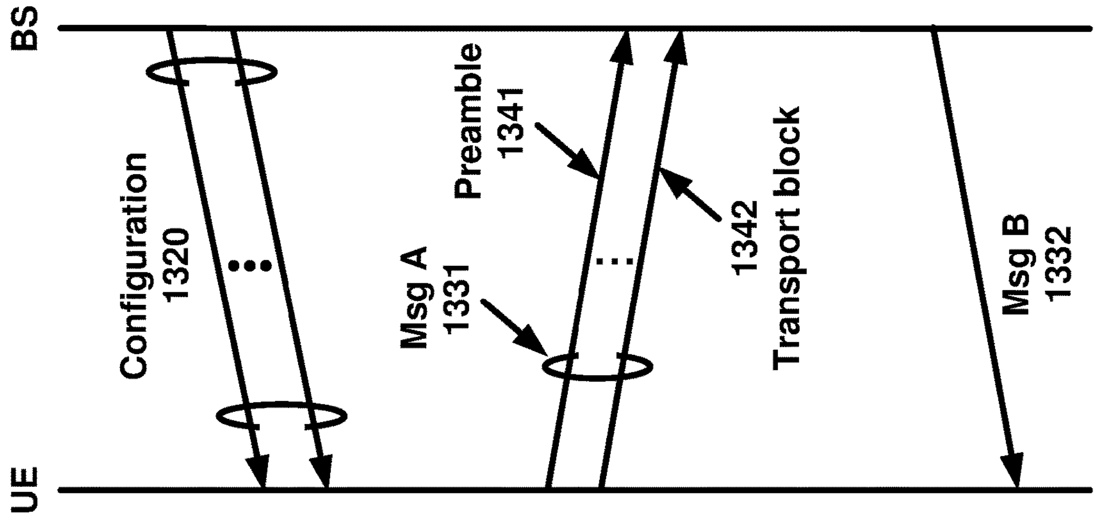
FIG. 13A, FIG. 13B, and FIG. 13C respectively illustrate a four-step contention-based random access procedure, a two-step contention-free random access procedure, and another two-step random access procedure.
Figure 13B:
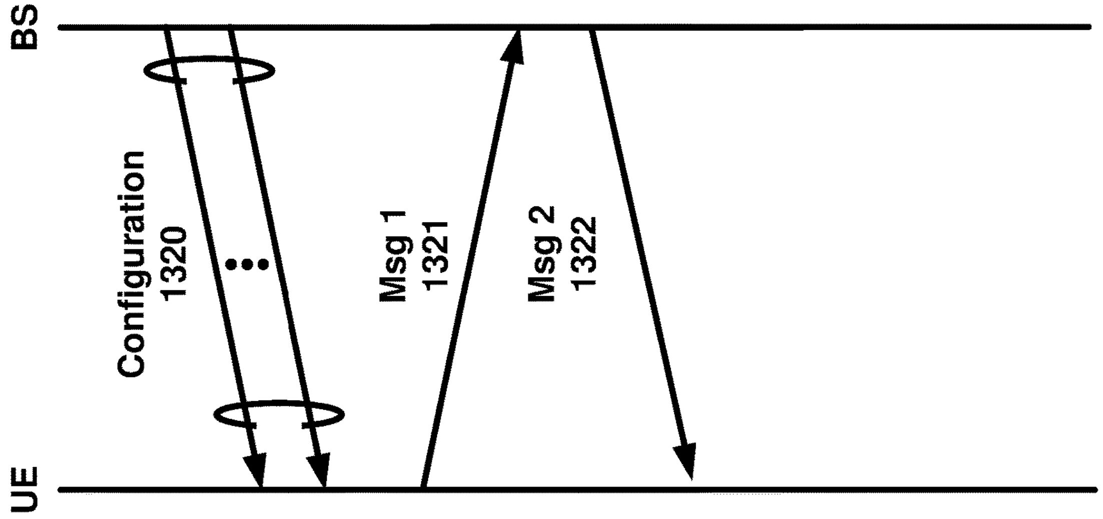
Figure 13A:
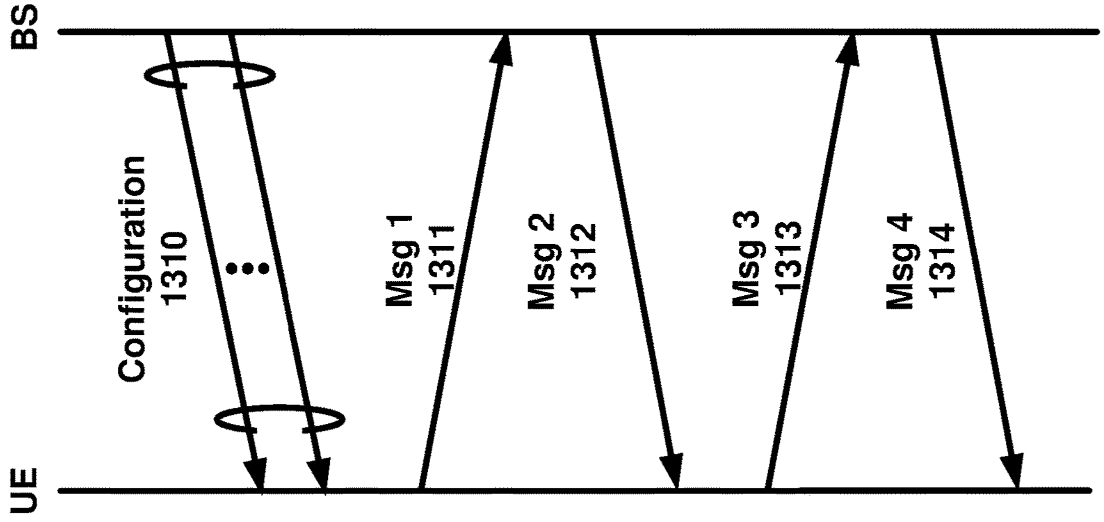

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
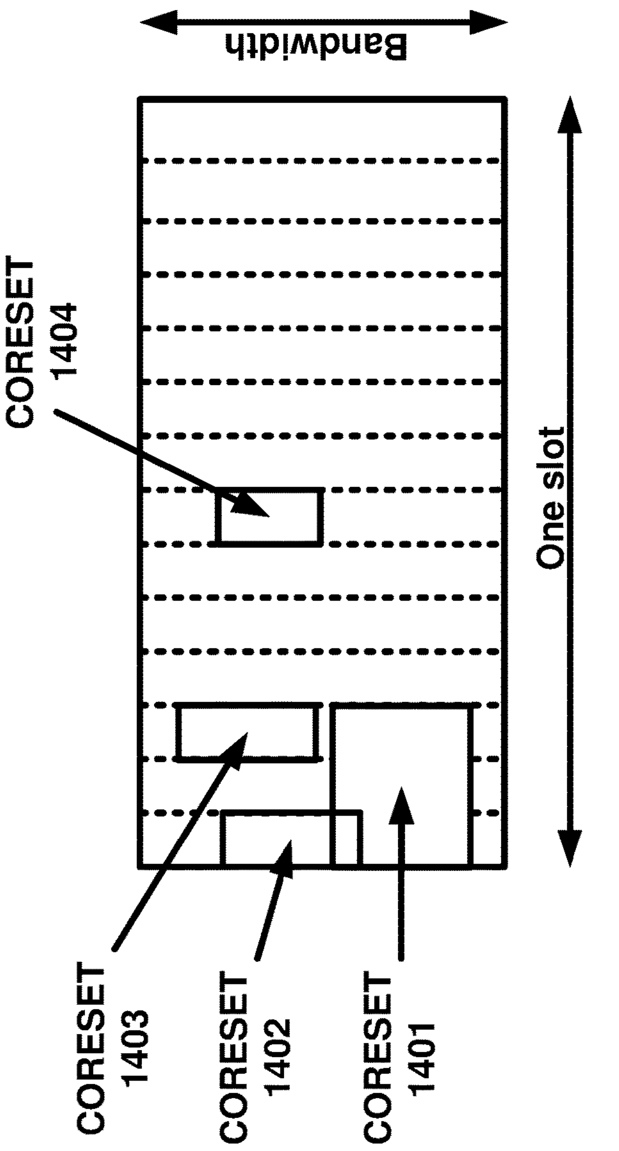
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
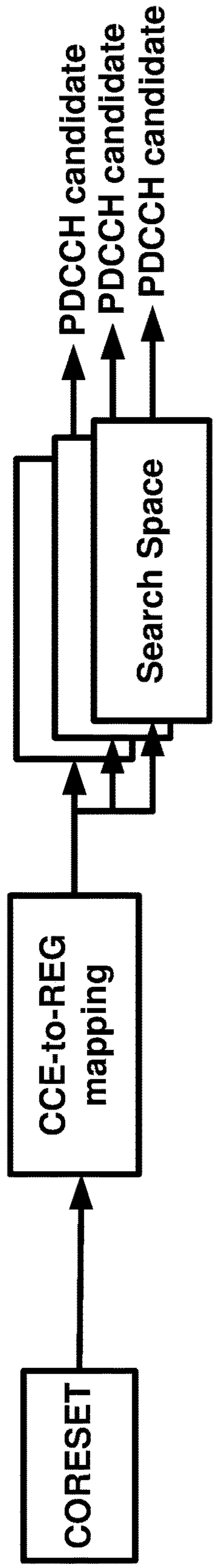
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to “0”. If the total bit length of UCI information bits is greater than two and less than or equal to a first configured value, the UE may select a second PUCCH resource set having a PUCCH resource set index equal to “1”. If the total bit length of UCI information bits is greater than the first configured value and less than or equal to a second configured value, the UE may select a third PUCCH resource set having a PUCCH resource set index equal to “2”. If the total bit length of UCI information bits is greater than the second configured value and less than or equal to a third value (e.g., 1406), the UE may select a fourth PUCCH resource set having a PUCCH resource set index equal to “3”.

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
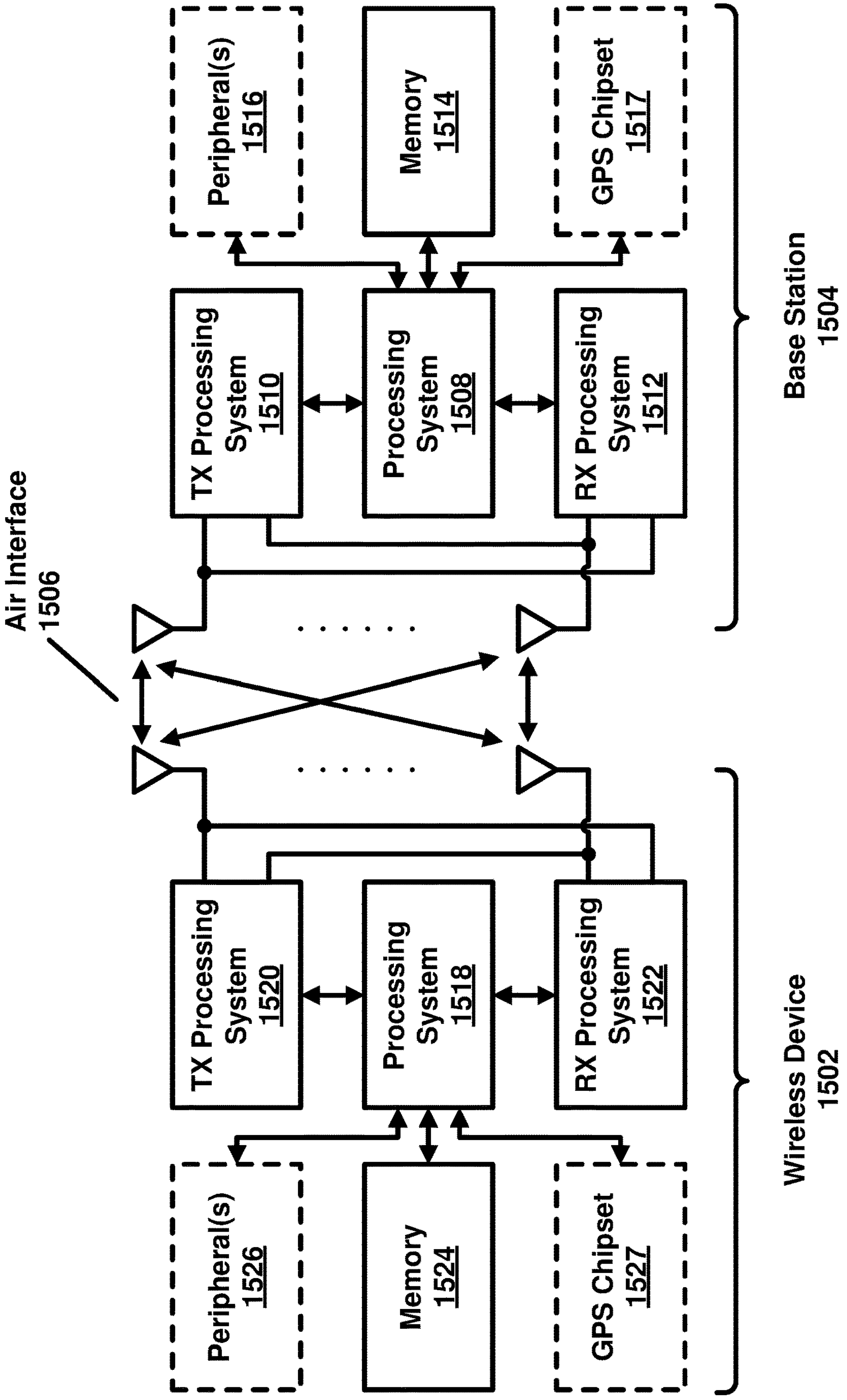
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
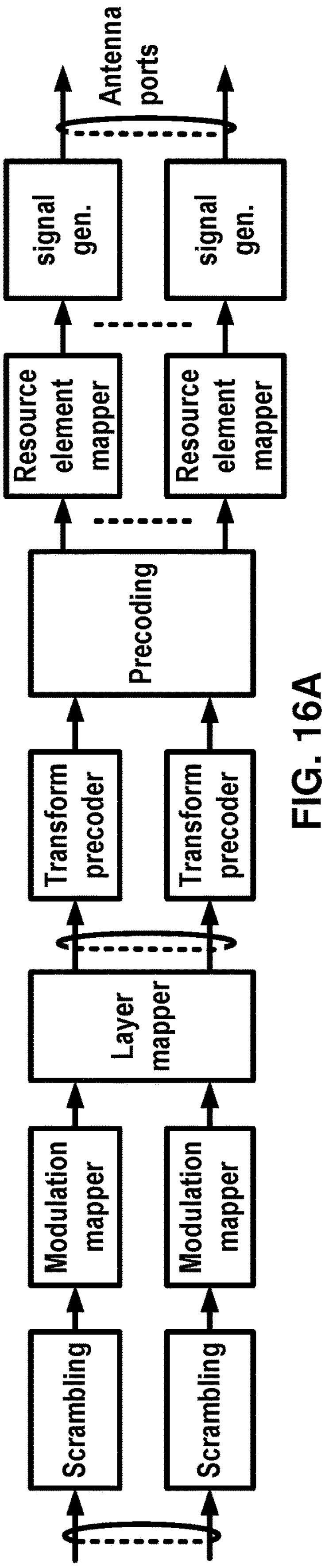
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
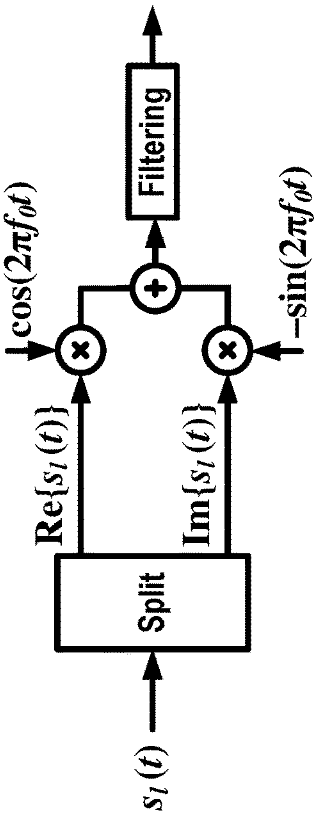

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16C:
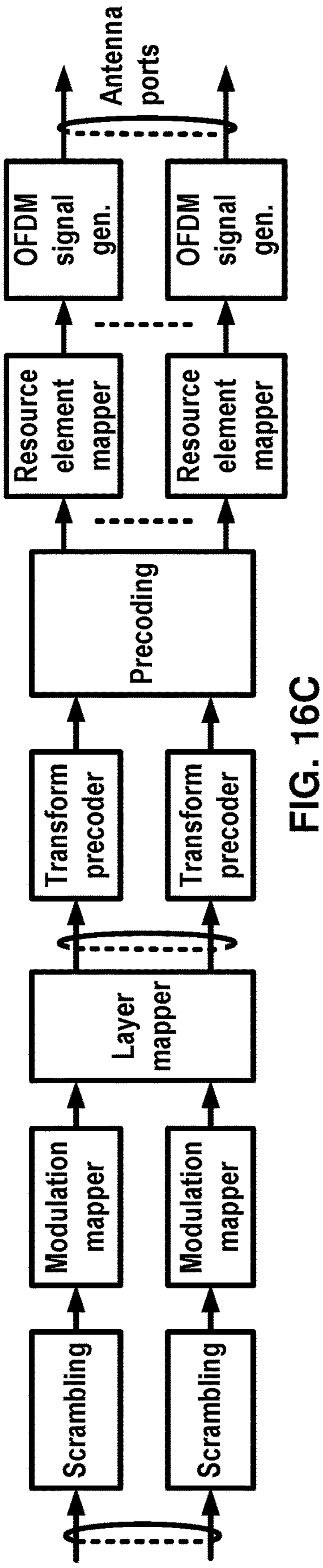

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

Figure 16D:
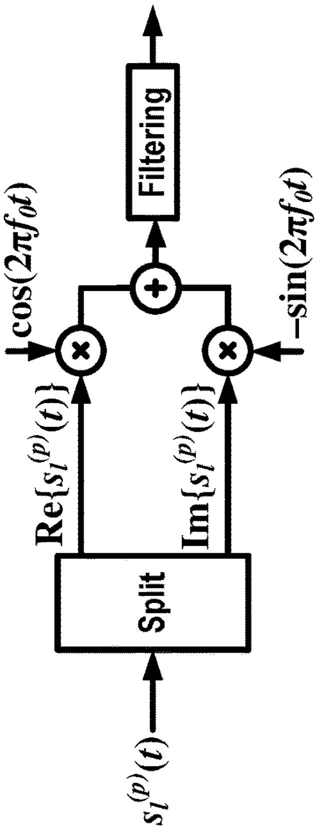

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

With consideration of analog beam forming technologies applied to a wireless device (e.g., UE) and a base station (e.g., gNB) to enhance UE performance and network coverage, finer (e.g., with narrower beam width than beams used in existing technologies) beam forming becomes essential in a new radio access technology. For example, a wireless device may have a first analog beam (e.g., a first RX spatial parameter) which is used to communicate with a first TRP. The wireless device may have a second analog beam (e.g., a second RX spatial parameter) which is used to communicate with a second TRP. The wireless device may be configured/activated with the first TRP and the second TRP on a cell/carrier/frequency. The first RX spatial filter and the second RX spatial filter may provide proper RX spatial filtering parameters to support a first beam with a good quality from the first TRP and a second beam with a good quality from the second TRP. A wireless device may need to have advanced capabilities to support the first RX spatial filter (e.g., the first RX spatial parameters) and the second RX spatial filter (e.g., the second RX spatial parameters) in parallel. With a limited form factor, a limited power and/or a limited capability, assuming the advanced UE capabilities may not be possible in many cases. A multi-TRP scenario, a wireless device being activated with more than one TRPs at a given cell/frequency/carrier, may be beneficial to the UE even without the advanced UE capabilities. For example, a wireless device may move, which may result in frequent hand-over events. Frequent hand-over occurrences may lead to high signaling overhead. With the help of multiple TRPs deployment, the signaling overhead may be reduced with two adjacent TRPs serving the wireless device in a serving cell. A similar use case may apply to a case where a wireless device is associated with PCell and sPCell via a dual connectivity scenario in the same frequency. The scenario may allow reduced handover cases as the coverage based on combining PCell and sPCell would be increased compared to a coverage of either PCell or sPCell. The mobility handling is a key to a high-frequency scenario (e.g., above 6 GHz). In a multi-TRP or a DC scenario, it is likely that TRPs or gNBs may not be able to communicate each other with near-zero latency. With a backhaul communication with a latency, a real-time coordination to determine a qualified analog beam (e.g., a beam with best measurement results) for a wireless device may not be easily achievable. To support better mobility handling and UE performance without requiring an ideal backhaul communication, there is a necessity to enhance a coordination mechanism across multi-TRPs or multi-gNBs.

Figure 17:
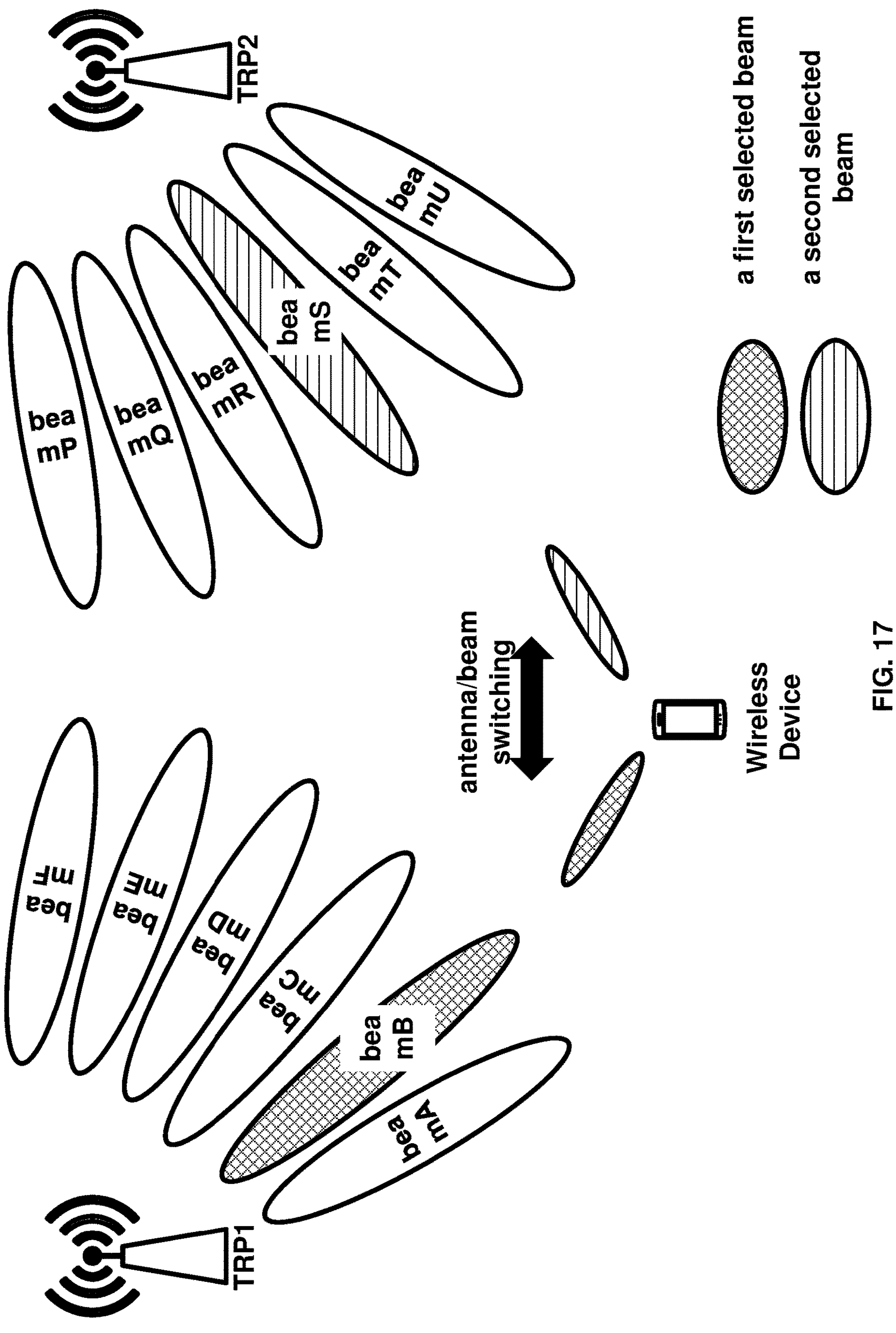
FIG. 17 illustrates an example of a multi-beam multi-TRP scenario.

In an example shown in FIG. 17, a wireless device may switch its analog beam between a first analog beam and a second analog beam. The first analog beam may be a first selected beam of a first TRP (beamB of TRP1, as depicted in FIG. 17). The second analog beam may be a second selected beam of a second TRP (beamS of TRP2, as depicted in FIG. 17). One or more first TCI states associated with beams (e.g., beamA, beamB, . . . , beamF) are associated with the first TRP. In an example, the first TRP may support the one or more TCI states that are associated with the first TRP in transmitting to one or more wireless devices. For example, a wireless device is configured with the one or more TCI states for the first TRP when the one or more TCI states are associated with the first TRP. A wireless device may be activated with one or more second TCI states from the one or more first TCI states in communication with the first TRP. One or more third TCI states associated with beams (e.g., beamP, beamQ, . . . , beamU) are associated with the second TRP.

A first selected beam (e.g., a first TCI state associated with a good quality beam for the first TRP) from TRP1 and corresponding first RX spatial parameters may be different from a second selected beam (e.g., a second TCI state associated with a good quality beam for the second TRP) from TRP2 and corresponding second RX spatial parameters. For example, as shown in FIG. 17, beamB may have first RX spatial parameters and beamS may have second RX spatial parameters. A wireless device may support both TRPs by switching between the first RX parameters and the second RX parameters in a time-domain partitioning manner. For example, the wireless device may apply the first RX parameters at a first time t (e.g., symbol/slot/frame) to communicate with the first TRP. For example, the wireless device may apply the second RX parameters at a second time t1 (e.g., symbol/slot/frame) to communicate with the second TRP. A similar implementation in applying a TX filter may be considered. A similar implementation in a dual connectivity scenario, where a wireless device is configured/activated with a first cell of a master cell group and a second cell of a secondary cell group in the same frequency, may be considered.

In an example, a base station may transmit one or more radio resource control (RRC) messages in a master cell group or a second cell group. The one or more RRC messages may configure one or more PUCCH configurations on one cell or two cells in the cell group. For example, the base station may configure a first PUCCH group and a second PUCCH group in the cell group. The first PUCCH group may comprise one or more first cells including a PCell. The one or more first cells may comprise a set of serving cells where a serving cell is configured with PCell as a PUCCH cell. The one or more second cells may comprise a set of serving cells where a serving cell is configured with a PUCCH SCell as a PUCCH cell. For example, a configuration for a data transmission such as PDSCH-ServingCell-Config may comprise a pucch-Cell parameter. The pucch-Cell may indicate a PCell or a PUCCH SCell. If a PDSCH-ServingCellConfig of a first cell may comprise pucch-Cell as the PUCCH SCell, the first cell may belong to the second PUCCH group. The wireless device may receive a PUCCH configuration on the serving cell of the PUCCH SCell. In a cell group, a wireless device may receive a PUCCH configuration in PCell (or SPCell) or two PUCCH configurations in PCell (or SPCell) and a PUCCH SCell.

In an example, a wireless device may perform a PHR procedure independently for each PUCCH group. In an example, a wireless device may transmit PUCCH independently for each PUCCH group. In an example, a wireless device may perform a power control independently for each PUCCH group.

In existing technologies, a base station may configure a PUCCH SCell to a wireless device where the configured PUCCH SCell may be applied to one or more cells (e.g., PCell, SCell). For example, a wireless device may transmit PUCCHs for a first cell to the PUCCH SCell which may be different from a PCell or SPCell. When a cell may operate with a first TRP and a second TRP, where the cell is associated with the configured PUCCH SCell, the wireless device may transmit a first HARQ-ACK feedback corresponding to a first PDSCH from the first TRP via the configured PUCCH SCell. In the example, the wireless device may transmit a second HARQ-ACK feedback corresponding to a second PDSCH from the second TRP via the configured PUCCH SCell. This may have a few disadvantages. For example, if the PCell has better coverage than the PUCCH SCell, the wireless device may employ the PUCCH Scell to transmit a HARQ-ACK feedback to the first TRP even though the PCell has better coverage. Reliability of the some of HARQ-ACK feedbacks may have been improved if they have been transmitted via PCell. For example, the first TRP may not operate in the PUCCH SCell. The base station may need to identify a cell that is associated with both the first TRP and the second TRP for configuring a PUCCH SCell. This may restrict possible deployment scenarios of multi-TRP operation.

A key scenario of multi-TRP operation may include a case where a wireless device is configured with a PCell and a SCell. In the example, the wireless device may be associated with a first TRP for the PCell and it may be associated with a second TRP for the SCell. For example, PCell may operate in a low frequency range (e.g., frequency range 1, below 6 GHz) and SCell may operate in a high frequency range (e.g., frequency range 2, above 6 GHz). With existing technologies, the wireless device may transmit a first HARQ-ACK for a first PDSCH from the first TRP via the PCell. The wireless device may also transmit a second HARQ-ACK for a second PDSCH from the second TRP via the PCell. As the second TRP is not associated with the PCell, the first TRP may need to forward the second HARQ-ACK to the second TRP. When the first TRP and the second TRP may have a considerable backhaul latency in a link between them, the second TRP may receive the second HARQ-ACK with a considerable latency. With the second HARQ-ACK feedback latency, the wireless device may experience performance degradation for one or more downlink data/control channels from the second TRP (e.g., on the SCell). A PUCCH SCell may not be configured in this case as the first TRP is not associated with the SCell. Existing technologies may limit deployment scenarios of multi-TRP operation or may degrade performances particularly when TRPs communicate each other via non-ideal backhaul link(s) (e.g., 20 msec latency in a backhaul link).

In enabling various useful use cases of multi-TRP operation, efficient HARQ-ACK feedback, particularly when TRPs may have backhaul links with a considerable latency, is necessary. Addition to the HARQ-ACK feedback, efficient handling of uplink control information such as CSI feedback and scheduling requests may need to be enhanced.

In an example, a base station may transmit one or more radio resource control (RRC) messages. The one or more RRC messages may comprise one or more parameters indicating a PUCCH SCell configuration and/or a second PUCCH cell group. A first PUCCH cell group may comprise one or more cells where a PUCCH cell is a PCell or SPCell. The second PUCCH cell group may comprise one or more cells where a PUCCH cell is the PUCCH SCell. The one or more parameters may comprise a cell identification/index of the PUCCH SCell and a list of cells that are grouped (e.g., the second PUCCH cell group) for the indicated PUCCH SCell and associated with the indicated PUCCH SCell. A wireless device may transmit a HARQ-ACK feedback corresponding to a PDSCH received on a cell from the list of cells via the indicated PUCCH SCell (e.g., corresponding to the second PUCCH group). The one or more parameters may include a list of group identifications which may identify a group index or group identification for each cell in the list of cells. For example, the base station may configure up to K groups (e.g., K=2) where each group may correspond to each TRP associated with a wireless device. The wireless device may determine a cell where the wireless device may transmit a HARQ-ACK at least based on the list of cells and the list of group identifications and a second cell index and a TRP/group identification where a corresponding PDSCH is scheduled. For example, a first group may be associated with one or more first cells associated with a first TRP. A second group may be associated with one or more second cells associated with a second TRP. The group identification may indicate either the first group or the second group. In response to receiving the list of cells belonging to the second group in the PUCCH SCell configuration, the wireless device may transmit HARQ-ACK feedbacks corresponding to PDSCHs scheduled on the list of cells and the first TRP via the indicated PUCCH SCell. Embodiments may allow flexible deployment scenarios of a multi-TRP operation. Embodiments may increase user experience quality and/or user data throughput by allowing transmission of uplink control information to appropriate transmission points so that a quick response (e.g., retransmission, adjusting MCS level based on CSI feedback, etc.) may be handled by the TRP.

Figure 18:
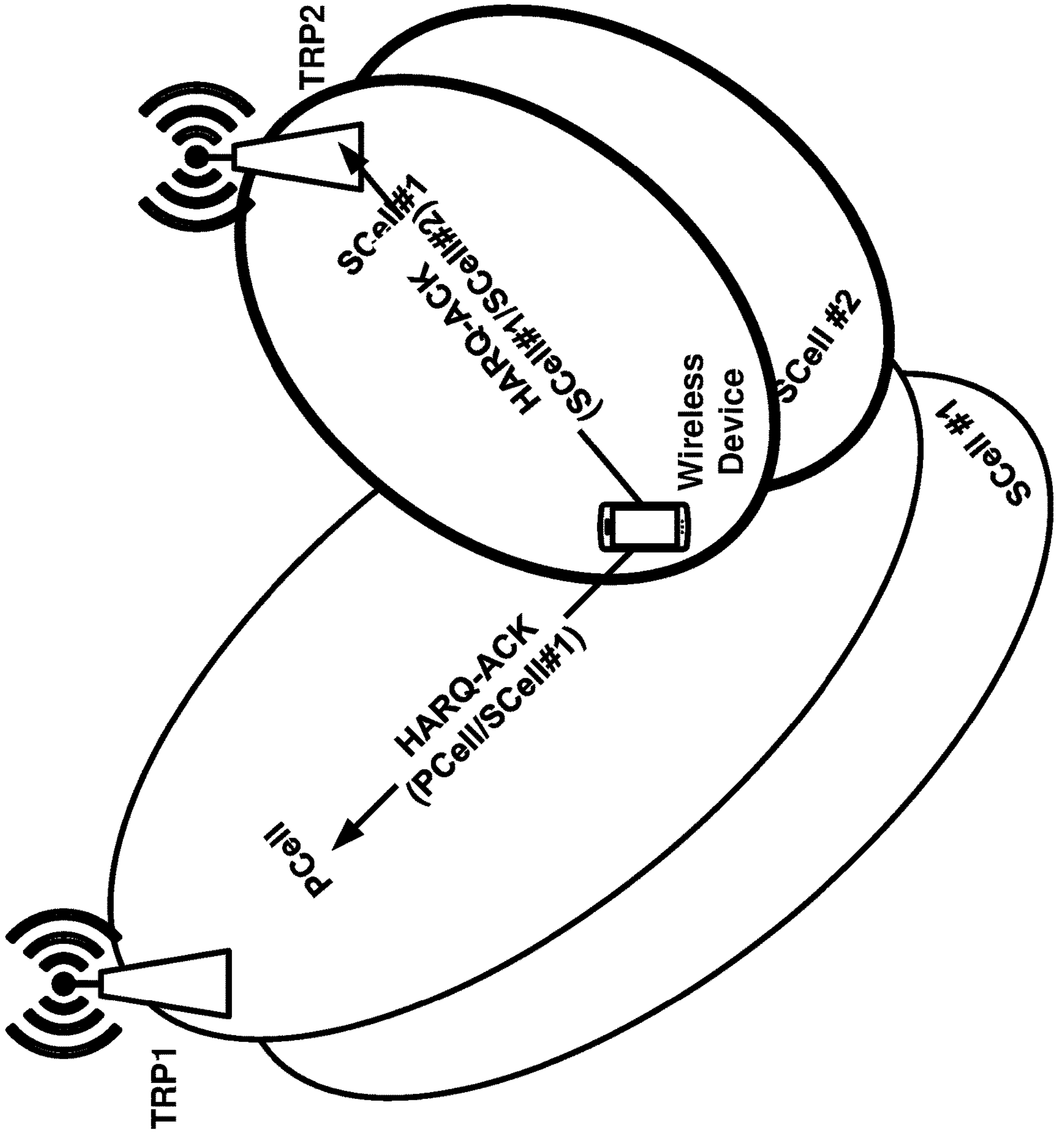
FIG. 18 illustrates an example of an embodiment.

FIG. 18 illustrates an example of an embodiment. A base station may operate with a first TRP (TRP1) and a second TRP (TRP2). The base station may configure a wireless device with a PCell, SCell 1 (SCell #1) and SCell 2 (SCell #2). For the wireless device, the PCell is associated with TRP1 only. SCell #1 is associated with both TRP1 and TRP2. SCell #2 is only associated with TRP2. The wireless device may be configured with a PUCCH SCell on SCell #1 only for TRP2. The wireless device may receive first data from the TRP1 via a PDSCH of the PCell or the SCell #1. The wireless device may transmit a first HARQ-ACK corresponding to the first data via the PCell. The wireless device may receive second data from the TRP2 via a PDSCH of the SCell #1 or the SCell #2. The wireless device may transmit a second HARQ-ACK corresponding to the second data via the SCell #1. In the example, the wireless device may receive one or more RRC messages from the base station. The base station may operate a plurality of TRPs. For example, the base station may operate the first TRP and the second TRP at least for some UEs. The one or more RRC messages may comprise one or more parameters of PUCCH SCell configuration.

The one or more parameters may comprise an index of PUCCH SCell (e.g., SCell #1), a list of cells associated with the PUCCH SCell (e.g., SCell #1, SCell #2), and a list of group identification/indices for the list of cells (e.g., group2 for SCell #1, group2 for SCell #2). In response to receiving the one or more parameters, the wireless device may transmit HARQ-ACK bits corresponding to PDSCHs scheduled on PCell and SCell #1 on TRP1 via PCell as the PUCCH SCell (SCell #1) is not associated with the TRP1 (group1). The wireless device may transmit HARQ-ACK bits corresponding to PDSCHs scheduled on SCell #1 and SCell #2 on TRP2 via SCell #1 as the PUCCH SCell is associated with the TRP2 and SCell #1 and SCell #2. For example, if the one or more parameters includes group1 for SCell #1 in addition to group2 for Scell #1 and group2 for SCell #2, the wireless device may transmit HARQ-ACK bits corresponding to PDSCHs scheduled on PCell on TRP1 via PCell. The wireless device may transmit HRQ-ACK bits corresponding to PDSCHs scheduled on SCell #1 on TRP1 via SCell #1 based on the configuration.

In an example, a scenario of multi-TRP operation may include various deployment case. For example, the scenario may comprise a PCell with a single TRP association whereas a SCell with a multi-TRP association. A single TRP association may be referred that a wireless device is configured/activated with a single TRP on a cell (e.g., PCell or SCell). A multi-TRP association may be referred that a wireless device is configured/activated with a multi-TRP (e.g., a first TRP and a second TRP) on a cell (e.g., PCell or SCell). A scenario may comprise a PCell with a multi-TRP association and a SCell configured as a PUCCH SCell with a single TRP association. A scenario may comprise a PCell and a SCell with a multi-TRP association. A scenario may comprise a cell group where one or more the above scenario is deployed within the cell group and another cell group with a single TRP only. A scenario may comprise a cell group with a multi-TRP operation and another cell group with a multi-TRP operation. A cell group with a multi-TRP operation may be referred that the cell group may comprise one or more cells where at least one cell is associated with a multi-TRP (e.g., a first TRP and a second TRP).

Figure 19:
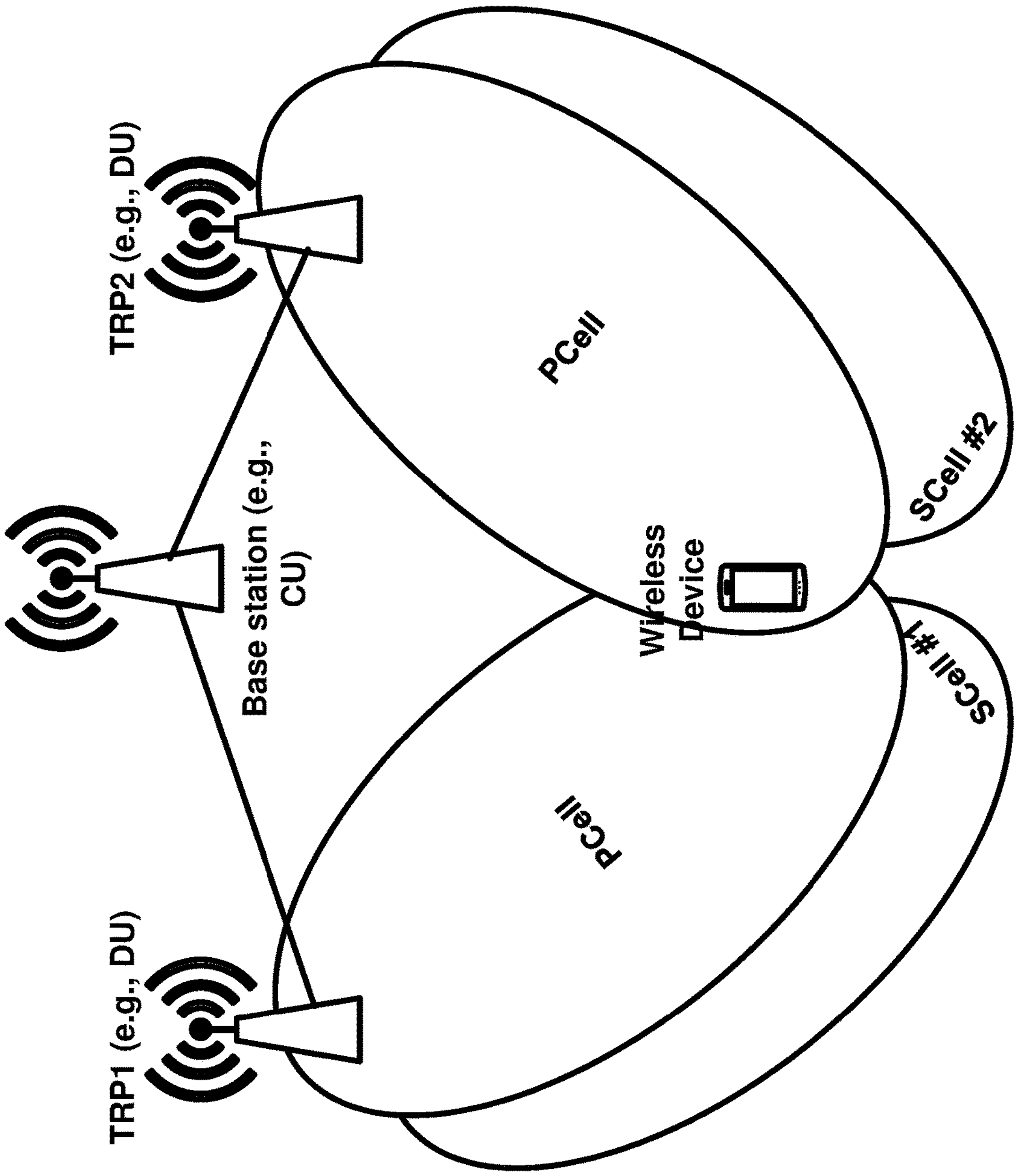
FIG. 19 illustrates a deployment scenario of a multi-TRP operation.

FIG. 19 illustrates a deployment scenario of a multi-TRP operation. A base station may have a first TRP (e.g., TRP1) and a second TRP (e.g., TRP2). The base station may transmit one or more RRC messages to a wireless device (e.g., UE). The one or more RRC messages may comprise one or more configuration parameters of PCell, SCell #1 and SCell #2. The base station may activate the PCell and associate the PCell with the first TRP and the second TRP. The base station may activate SCell #1 and associate with the first TRP only. The base station may activate SCell #2 and associate with the second TRP only. The wireless device may receive a first PDSCH scheduled on TRP1 or TRP2 or jointly between TRP1 and TRP2 on PCell. The wireless device may receive a second PDSCH scheduled on TRP1 on SCell #1. The wireless device may receive a third PDSCH scheduled on TRP2 on SCell #2. In an example, a CU (central unit) of a base station may be separately located from the first TRP and the second TRP. A first DU (distributed unit) may operate in the first TRP. A second DU may operate in the second TRP. The first DU and the second DU may be a same DU or may be different. An architecture in terms of functionality split between a CU and a DU may have various options. For example, an architecture may split a CU and a DU at a PDCP level where an IP packet-based transmission may be occurred between the CU and the DU. For example, an architecture may split between a CU and a DU at a RLC level where the CU and DU may have separate MAC entities with keeping the same higher layer functionalities. For example, an architecture may split between a CU and a DU at a MAC level where the CU and DU may have separate physical layer entities with maintaining a single MAC/RLC/PDCH and higher layer functionalities.

Figure 20:
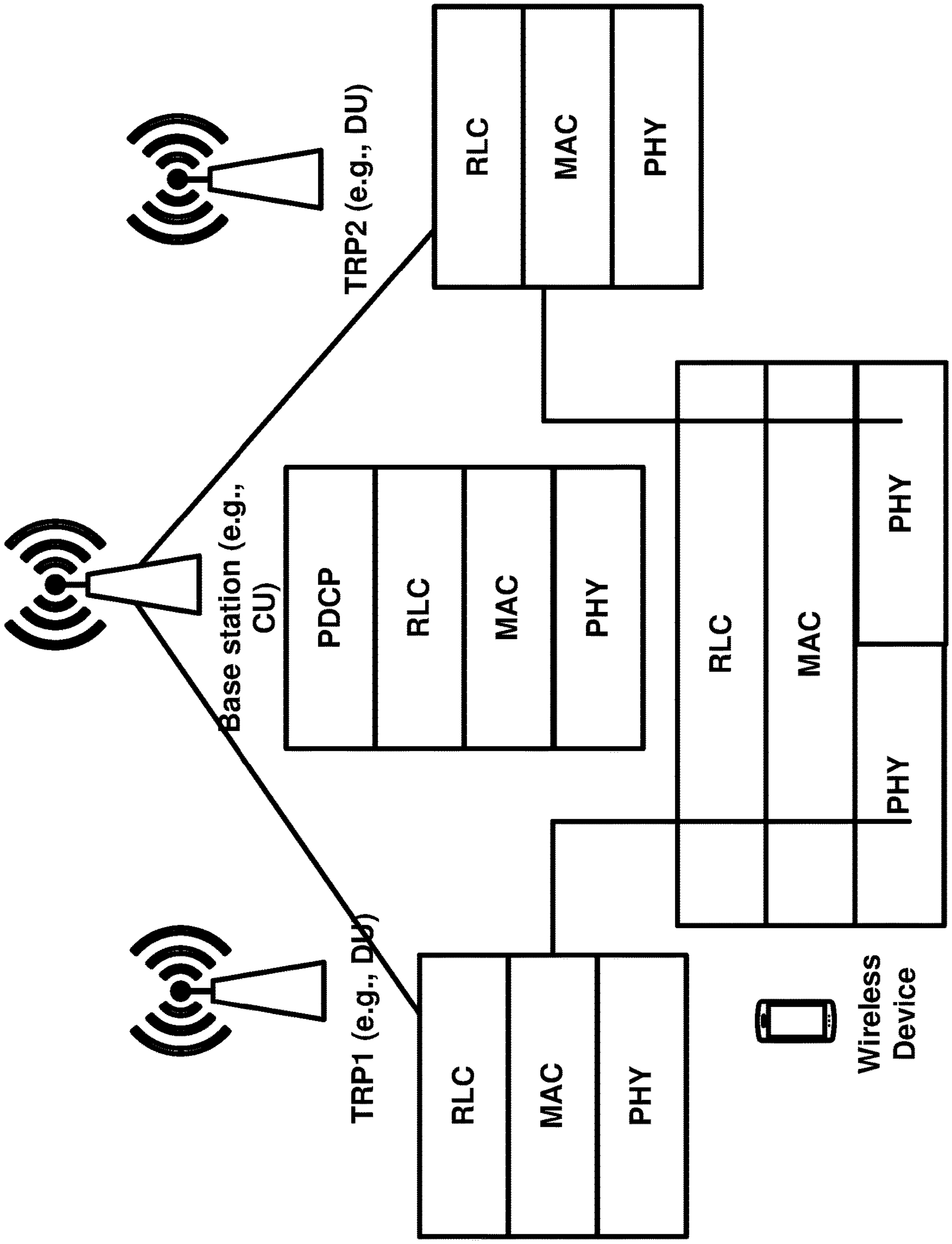
FIG. 20 illustrates an example of a multi-TRP architecture.

FIG. 20 illustrates an example of a multi-TRP architecture. In the example, a base station may have a CU which may be separately placed from a first TRP or a second TRP or may be placed in the first TRP or the second TRP. The first TRP may have a DU function. The second TRP may have a DU function. A CU and a DU functionality may be split at an RLC level. A wireless device may operate a multi-TRP operation using a single MAC and a single RLC layer, whereas the wireless device may have a separate PHY layer (e.g., physical layer) for the first TRP and the second TRP. The separate PHY layer may allow a wireless device to perform a separate beam management, radio link monitoring, and/or the like. The wireless device may have a single PHY layer to support a single or both TRPs. The first TRP and the second TRP may cooperate in handling of RLC/MAC functionalities of the wireless device.

For example, the base station may separate a first set of HARQ processes and a second set of HARQ processes between the first TRP and the second TRP. For example, the base station may maintain one or more timers (e.g., DRX-inactivity timer) based on a first TRP or a second TRP or both TRPs. In each timer that a wireless device may be configured with a MAC layer may be reset/re-started if an event (to reset/restart the timer) is triggered by the first TRP only. In each timer that a wireless device may be configured with a MAC layer may be reset/re-started if an event (to reset/restart the timer) is triggered by the second TRP only. In each timer that a wireless device may be configured with a MAC layer may be reset/re-started if an event (to reset/restart the timer) is triggered by the second TRP only. In each timer that a wireless device may be configured with a MAC layer may be reset/re-started if an event (to reset/restart the timer) is triggered by either the first TRP or the second TRP. For example, a bwp-inactivitytimer may be reset when a wireless device receives a scheduling DCI from one or more CORESETs associated with a first TRP. For example, a bwp-inactivitytimer may be reset when a wireless device receives a scheduling DCI scheduling a data on one or more cells associated with the first TRP. The wireless device may not reset the bwp-inactivitytimer when the wireless device receives a scheduling DCI from one or more CORESETs associated with a second TRP. For example, a bwp-inactivitytimer may be reset when a wireless device receives a scheduling DCI scheduling a data on one or more cells associated with the second TRP. In an example, a wireless device may reset a bwp-inactivitytimer in response to receiving a scheduling DCI from one or more CORESETs associated with a first TRP or a second TRP. For example, a bwp-inactivitytimer may be reset when a wireless device receives a scheduling DCI scheduling a data on one or more cells associated with either the first TRP or the second TRP.

In an example, a different option to reset a timer may be defined based on a timer functionality. For example, a bwp-inactivitytimer may be reset in response to receiving a scheduling DCI (e.g., unicast scheduling DCI) regardless whether the scheduling DCI is transmitted by a first TRP or a second TRP or the scheduling DCI schedules data for the first TRP or the second TRP. For example, a DRX-inactivitytimer may be reset or triggered in response to receiving a scheduling DCI from a first TRP or receiving a scheduling DCI scheduling a data for the first TRP. For example, one or more timers related to a SR may operate separately between a first TRP and a second TRP. Or, a first set of timers related to a SR may be configured for a first PUCCH configuration associated with PCell or SPCell. A second set of timers related to a SR may be configured for a second PUCCH configuration associated with a PUCCH SCell. In terms of SCell deactivation, a single timer shared between the first TRP and the second TRP may be used. One or more timers related to bandwidth part operation (e.g., bwp-inactivitytimer) may be associated with the first TRP or may be associated with the first TRP and the second TRP. In an example, a single timer may be used for a MAC regardless of whether the MAC is associated with a single TRP only or is associated with a first TRP and a second TRP.

In an example, a base station may not configure a PUCCH SCell in a cell group when a wireless device is configured with a first cell group and a second group. The wireless device may be configured with a PUCCH SCell in a cell group when the wireless device is configured with the cell group and may not be configured with another cell group. In the example, the wireless device may not expect to be configured with a PUCCH SCell in a scenario where a PCell or a SPCell (e.g., a primary cell of a first cell group or a second cell group) is configured with a single TRP association while a SCell in the same cell group is configured with a multi-TRP association. For example, a wireless device is configured with a first cell group and a second cell group. The first cell group may comprise a PCell with a single TRP association and a first SCell with a multi-TRP association. The second cell group may comprise a SPCell with a single TRP association and a second SCell with a single TRP association. For example, the first SCell is associated with a first TRP and a second TRP. When the first TRP and the second TRP may communicate via a non-ideal backhaul link (e.g., latency on the backhaul link is non-negligible such as 20 msec), the base station may not configure such a scenario to the wireless device.

In the example, the wireless device may receive one or more RRC messages for a cell group. The one or more RRC messages may indicate to generate a first HARQ-ACK codebook based on a first group (e.g., a first TRP group, a first CORESET group). The one or more RRC messages may indicate to generate a second HARQ-ACK codebook based on a second group (e.g., a first TRP group, a first CORESET group). The wireless device may expect a first HARQ-ACK resource associated with the first HARQ-ACK codebook may be associated with a same cell as to a second HARQ-ACK codebook associated with the second HARQ-ACK codebook. For example, both HARQ-ACK codebooks are associated with the PCell or SPCell of the cell group. The HARQ-ACK codebook is associated with a HARQ-ACK resource is referred that a wireless device may transmit a HARQ-ACK codebook via the HARQ-ACK resource. In an example, a wireless device may not expect to configure a PUCCH SCell in a cell group when the wireless device is configured with a first cell group and a second cell group.

In an example, a base station may configure at most one additional PUCCH SCell in a cell group. A wireless device may use a single MAC between a first PUCCH group and a second PUCCH group in the cell group. The wireless device may use a common MAC in the cell group regardless of a presence of a PUCCH SCell or not. A first PUCCH group may comprise a set of serving cells which are associated with PCell (in a MCG) or SPCell (in a SCG). A serving cell may be associated with a cell when the serving cell is configured that a wireless device may transmit a PUCCH carrying uplink control information such HARQ-ACK bits and/or CSI feedbacks of the serving cell via the cell (e.g., a pucch-Cell of the serving cell is configured as the cell). A second PUCCH group may comprise a set of serving cells which are associated with the PUCCH SCell when the PUCCH SCell is configured in a cell group.

In an example, a base station may transmit one or more RRC messages. The one or more RRC messages may comprise one or more parameters of a PUCCH SCell configuration. The one or more parameters of a PUCCH SCell may comprise a PUCCH SCell index, a list of cells, and a list of group identifications of the list of cells. In an example, a base station may transmit one or more RRC messages. The one or more RRC messages may comprise one or more parameters of a serving cell PDSCH configuration (e.g., PDSCH-ServingCellConfig). The serving cell PDSCH configuration may comprise a first pucch-Cell and a second pucch-Cell. The first pucch-Cell may be a reference to a cell index that is used for a PUCCH transmission for a first TRP associated with the serving cell. The second pucch-Cell may be a reference to a cell index that is used for a PUCCH transmission for a second TRP associated with the serving cell.

In an example, a wireless device may receive a first DCI scheduling a first PDSCH on a first cell. The wireless device may be associated with a first TRP and a second TRP on the first cell. The wireless device may determine a first group or a second group of the first PDSCH based on the first DCI. For example, the wireless device may determine the first PDSCH belongs to the first group when the first DCI is detected in a first CORESET that is associated with the first group (e.g., a first TRP group, a first CORESET group). For example, the wireless device may determine the first PDSCH belongs to the first group when the first DCI may be scheduled with a first RNTI. For example, the wireless device may determine the first PDSCH belongs to the first group when the first DCI may indicate a HARQ-ACK resource that is associated with the first group. For example, the wireless device may determine the first PDSCH belongs to the first group when the first DCI may indicate the PDSCH is associated with the first group based on one or more DCI fields on the first DCI. The wireless device may determine the first group or the second group of the first PDSCH based on a TCI (transmission configuration indication) information of the first PDSCH. For example, a TCI configuration may be associated with the first group or the second group (or the first TRP or the second TRP, or the first PUCCH group or the second PUCCH group). In an example, a wireless device may determine a group of a PDSCH without associating DCI (e.g., semi-persistent scheduling PDSCH) based on one or more RRC configured parameters. For example, in each SPS-PDSCH, the base station may indicate a group index. For example, the wireless device may determine a group of a SPS PDSCH based on an activation DCI. For example, a mechanism mentioned in above for a DCI scheduling PDSCH, the wireless device may determine the group of the SPS PDSCH based on a CORESET of the activation DCI, a TCI of the SPS PDSCH, and/or the like.

In response to the determining the group of the first PDSCH, the wireless device may determine a first HARQ-ACK codebook for the first PDSCH if the group is the first group. The wireless device may determine a second HARQ-ACK codebook the first PDSCH if the group is the second group. The wireless device may generate the first HARQ-ACK codebook and/or the second HARQ-ACK codebook. For example, when the first PDSCH belongs to the first group (e.g., the first HARQ-ACK codebook), the wireless device may transmit a PUCCH carrying the first HARQ-ACK codebook via a first PUCCH resource associated with the first PUCCH group (e.g., a PUCCH resource configured for PCell or SPCell). For example, when the first PDSCH belongs to the second group (e.g., the second HARQ-ACK codebook), the wireless device may transmit a PUCCH carrying the second HARQ-ACK codebook via a second PUCCH resource associated with the second PUCCH group (e.g., a PUCCH resource configured for a PUCCH SCell).

In an example, a wireless device may be indicated with a first downlink group and a second downlink group for a cell. The wireless device may be indicated with a first PUCCH group and a second PUCCH group. For example, the first downlink group may correspond to a first CORESET group. The second downlink group may correspond to a second CORESET group. For example, the first downlink group may correspond to a first TRP group and the second downlink group may correspond to a second TRP group. For example, the first PUCCH group may correspond to a PUCCH group including PCell or SPCell. For example, the second PUCCH group may correspond to a PUCCH group including a PUCCH SCell. For example, the first PUCCH group may correspond to a first set of PUCCH resources in PCell (in a MCG) or SPCell (in a SCG). The second PUCCH group may correspond to a second set of PUCCH resources in PCell (in a MCG) or SPCell (in a SCG). For example, the first PUCCH group may comprise a first set of PUCCH resources in a cell where a spatial domain filter associated with a PUCCH resource belongs to the first group or a first set of SRS resource indicators or a first set of SRS resources. The second PUCCH group may comprise a second set of PUCCH resources in the cell where a spatial domain filter associated with a PUCCH resource belongs to the second group or a second set of SRS resource indicators or a second set of SRS resources.

In an example, the wireless device may associate with the first downlink group to the first PUCCH group based on a TRP index or a CORESET group index or a group index. For example, the first downlink group with a TRP index may be mapped to the first PUCCH group with the same TRP group index. For example, the first downlink group with a group index may be mapped to the first PUCCH group with the group index. Based on the linkage, the wireless device may determine a first HARQ-ACK codebook (corresponding to the first PUCCH group) or a second HARQ-ACK codebook (corresponding to the second PUCCH group). Based on the determining, the wireless device may determine the PUCCH group and transmit a PUCCH via the selected PUCCH group.

In an example, when a group of a PDSCH is determined based on a TCI of the PDSCH, if a TCI of the PDSCH is an SSB index, it may be assumed that the PDSCH belongs to the first group or associated with the first TRP or a TRP with SSB transmissions. Similarly, if a group of a CORESET is determined based on a TCI of the CORESET and the TCI of the CORESET is an SSB, it may be assumed that the CORESET belongs to the first group or associated with the first TRP or a TRP with SSB transmissions.

In an example, a wireless device may be configured with a PCell that is associated with a second TRP only without a first TRP. In the example, the wireless device may be configured with a PUCCH SCell for the first TRP. The wireless device may be configured with a first PUCCH group for the second TRP with the PCell. One or more different deployment scenarios (e.g., PCell with a first TRP only+SCell with the first TRP and the second TRP, PCell with a second TRP only+SCell with the first TRP only, PCell with the second TRP only+SCell with the first TRP and the second TRP, and/or the like) may be considered.

FIG. 18 illustrates an embodiment. In an example, a wireless device is configured with a first PUCCH group comprising a PCell and SCell #1 for TRP1. The wireless device is configured with a second PUCCH group comprising SCell #1 and SCell #2 for TRP2. The wireless device may receive a PDSCH scheduled on PCell from TRP1, the wireless device may transmit a corresponding HARQ-ACK on a PUCCH via PCell. The wireless device may receive a PDSCH scheduled on SCell #1 from TRP2, the wireless device may transmit a corresponding HARQ-ACK on a PUCCH via SCell #1.

Figure 21:
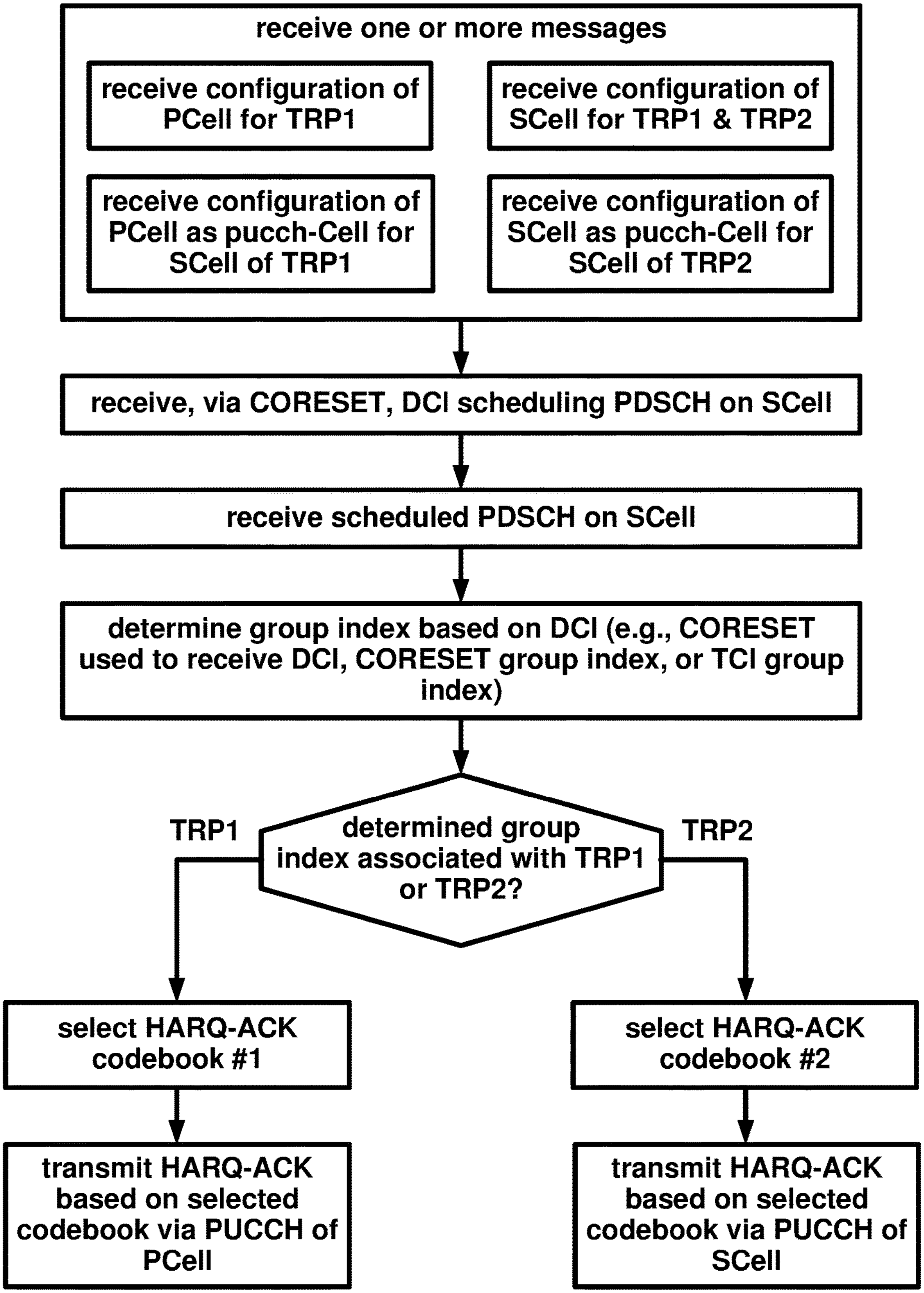
FIG. 21 illustrates an example signal flow diagram for a HARQ-ACK feedback.

FIG. 21 illustrates a flow diagram of an embodiment. The flow diagram may be followed by a wireless device when providing HARQ feedback in accordance with aspects of the disclosure. In the example of FIG. 21, the wireless device may receive one or more messages. The one or more messages may configure cells and one or more PUCCH configurations. For example, the wireless device may be configured with a PCell for a TRP1. The wireless device may be configured with an SCell for the TRP1 and for a TRP2. The configured PUCCH resources/configurations may be employed by the wireless device to transmit HARQ feedback. The wireless device may be configured with the PCell as the pucch-Cell for transmitting HARQ feedback relating to the SCell of TRP1. PCell is used as a pucch-Cell for the PCell itself. The wireless device may be configured with the SCell as the pucch-Cell for transmitting HARQ feedback relating to the SCell of TRP2.

The wireless device may receive a DCI. For example, the DCI may be received with a particular CORESET. The DCI may schedule a PDSCH on the SCell. The wireless device may receive the scheduled PDSCH on the SCell. In response to the reception of the PDSCH, the wireless device may be required to provide HARQ feedback in the form of a HARQ-ACK.

The wireless device may improve efficiency by transmitting HARQ feedback using a particular HARQ-ACK codebook and a particular PUCCH. For example, if a PDSCH is received from TRP2, and the HARQ-ACK is transmitted using the PUCCH of the PCell of TRP1 (as it might be in legacy systems), then the TRP1 may need to provide the HARQ-ACK to the TRP2 via the backhaul. This can delay HARQ feedback and increase latency. To increase efficiency, the wireless device may determine a group index from which a corresponding TRP may be determined. The wireless device may determine the group index based on the DCI. For example, the group index may be determine a group index of the CORESET scheduling/transmitting the DCI (e.g., the CORESET group index), a TCI group index determined based on a TCI state of the PDSCH indicated by the DCI, any other suitable parameters, or any combination thereof.

After determining the group index, the wireless device may determine that the determined group index is associated with TRP1 or TRP2 (e.g., a first group or a second group). If the determined group index is associated with TRP1 (e.g., the first group), then the wireless device may select an appropriate HARQ-ACK codebook (HARQ-ACK codebook #1 in this example) corresponding to the determined TRP or the determined group and transmit one or more HARQ-ACK bits based on the selected codebook using a first PUCCH (e.g., a PUCCH that is configured for the SCell of TRP1 (the PUCCH of the PCell in this example)). The first PUCCH may correspond to a PUCCH configuration associated with the determined TRP or the determined group. For example, a first PUCCH configuration (e.g., a PUCCH configuration in a PCell) may correspond to the first TRP or the first group. A second PUCCH (e.g., a PUCCH configuration in a PUCCH SCell) may correspond to the second TRP or the second group. Alternatively, the wireless device may determine that the determined group index is associated with TRP2. If the determined group index is associated with TRP2, then the wireless device may select an appropriate HARQ-ACK codebook (HARQ-ACK codebook #2 in this example) and transmit one or more HARQ-ACK bits based on the selected codebook using the PUCCH that is configured for the SCell of TRP2 (PUCCH of the SCell in this example).

The effect of these operations is to ensure that the HARQ-ACK feedback reaches the appropriate TRP more efficiently, especially in cases where an SCell is configured for multiple TRPs. Advantages can be achieved by reducing reliance on the backhaul connection between the multiple TRP, especially in cases where the multiple TRPs share a non-ideal backhaul.

In an example, a wireless device may support PUCCH SCell functionality. The wireless device may not support PUCCH SCell function in a scenario where the wireless device is associated with a first cell group and a second cell group (e.g., a dual connectivity scenario). The wireless device may support PUCCH SCell function in one or more frequencies/band/band combinations. In an example, a wireless device may support PUCCH SCell functionality when the wireless device supports a multi-TRP operation. A base station may assume that a wireless device may support PUCCH SCell functionality in a frequency/band/band combination where the wireless device has indicated that the wireless device supports a multi-TRP operation. A band may comprise a reference frequency, and a frequency region (e.g., a lowest frequency and a highest frequency). A band combination may comprise a combination comprising one or more bands. For example, a band combination may comprise a combination of a first band and the first band (e.g., intra-band band combination).

For example, a band combination may comprise a combination of a first band and a second band (e.g., inter-band combination). For example, a band combination may comprise a combination of a first band, the first band, and a second band (e.g., combination of inter-band and intra-band). When a wireless device may indicate that the wireless device supports a multi-TRP operation in a band or a band combination, a base station may assume that the wireless device may support a PUCCH SCell in the indicated band or the band combination. In an example, a wireless device may support PUCCH SCell at least for a second TRP in the indicated band or band combination. A base station may configure a PUCCH SCell for one or more cells associated with the second TRP in this case. The base station may not configure one or more cells associated with a first TRP on the PUCCH SCell unless the wireless device may indicate that the wireless device supports a PUCCH SCell for the first TRP as well.

For example, a wireless device may indicate that the wireless device supports a multi-TRP operation in one or more frequencies/bands in frequency range 2 (e.g., above 6 GHz or 7 GHz frequency region). The wireless device may support a PUCCH SCell configured to one frequency/band from the indicated one or more frequencies/bands where the PUCCH SCell is associated with a second TRP and the PUCCH SCell may be configured when a multi-TRP operation is activated. The wireless device may additionally indicate a PUCCH SCell capability related to a first TRP. Without indication of the additional PUCCH SCell capability related to the first TRP, a base station may assume that the wireless device may not support PUCCH SCell associated with the first TRP, or the base station may not configure a PUCCH SCell when the wireless device is not operating with a multi-TRP in any frequency.

In an example, a base station may configure a multi-TRP operation in a cell group. The base station may associate a PCell (in a master cell group (MCG)) or a SPCell (in a secondary cell group (SCG)) with a multi-TRP when the base station may associate at least a SCell with the multi-TRP (e.g., a first TRP and a second TRP) in the cell group. When a wireless device may be associated with a single TRP on PCell of a cell group (in MCG) (or SPCell (in SCG)) and a multi-TRP on a SCell in the same cell group, the wireless device may not expect that the wireless device is configured with a TRP-specific PUCCH resource. For example, a wireless device may determine a PUCCH resource as a TRP-specific PUCCH resource when one or more parameters corresponding to the PUCCH resource may comprise a TRP index or a group index indicating a TRP group or a TRP association or a TRP index. For example, a group index may be a CORESET group index, may be a group index, may be a TRP index, may be a TCI group index, may be a cell group index, and/or the like.

A similar restriction may be applied to a case of a PUCCH SCell configuration. When a wireless device is configured with a PUCCH SCell, a second list of cells associated with the PUCCH SCell may comprise a second cell group. A first list of cells not associated with the PUCCH SCell and/or associated with a PCell (or SPCell) may comprise a first cell group. When a wireless device may be configured with a PUCCH SCell on a first SCell where the wireless device is activated with another SCell belonging to the same cell group or associated with the PUCCH SCell may be activated/configured with a multi-TRP, the wireless device may expect that the first SCell is also activated/configured with a multi-TRP. Otherwise, the wireless device may assume that configuration of the PUCCH SCell may not be valid. Or, the wireless device may assume that a multi-TRP operation in the cell group associated with the PUCCH SCell is deactivated. The wireless device may apply this restriction only when the wireless device may be configured with a TRP-specific PUCCH resource in the PUCCH SCell. In other cases, the wireless device may transmit HARQ-ACK codebooks via the PUCCH SCell with an associated TRP on the PUCCH SCell.

In an example, a wireless device may deactivate a second TRP (or a second TRP group) in response to determination of an invalid configuration/deployment scenario (e.g., a PCell or a SPCell or a PUCCH SCell is not associated with a multi-TRP). The wireless device may fallback to a single TRP operation when an invalid configuration occurs. For example, when a second TRP of the PCell or the SPCell or the PUCCH SCell becomes inactive, the wireless device may deactivate the second TRP of cells associated with the second TRP.

Figure 22:
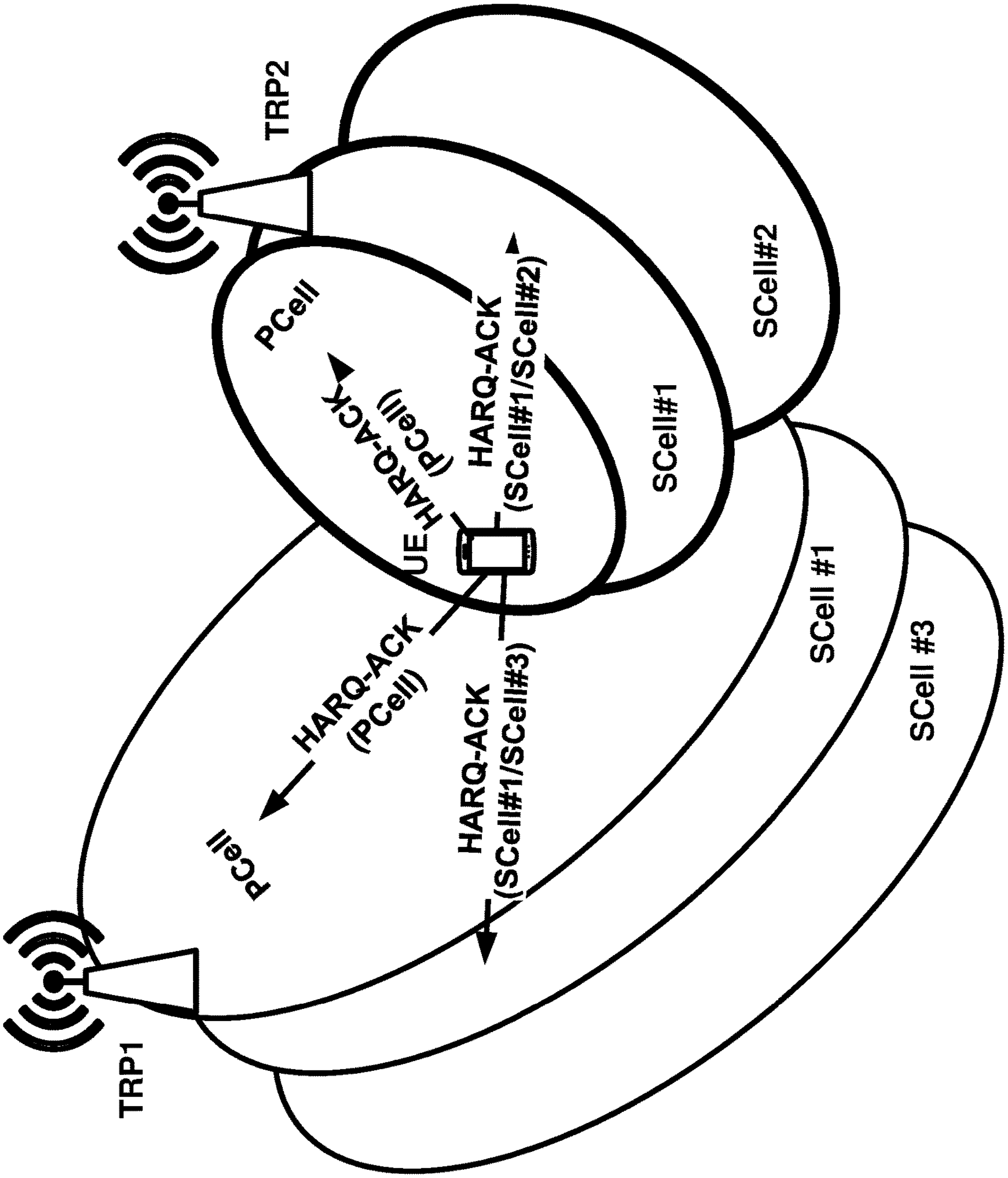
FIG. 22 illustrates an example of a PUCCH SCell.

FIG. 22 illustrates an example. A wireless device is configured with a multi-TRP operation. A first TRP is associated with PCell, SCell #1 and SCell #3. A second TRP is associated with SCell #1 and SCell #2. The wireless device may is configured with a PUCCH SCell on SCell #1. In an example, a few possible examples of a PUCCH SCell configuration with keeping a restriction specified in the specification may as follows. For example, SCell #1 may be configured as a PUCCH SCell where the PUCCH SCell may be associated with SCell #1, SCell #2 and SCell #3. SCell #1 and/or SCell #3 may be associated with PCell instead. With a restriction, there are some scenarios not allowed. For example, SCell #2 may not be configured as a PUCCH SCell where the PUCCH SCell may be associated with SCell #1 as SCell #1 is associated with a multi-TRP whereas SCell #2 is associated with a single TRP. A SCell associated with a single TRP may not be configured as a PUCCH SCell when another SCell associated with the PUCH SCell may be associated with a multi-TRP. PCell, SPCell, or a PUCCH SCell, when there is at least one SCell associated with PCell, SPCell or PUCCH SCell is associated with a multi-TRP.

In an example, a base station may transmit one or more RRC messages. The one or more RRC messages may indicating a first HARQ-ACK codebook being associated with a first group, a second HARQ-ACK codebook being associated with a second group, a first HARQ-ACK resource information such as a cell index and PUCCH resources associated with the first group, and a second HARQ-ACK resource information such as a cell index and PUCCH resources associated with the second group. For example, the first HARQ-ACK codebook may be generated for corresponding PDSCHs that are scheduled for one or more cells associated with a first TRP in a cell group. For example, the second HARQ-ACK codebook may be generated for corresponding PDSCHs that are scheduled for one or more cells associated with a second TRP in a cell group. The first HARQ-ACK codebook may be transmitted via PCell HARQ-ACK resources (e.g., PCell resource set 1). The second HARQ-ACK codebook may be transmitted via SCell #1 HARQ-ACK resources (e.g., SCell resource set 1) or PCell HARQ-ACK resources (e.g., PCell resource set 1) or another PCell HARQ-ACK resources (e.g., PCell resource set 2).

In the example, a wireless device may be configured with a PUCCH resource in a PUCCH configuration on PCell or SPCell. The PUCCH resource may comprise one or more parameters indicating a cell index and one or more physical resources used for a PUCCH transmission. The cell index may refer PCell or SCell or SPCell. If the cell index may refer a SCell index, the wireless device may assume that the PUCCH resource is configured in the indicated SCell. In response to being indicated with the PUCCH resource via dynamic DCI, MAC CE and/or RRC, the wireless device may transmit HARQ-ACK feedbacks on the indicated SCell instead of via the PCell or SPCell. The base station may configure a first PUCCH resource with PCell index (e.g., without a cell index may indicate PCell) and a second PUCCH resource with a SCell index. The wireless device may transmit a first HARQ-ACK codebook associated with a first group via the first PUCCH resource. The wireless device may transmit a second HARQ-ACK codebook associated with a second group via the second PUCCH resource.

In an example, a base station may transmit one or more RRC messages. The one or more RRC messages may configure one or more parameters of a PUCCH resource or a PUCCH resource set. The one or more parameters may comprise a set of PUCCH resources, a cell index, and one or more of group indices (or one or more TRP indices). For example, a wireless device may receive one or more parameters comprising of a set of PUCCH resource, a SCell index, and a first TRP (or a first group). The wireless device may utilize the configured PUCCH resources for HARQ-ACK feedbacks corresponding to PDSCHs scheduled for the first TRP only or for the first group. The wireless device may be configured with a first TRP and a second TRP associated with a PUCCH resource or a PUCCH resource set. In response, the wireless device may transmit HARQ-ACK corresponding to PDSCHs for either the first or the second TRP/group. When the wireless device may not receive the one or more group indices (or the one or more TRP indices), the wireless device may assume that the configured PUCCH resource or the set of PUCCH resources are for PDSCHs regardless of whether the PDSCH is scheduled/transmitted from the first TRP or the second TRP (or the first group or the second group).

In an example, a wireless device may receive a first set of PUCCH resource via RRC signaling. The wireless device may receive a second set of PUCCH resource via RRC signaling. When the second set of PUCCH resource is not provided, the wireless device may transmit HARQ-ACK feedback via the first set of PUCCH resource for PDSCHs scheduled/transmitted for a first TRP or a second TRP. When the second set of PUCCH resource is provided, the wireless device may transmit HARQ-ACK feedback via the first set of PUCCH resource for PDSCHs scheduled/transmitted for the first TRP. And, the wireless device may transmit HARQ-ACK feedback via the second set of PUCCH resource for PDSCHs scheduled/transmitted for the second TRP. A wireless device may receive a plurality of sets of PUCCH resource in PCell, SPCell or a PUCCH SCell. In an example, when a wireless device may be configured with a PUCCH SCell. The wireless device may be configured with a single set of PUCCH resource. The single set of PUCCH resource may be used for HARQ-ACK feedback of PDSCHs scheduled/transmitted for a list of cells associated with the PUCCH SCell regardless of a transmitting TRP (e.g., the first TRP or the second TRP).

In an example, a base station may configure via RRC signaling a index of cell that is used for a PCell or SPCell for each TRP in a multi-TRP operation, in determining a cell to transmit a PUCCH, SR, and/or PRACH. For example, the base station may indicate an index of PCell (e.g., cell index 0) as a PCell or SPCell for a first TRP. In the example, a wireless device may assume a TRP that is activated in configuration/activation of PCell via initial access or handover is the first TRP in a MCG. In the example, the wireless device may assume a TRP that is activated in configuration/activation of SPCell via secondary cell group configuration/activation/addition is the first TRP in a SCG. The base station may not explicit configure a cell index of PCell or SPCell for the first TRP. The wireless device may assume that PCell in a MCG or SPCell in a SCG is the PCell or SPCell for the first TRP in determining a cell to transmit a PUCCH, SR and/or PRACH.

In an example, a wireless device may receive one or more RRC messages. The one or more RRC messages may comprise one or more PUCCH resource (sets), one or more SR resources, and/or one or more PRACH resources. The one or more RRC messages may indicate a cell index where the indicated resources are configured. For example, a SCell may be configured with PUCCH, SR, and/or PRACH resources. The wireless device may receive the SCell as an cell index for a second TRP used as a PCell or SPCell for the purposes of transmitting PUCCH, SR, and/or PRACH channels at least.

Figure 23:
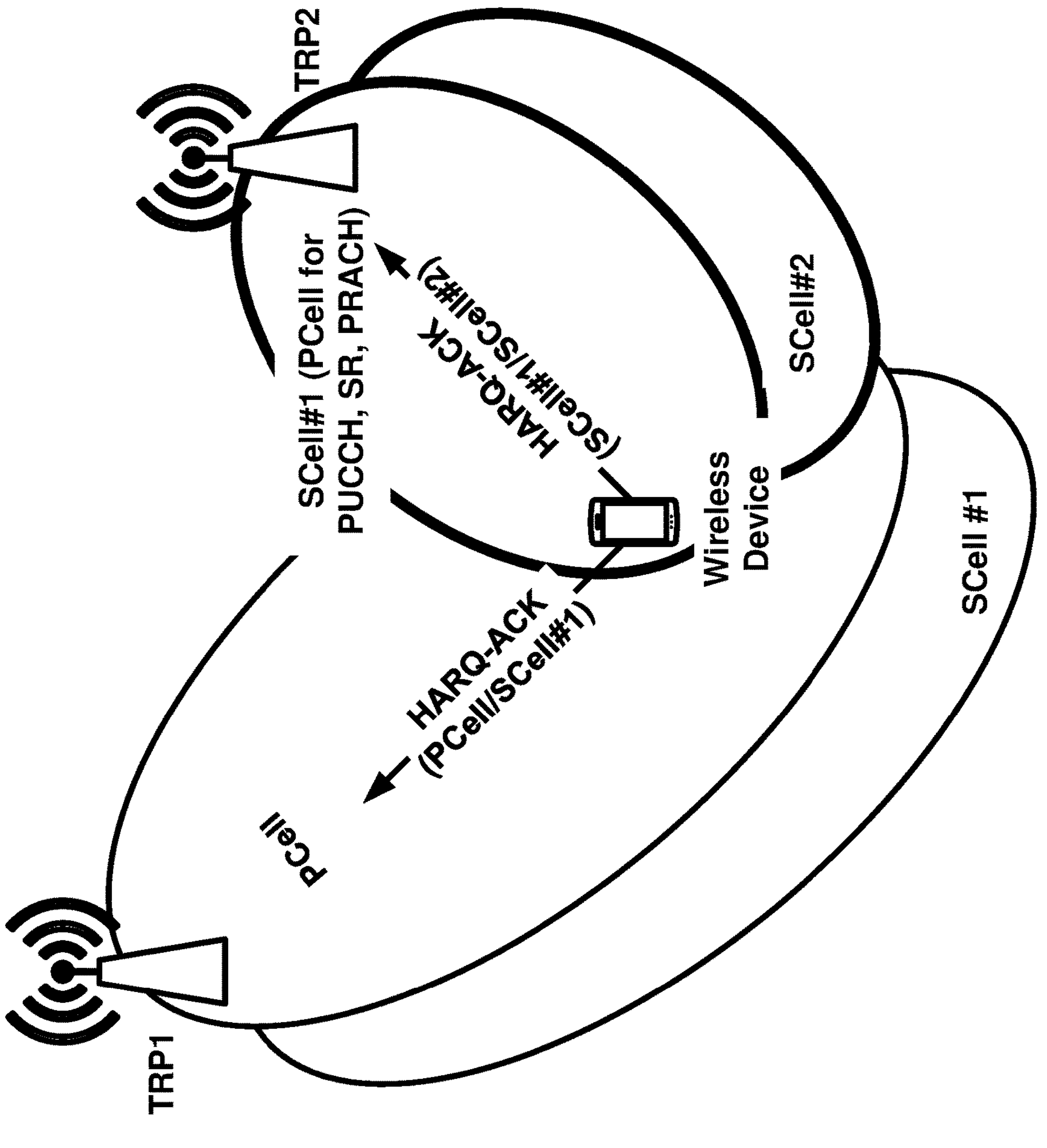
FIG. 23 illustrates an example of a PUCCH SCell.

FIG. 23 illustrates an example. Similar to FIG. 18, a wireless device is configured with a first TRP and a second TRP. Each TRP is associated with one or more cells (e.g., PCell and SCell #1 for the first TRP). A base station may configure 'SCell #1' as a PCell for a second TRP. The wireless device may assume that SCell #1 is used as if a PCell in determining HARQ-ACK resources, SR resources, and/or PRACH resources. For example, the wireless device may transit HARQ-ACK feedbacks for SCell #1 and SCell #2 for TRP2 via SCell1. The wireless device may transit HARQ-Ack feedbacks for PCell and SCell #1 for TRP1 via PCell.

In an example, a base station may configure a first TRP group and a second TRP group. A TRP group may comprise one or more cells that are associated with a TRP. A cell may be associated with TRP(s) based on whether one or more CORESETs configured on the cell is associated with a first CORESET group and/or a second CORESET group. A cell may be associated with TRP(s) based on whether one or more TCI states configured on the cell is associated with a first TCI group and/or a second TCI group. A TRP group may have a similar functionality to a group formed based on a PUCCH SCell. For example, when a wireless device is configured with a PUCCH SCell, the wireless device may have a first group consisting of one or more first cells associated with PCell in transmitting at least HARQ-ACK feedbacks and the wireless device may have a second group consisting of on or more second cells associated with the PUCCH SCell in transmitting at least HARQ-Ack feedbacks. A first TRP group may correspond to the first group. A second TRP group may correspond to the second group.

Figure 24:
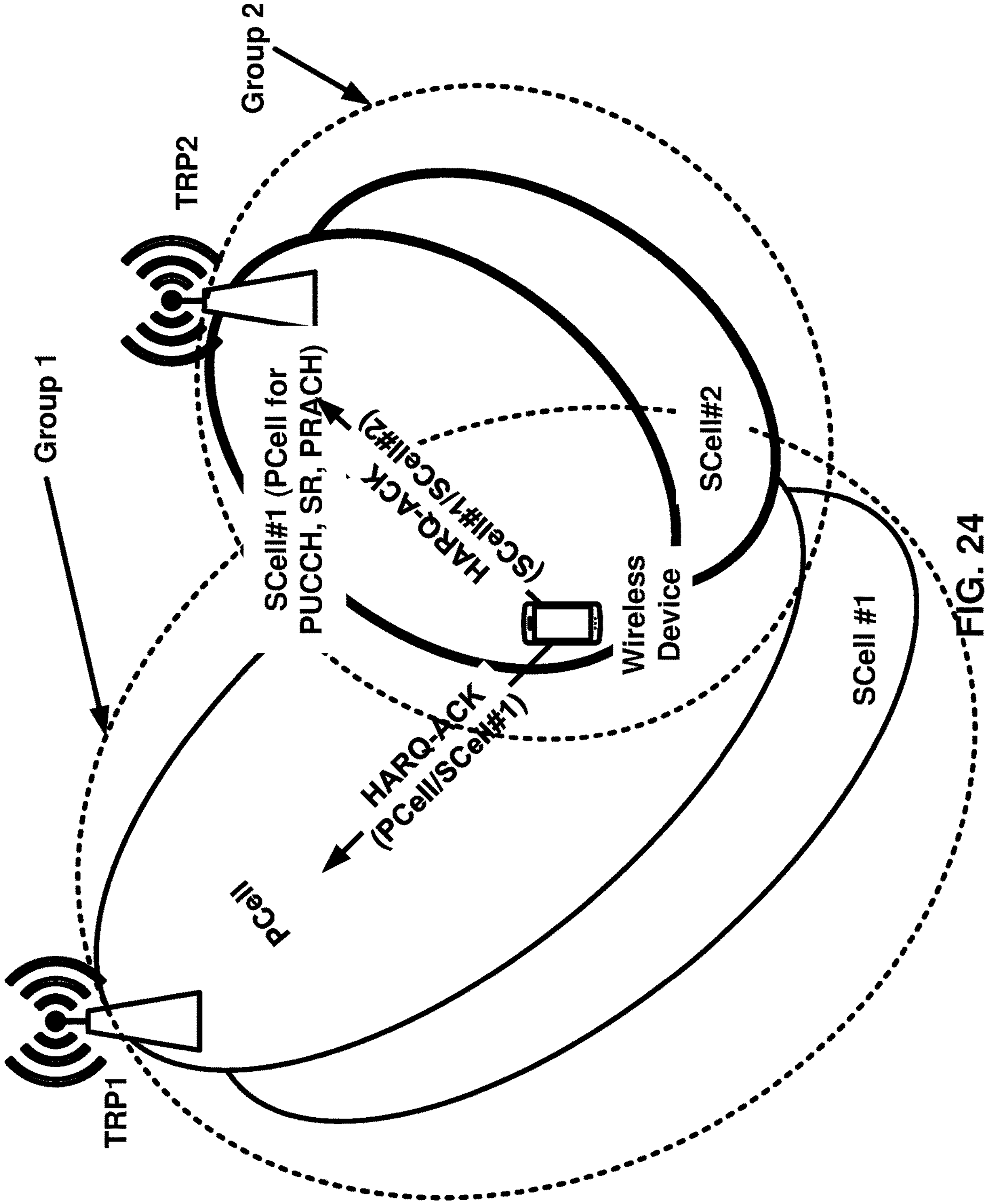
FIG. 24 illustrates an example of a TRP grouping.

In an example, a TRP group may be formed only for transmitting HARQ-ACK feedbacks and/or PUCCH transmissions. The wireless device may transmit SR and/or PRACH via PCell regardless of a TRP group. For example, a TRP group may be formed only for transmitting PUCCH transmissions. The wireless device may transmit PRACH via PCell regardless of a TRP group. The wireless device may transmit HARQ-ACK feedback, CSI-feedback, and/or SR via PUCCH differently based on a TRP group. In an example, a wireless device may be configured with a first PUCCH resource set in a first cell of the first TRP group. The wireless device may be configured with a second PUCCH resource set in a second cell of the second TRP group. For example, FIG. 24 illustrates a scenario of TRP groups. Similar to FIG. 23, a wireless device is configured with a multi-TRP. A first TRP is associated with PCell and SCell #1. A second TRP is associated with SCell #1 and SCell #2. When the first TRP and the second TRP may communicate via non-ideal backhaul, a base station may configure a first TRP group (e.g., Group 1) and a second TRP group (e.g., Group 2). The first TRP group comprises PCell and SCell #1 for a first TRP. The second TRP group comprises SCell #1 and SCell #2 for a second TRP. The wireless device may transmit HARQ-ACK feedbacks of the cells belonging to the first TRP group via a first default cell (e.g., a lowest indexed cell from cells in the first TRP group, PCell, or SPCell). The wireless device may transmit HARQ-ACK feedbacks of the cells belonging to the second TRP group via a second default cell (e.g., a lowest indexed cell from cells in the second TRP group, PCell, or SPCell). For the first TRP, for example, the first default cell is PCell as the TRP group includes PCell. For the second TRP, the second default cell may be SCell #1 that is selected based on a cell index. In an example, the base station may indicate a cell index used for the second default cell for the second TRP group. The wireless device may assume that PCell or SPCell is used for the first default cell for the first TRP group.

In an example, when a wireless device is configured with a plurality of TRP groups, the wireless device may not be associated with a multi-TRP on a PCell or a SPCell. In a scenario shown in FIG. 24, a base station may configure a second TRP group when the base station may configure/activate a second TRP in a first SCell (e.g., SCell #1 is associated with TRP2). A wireless device may assume that one or more cells may form a first TRP group without explicit signaling. The wireless device may not assume a second TRP without explicit signaling. The base station may transmit one or more RRC messages configuring a second TRP group. The one or more RRC messages may comprise a cell index (e.g., a cell index where PUCCH resources are configured/used) and a set of PUCCH resources. In an example of FIG. 24, the base station may configure SCell #1 and one or more PUCCH resources for the second TRP group. The base station may also configure one more RACH resources for the second TRP group. The base station may also configure one or more SR resources for the second TRP group. The wireless device may transmit HARQ-ACK feedbacks of cells in the second TRP via the indicated cell (e.g., SCell #1). The wireless device may transmit CSI feedbacks via the indicated PUCCH resources of the second TRP based on one or more CSI resource configurations and/or feedback configurations. For example, if a CSI-RS resource is configured with a group index or the CSI-RS resource is configured with a TRP index, the wireless device may select the first TRP group or the second TRP based on the group index or the TRP index associated with the CSI-RS resource. Based on the determination, the wireless device may use PCell or the indicated cell of the second TRP group to transmit CSI reports.

In an example, a TRP group may have a similar set of functionalities to a PUCCH SCell group. A base station may configure a PUCCH SCell to configure a second TRP group. The base station may not configure a PUCCH SCell group and a plurality of TRP groups at a same time to a wireless device. A wireless device may receive one or more RRC messages configuring a PUCCH SCell. When the wireless device may also receive a configuration and/or an activation of a second TRP, the wireless device may assume that the configured PUCCH SCell may form a second TRP group. The wireless device may assume that one or more first cells associated with a first TRP may form a first TRP group. The wireless device may assume that one or more second cells associated with the second TRP may form the second TRP group.

In an example, a TRP group may have a similar set of functionalities to a PUCCH SCell group. A base station may configure a PUCCH SCell with a TRP index (e.g., an index to a second TRP or a second group) to configure a second TRP group. When there is no indicated TRP index, a wireless device may assume that the PUCCH SCell applies to a first TRP as well as the second TRP. If the PUCCH SCell is formed with the TRP index, the wireless device may consider the configured PUCCH SCell may lead a second TRP group.

In an example, a TRP group may be configured utilizing a PUCCH SCell configuration for a first cell. FIG. 25 illustrates an example. For example, a base station may indicate a servingcellindex for PUCCH cell in a PDSCH-ServingCellConfig. In response to receiving an index for the pucch-Cell, a wireless device may use the indicated pucch-Cell in transmitting HARQ-ACK codebooks and/or CSI feedbacks via PUCCH. The base station may configure another pucch-Cell2 in the PDSCH-ServingCellConfig. In response to receiving an index for the pucch-Cell2, the wireless device may transmit HARQ-ACK codebooks and/or CSI feedbacks associated with the first cell and associated with the second TRP via the indicated pucch-Cell2. For each TRP of a cell, a pucch-Cell index may be configured independently. Based on the pucch-Cell and pucch-Cell1 configurations of one or more serving cells, the wireless device may determine a first PUCCH-group (a group including PCell or SPCell) and a second PUCCH-group (a group including a SCell for a PUCCH transmission). For each group, the wireless device may determine a set of pairs {serving cell index, TRP index/TRP group index} where each pair belongs to the each group. For example, to enable a scenario of FIG. 18, FIG. 22 and/or FIG. 23, a wireless device may be configured for PCell PDSCH-ServingCell-Config with pucch-Cell and pucch-Cell2 same as PCell (or configurations are absent). The wireless device may be configured for SCell #1 PDSCH-ServingCellConfig with pucch-Cell as PCell (or absent) and pucch-Cell2 as SCell #1. A PUCCH for a second TRP, based on the configuration, may be transmitted via SCell #1 for SCell #1. The wireless device may be configured for SCell #1 PDSCH-Serving-CellConfig with pucch-Cell as PCell (or absent) and pucch-Cell2 as SCell #1. A PUCCH for a second TRP of SCell #1, based on the configuration, may be transmitted via SCell #1 for SCell #1. A PUCCH for the first TRP of SCell #1, based on the configuration, may be transmitted via PCell for SCell #1. The wireless device may be configured for SCell #2 PDSCH-ServingCellConfig with no pucch-Cell (as TRP1 is absent) and pucch-Cell2 as SCell #1. A PUCCH for a second TRP of SCell #2, based on the configuration, may be transmitted via SCell #1 for SCell #2. Other embodiments to configure radio resource control (RRC) parameters are not excluded. A mechanism may allow that a wireless device may be configured with a first PUCCH-group and a second PUCCH-group, where a first TRP of a cell may belong to the first PUCCH-group whereas a second TRP of the cell may belong to the second PUCCH-group.

In an example, a TRP group may be configured separately from a PUCCH SCell configuration. A wireless device may not expect to be configured with a plurality of TRP groups when the wireless device is configured with a PUCCH SCell and/or the wireless device is configured with a dual connectivity. In the example, a TRP group may be used for a multi-TRP operation. A first TRP group may correspond to a first TRP. A second TRP group may correspond to a second TRP. For example, a wireless device may perform a beam management (such as beam failure recovery and/or beam failure request) for the first TRP only or may perform a joint beam management between the first TRP and the second TRP. The wireless device may not perform independent beam management for each TRP group. The wireless device may be configured with a first set of SR (scheduling request) resources for the first TRP group. The wireless device may be configured with a second set of SR resources for the second TRP group. The wireless device may be configured with a first set of logical channel mapping (LCH) for the first set of SR resources. The wireless device may be configured with a second set of logical channel mapping for the second set of SR resources. The wireless device may perform multiplexing of data and/or triggering an SR based on the first set of LCH and the second set of LCH mappings. The wireless device may transmit a first BSR corresponding to the first set of LCH via the first TRP group. The wireless device may transmit a second BSR corresponding to the second set of LCH via the second TRP group.

In an example, a wireless device may be configured with a first set of HARQ-ACK resources for the first TRP group. The wireless device may be configured with a second set of HARQ-ACK resources for the second TRP group. Each set of HARQ-Ack resources may be configured with a cell index and a set of PUCCH resources where the cell index may indicate an index of a PCell, a SCell or a SPCell. In an example, a wireless device may be configured with a TRP group index for each CSI-RS configuration. In response to a first TRP group being configured as a TRP group index for a CSI-RS configuration, the wireless device may perform CSI measurement and transmit CSI feedbacks via the first TRP group. In an example, a base station may configure a TRP group index for a CSI-RS report configuration. A wireless device may transmit a CSI feedback based on the CSI-RS report configuration either via the first TRP group or the second TRP group based on the TRP group index in the CSI-RS report configuration.

In an example, unless otherwise indicated/configured, a wireless device may perform CSI measurement, beam measurement, radio resource monitoring measurement, radio link monitoring measurement, maintaining one or more timers, transmission of PHRs, and/or the like, via the first TRP group or a first TRP. The first TRP may be a TRP associated with PCell in a MCG or SPCell in a SCG. When PCell in the MCG or SPCell in the SCG is associated with a TRP-x and a TRP-y, the wireless device may determine a first activated (e.g., initial accessed TRP) as the first TRP. The TRP that the wireless device has accessed during an initial access may be assumed as a primary TRP PCell or SPCell. A wireless device may be configured with a first set of CORESETs associated with a first TRP group. The wireless device may be configured with a second set of CORESETs associated with a second TRP group.

In an example, a wireless device may be configured with a single DRX configuration for a cell regardless of whether the cell is associated with a multi-TRP or a single TRP. For example, a wireless device may deactivate a second TRP group when the wireless device may go to a sleep due to a DRX configuration. For example, a base station may transmit one or more RRC messages. The one or more RRC messages may configure a bandwidth part (BWP) and one or more CORESETs of the BWP. When the wireless device may have one or more CORESETs associated with a first TRP group only in a first BWP, the wireless device may deactivate the second TRP group when the wireless device switches to the first BWP. For example, a default BWP or a BWP that a wireless device may switch during a DRX off duration may be associated with the first TRP group or a first TRP or a first CORESET group only to reduce a power saving. When the wireless device may have one or more CORESETs associated with either the first TRP group or a second TRP group in a second BWP, the wireless device may activate the first TRP group (if deactivated) and/or the second TRP group (if deactivated) when the wireless device switches to the second BWP. A wireless device may be configured with a DRX configuration with a first BWP index and a second BWP index for a cell (e.g., a BWP for each cell applied for the DRX configuration). The wireless device may activate a first TRP and/or a second RP based on the first BWP index. When the first BWP is associated with the first TRP and the second TRP, the wireless device may activate both TRPs. The wireless device may deactivate a first TRP and/or a second RP based on the second BWP index. When the second BWP is associated with the first TRP only, the wireless device may deactivate the second TRP. When the first BWP and/or the second BWP index configuration is not available in a DRX configuration, a wireless device may assume a default BWP or an initial BWP as the first BWP and the second BWP. In an example, a wireless device may deactivate the second TRP or the second TRP group in DRX off duration. The wireless device may activate the second TRP or the second TRP group in DRX active time.

Figure 26:
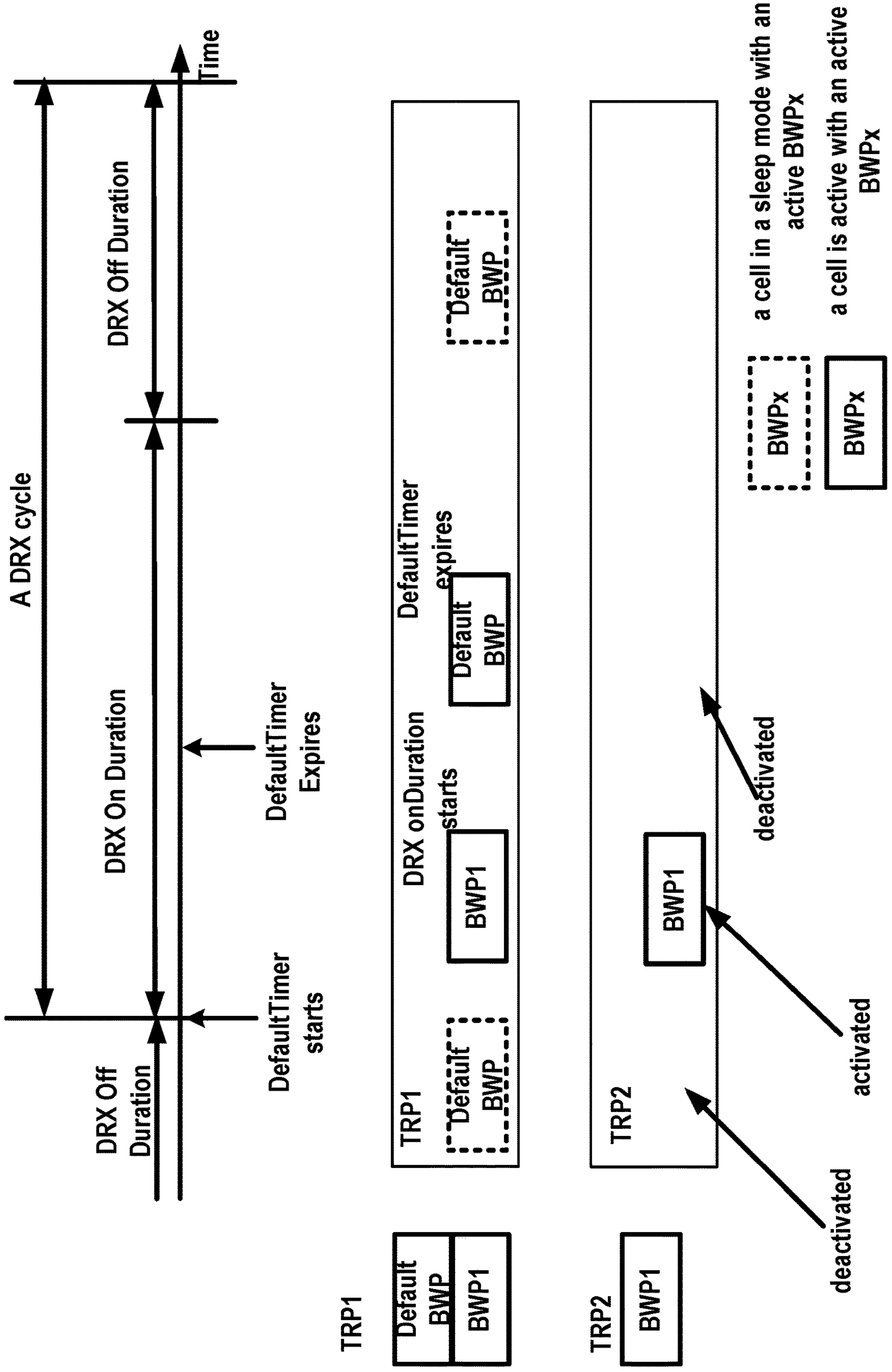
FIG. 26 illustrates an example signal flow diagram for a DRX operation.

FIG. 26 illustrates an example. In an example, a wireless device may be configured a PCell. The wireless device is configured with a BWP1 and a default BWP. The BWP1 is associated with a first TRP and a second TRP. The default BWP is associated with the first TRP only. When the wireless device is in DRX off duration, the wireless device may switch or keep the default BWP as a current active BWP as a bwp-inactivitytimer may have expired during the DRX off duration or before DRX off duration. As the default BWP is associated only with the first TRP, the wireless device may deactivate the second TRP when the wireless device switches to the default BWP. During DRX on duration, the wireless device may be configured with switching to the BWP1 based on RRC signaling or based on a DCI. The wireless device may switch to the BWP in response to starting of DRX on duration or in response to receiving the command to switch to the BWP1. As the BWP1 is associated with the first TRP as well as the second TRP, the wireless device may activate the second TRP which may be in inactive state. Based on an association between a BWP and a TRP, the wireless device may activate or deactivate the TRP in response to switching of BWP. In a BWP configuration, a wireless device may be configured with the association to a TRP. If the BWP is associated with a single TRP, the wireless device may activate on the single TRP in response to the BWP becomes a current active BWP. In a BWP configuration, a wireless device may be configured with the association to both TRPs. If the BWP is associated with both TRPs, the wireless device may activate on both TRPs in response to the BWP becomes a current active BWP.

In an example, a wireless device may deactivate a second TRP, and may not perform CSI measurement, HARQ-ACK feedbacks via the second TRP. In an example, when a wireless device may operate in a first downlink active BWP in a cell. The wireless device may operate in a second uplink active BWP in cell. When the first downlink active BWP is associated with a first TRP only or activated with the first TRP, the wireless device may deactivate a second TRP for the second uplink active BWP. When the second uplink BWP is associated with the first TRP only or activated with the first TRP only, the wireless device may deactivate the second TRP for the first downlink active BWP.

In an example, a wireless device may receive an activation command of a TRP group of a cell via a command to monitor one or more CORESETs among configured CORESETs of the cell. When the indicated one or more CORESETs are associated with a first TRP and a second TRP (or a first TRP group and a second TRP group), the wireless device may activate both TRPs. When the indicated one or more CORESETs are associated with the first TRP only (or the first TRP group only), the wireless device may activate only the first TRP (if not activated).

In an example, a cross-carrier scheduling configuration may be configured for a TRP group. For a cell with a first TRP and a second TRP (or a first TRP group and a second TRP group), whether a cross-carrier scheduling is used or a self-carrier scheduling is used may be configured for each TRP group or each TRP.

In an example, a wireless device may be configured with PRACH resources from a first TRP in a PCell. The wireless device may receive a PDCCH order from a second TRP (e.g., via a CORESET associated with the second TRP). The wireless device may expect to be configured with a second set of PRACH resources for the second TRP in the PCell to support such a case. Otherwise, the wireless device may ignore the PDCCH order.

In an example, a wireless device may be configured with a first DRX configuration for a first TRP group. The wireless device may be configured with a second DRX configuration for a second TRP group. For example, when a TRP group may operate as if a PUCCH SCell or a cell group, the wireless device may be configured with a separate DRX configuration for each TRP group.

In an example, a wireless device may receive a SCell activation and/or deactivation message. When the wireless device may receive an activation command for a SCell, the wireless device may activate one or more TRPs (or one or more TRP groups) associated with the SCell. For example, the wireless device is configured with a first TRP and a second TRP with the SCell, the wireless device may activate the first TRP and the second TRP. In an example, the wireless device may activate only the first TRP in response to receiving the activation indication. In receiving a deactivation command/indication, the wireless device may deactivate one or more TRPs (or one or more TRP groups) associated with an indicated cell. Additionally, an activation of a TRP may be performed by indicating one or more CORESETs associated with each TRP.

In an example, a wireless device may be configured with a cross-carrier scheduling on a first SCell. The wireless device may not be configured with one or more CORESETs on the first SCell. A base station may configure a first TRP group and/or a second TRP group in a PDSCH configuration. In an example, a wireless device may determine whether the first SCell is associated with a first TRP only, a second TRP only or both first and second TRP based on a scheduling cell based on the cross-carrier scheduling configuration. For example, when the scheduling cell is associated with the first TRP only, the wireless device may assume that the first SCell is associated with the first TRP only as well. For example, when the scheduling cell is associated with both TRPs, the wireless device may assume that the first SCell is associated with both TRPs. The TRP group status of the first SCell may be determined based on the TRP group status of the scheduling cell.

In an example, a wireless device may generate a first HARQ-ACK codebook corresponding to one or more first PDSCHs on one or more first cells on a first TRP. The wireless device may generate a second HARQ-aCK codebook corresponding to one or more second PDSCHs on one or more second cells on a second TRP. For example, the wireless device is configured with a PCell and a SCell. In a time t, the wireless device may be scheduled with a PUCCH carrying the first HRQ-ACK codebook. At the time t, the wireless device may be scheduled with a PUSCH from a first CORESET associated with the second TRP. The wireless device may perform UCI piggybacking when the PUCCH and the PUSCH may overlap in a same time resource.

In an example, a wireless device may multiplex UCI (e.g., HARQ-ACK feedback, CSI feedback) on a PUSCH when a first TRP group of the UCI and a second TRP group of the PUSCH is the same. For example, a TRP group of a PUSCH may be determined based on a TRP group of a CORESET which schedules an UL grant to schedule the PUSCH. For example, a TRP group of a PUSCH may be determined based on a TRP group of an SRS resource which is associated with the PUSCH (e.g., UL grant indicates an SRI indicating the SRS resource, configured grant is associated with an SRI indicating the SRS resource). For example, a TRP group of a PUSCH may be determined based on a TRP group of a configured gran configuration which is used for the PUSCH transmission. For example, a TRP group of a PUSCH may be determined based on an explicit configuration of a TRP group in a PUSCH configuration or associated SRS resource configuration or associated configured grant configuration or based on RNTI scheduling the PUSCH.

In an example, a wireless device may not multiplex/piggyback a first TRP UCI into a second TRP PUSCH when the first TRP and the second TRP is not a same. When the wireless device may not be able to transmit a PUCCH corresponding to the UCI and the PUSCH simultaneously, the wireless device may determine either the PUCCH or the PUSCH based on one or more rules. The wireless device may transmit the selected channel. For example, the wireless device may determine to transmit PUCCH regardless of UCI contents. For example, the wireless device may select a channel for the first TRP. For example, the wireless device may determine to transit PUCCH when UCI contains HARQ-ACK and/or SR feedbacks. For example, the wireless device may determine the PUCCH or the PUSCH based on a priority rule applied in a dual connectivity between two cell groups in a power limited case.

In an example, a wireless device may support a capability of transmission of a PUCCH and one or more PUSCHs simultaneously at least when the PUCCH is associated with a first TRP and the one or more PUSCHs are associated with a second TRP. The first TRP and the second TRP are different. The wireless device may provide the capability when the wireless device supports a multi-TRP operation. The wireless device may transmit the PUCCH and the one or more PUSCHs simultaneously without applying a dropping rule.

In determining a PUSCH among one or more PUSCHs for a UCI multiplexing/piggybacking, a wireless device may consider one or more PUSCHs associated with a same TRP to a TRP of the UCI. In an example, a wireless device may consider a PUSCH is associated with a first TRP unless it is configured otherwise. In an example, a wireless device may consider a UCI is associated with a first TRP unless it is configured otherwise.

In an example, a wireless device may be configured with a first cell group which is associated with a first TRP. The wireless device may be configured with a second cell group which is associated with a second TRP. A cell index may be separately configured for the first cell group and the second cell group. A PCell of the first cell group and a SPCell of the second cell group may operate in a same frequency range or a same component carrier or a same frequency. A physical cell ID of the PCell and a physical cell ID of the SPCell may be a same. In particular, when the cell ID is same between the PCell and SPCell, the wireless device may assume that a first initial BWP of the PCell and a second initial BWP of the SPCell are not partially or fully overlapped in frequency domain. The wireless device may assume that a dual connectivity configuration is invalid if the first initial BWP and the second initial BWP may overlap partially or fully in frequency domain.

Figure 27:
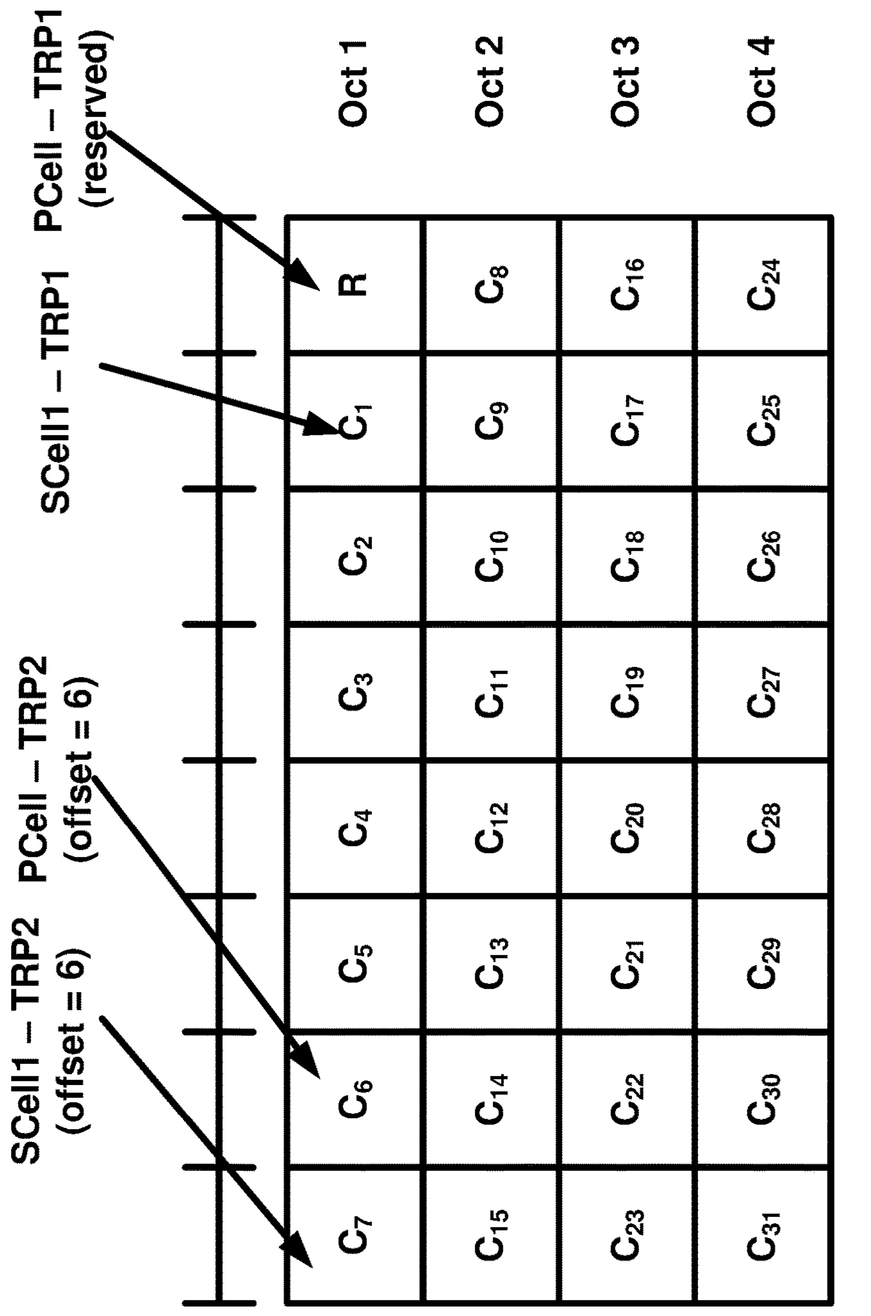
FIG. 27 illustrates an example MAC CE format of an embodiment.

In an example, a base station may activate or deactivate a second TRP of a cell via SCell activation/deactivation procedure. For example, the base station may indicate an cell index offset in one or more parameters to configure the second TRP of the cell. For example, in a serving cell configuration, a cell-index-offset may be configured. A wireless device may determine a cell index of the second TRP of the cell as a sum of a cell index of the cell and the cell-index-offset. FIG. 27 illustrates an example of cell index mechanism. For example, when the base station assigns ‘cell-index-offset’ (offset)=6 in PCell and SCell1 associated with the second TRP (TRP2), the wireless device maps PCell with TRP 1 as cell index 0, PCell with TRP 2 as cell index 6, SCell1 with TRP1 as cell index 1, and SCell with TRP2 as cell index 7.

The base station may not configure a SCell with index 6 or 7 in this case to avoid collisions. In a MAC CE for SCell activation/deactivation, the index C6 and C7 are mapped to PCell with TRP 2 and SCell1 with TRP2 respectively. In response to receiving the MAC CE indicating activation in C6 and/or C7, the wireless device may activate PCell TRP2 and/or SCell1 TRP2. With using some of cell indices for one or more cells associated with a second TRP, a wireless device may expect that a number of cells configured to the wireless device would be reduced compared to a single TRP operation. A multi-TRP operation in a cell may be counted as two cells in terms of supporting a number of cells from a UE perspective.

In an example, a wireless device may be configured with a first cell (e.g., PCell) with a first TRP and a second TRP where a cell index for the first TRP is i and a cell index for the second TRP is i+o. Unless configured otherwise, the wireless device may use a same set of PUCCH resources in the cell for both TRPs on the cell index i and cell index i+o. A separate PUCCH resource configuration may be possible for the first TRP and the second TRP.

In an example, a base station may configure a first serving cell configuration for a cell with a first TRP. The base station may configure a second serving cell configuration for the cell with a second TRP. In the second serving cell configuration, a reference to the first serving cell configuration (e.g., a reference-servingcell-index) may be provided. In response to receiving a reference serving cell index in a serving cell configuration, the wireless device may inherit one or more parameters of the reference serving cell configurations. For example, a PUCCH configuration, a PDSCH configuration, a PUSCH configuration, a set of TCI states, and/or the like may be inherited without duplicating the configurations. In response to receive a separate configuration in the serving cell configurations, the separate configuration of the serving cell configurations may override the configurations from the reference serving cell. For example, if the second serving cell configuration may include a PUCCH configuration, the PUCCH configuration may override inherited PUCCH configuration from the reference serving cell. For example, the second serving cell configuration may configure pucch-Cell as SCell whereas the first serving cell configuration may indicate pucch-Cell as PCell. In this case, the wireless device applies SCell as a PUCCH cell for the second serving cell (e.g., the cell with the second TRP).

In an example, based on a different cell index between a cell associated with a first TRP and the cell associated with a second TRP, cell grouping may be performed. A first cell group may comprise one or more cells associated with the first TRP. A second cell group may comprise one or more cells associated with the second TRP. When the first group comprises PCell, PCell is used for a PUCCH transmission. When the first group comprises SPCell, SPCell is used for a PUCCH transmission. Similar behavior may be also applied to the second group. When the first group does not comprise PCell or SPCell, a base station may configure a special cell or a PUCCH cell used in the first group. Similar configuration may be also applied to the second group. For example, the special cell may be a PUCCH SCell.

Figure 28:
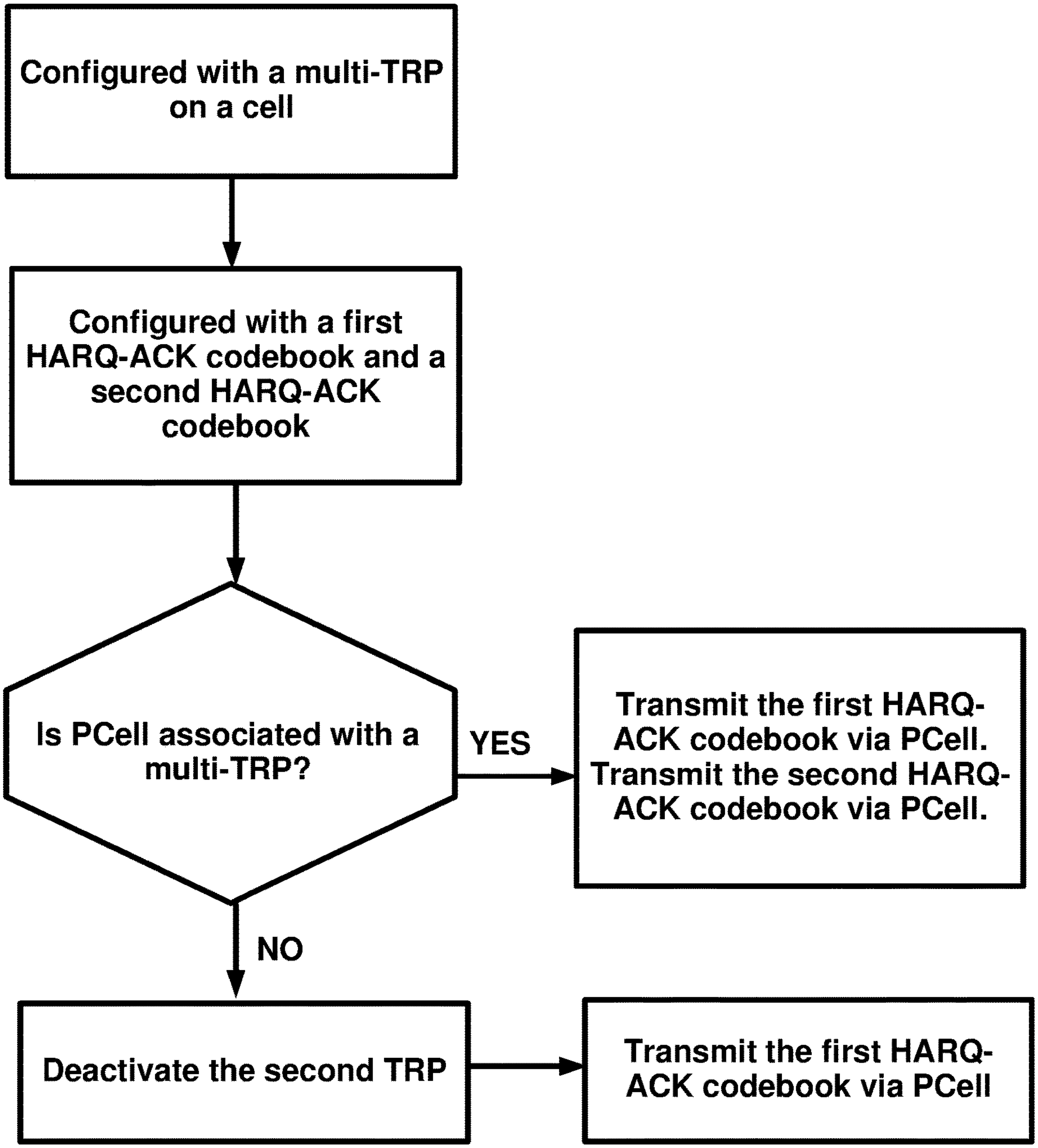
FIG. 28 illustrates an example signal flow diagram of an embodiment.

FIG. 28 illustrates a flow diagram of an embodiment. For example, a wireless device may expect a multi-TRP associated with a PCell (in MCG) or a SPCell (in SCG) or in a PUCCH SCell, when there is a cell associated with a multi-TRP in a cell group. The wireless device may deactivate a second TRP for cells in the cell group when the PCell or the SPCell or the PUCCH SCell may not be associated with the second TRP.

Figure 29:
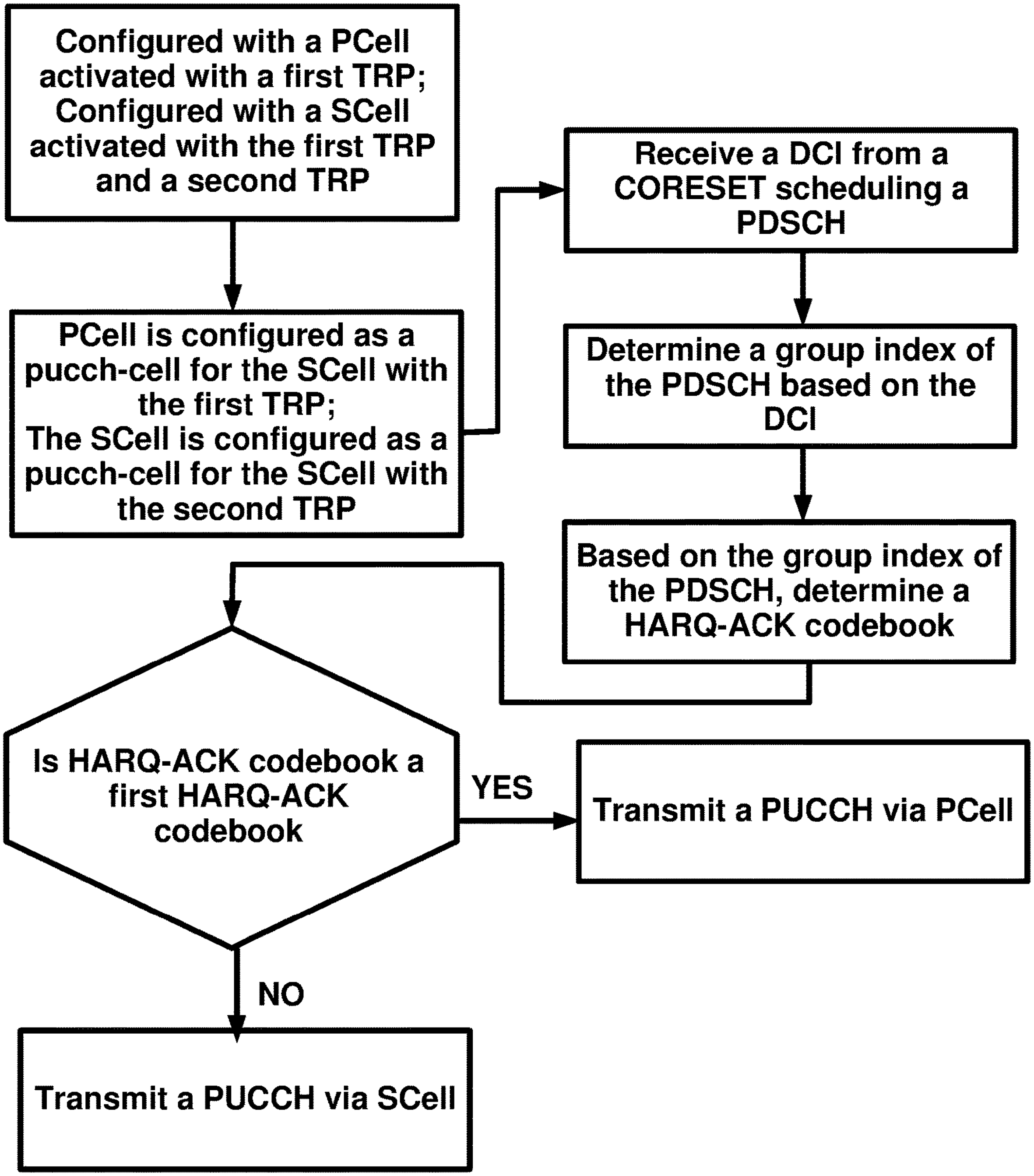
FIG. 29 illustrates an example signal flow diagram of an embodiment.

FIG. 29 illustrates a flow diagram of an embodiment. For example, a wireless device may determine a PUCCH cell of each TRP in a cell based on RRC configuration. A first PUCCH group may be used for transmitting PUCCH related to a first TRP. A second PUCCH group may be used for transmitting PUCCH related to a second TRP. For example, the wireless device may be configured with a first PUCCH group comprising PCell for a first TRP. The wireless device may be configured with a second PUCCH group comprising SCell for a second TRP. The wireless device may transmit a first HARQ-ACK codebook via the first PUCCH group (e.g., PCell). The wireless device may transmit a second HARQ-ACK codebook via the second PUCCH group (e.g., a PUCCH SCell or a SCell). In a serving cell configuration of SCell, the wireless device may receive a first pucch-Cell for PCell for SCell. In the serving cell configuration of SCell, the wireless device may receive a second pucch_Cell for SCell for SCell. The first pucch-Cell may define a cell index where the first HARQ-ACK codebook is transmitted corresponding to one or more PDSCHs scheduled on the SCell on the first TRP or one or more PDSCHs belonging to a first group. The second pucch-Cell may define a cell index where the second HARQ-ACK codebook is transmitted corresponding to one or more PDSCHs scheduled on the SCell on the second TRP or one or more PDSCHs belonging to a second group. For example, a PDSCH scheduled by a DCI from a CORESET where the COREST belongs to a first CORESET group may belong to the first group. For example, a PDSCH scheduled by a DCI from a CORESET where the COREST belongs to a second CORESET group may belong to the second group. For example, a TCI state indicated in a scheduling DCI of a PDSCH may determine the first group or the second group. When the TCI state belongs to a first TCI state group, the corresponding PDSCH may belong to the first group. One or more HARQ-ACK bits (e.g., the first HARQ-ACK codebook) of PDSCHs of the first group may be transmitted via the first PUCCH group. One or more HARQ-ACK bits (e.g., the second HARQ-ACK codebook) of PDSCHs of the second group may be transmitted via the second PUCCH group. In the first PUCCH group, the wireless device may transmit HARQ-ACKs for PCell and SCell associated with the first TRP via PCell. In the second PUCCH group, the wireless device may transmit HARQ-ACKs for SCell associated with the second TRP via SCell. In an example, the wireless device may receive a DCI from a CORESET that schedules a PDSCH. The wireless device may determine a TRP or a group index of the CORESET scheduling the PDSCH. The wireless device may receive the PDSCH. The wireless device may determine a TRP or a group of a HARQ-ACK codebook based on the TRP or the group index of the CORESET scheduling the DCI/PDSCH. For example, if the CORESET belongs to the first TRP (or a first group), a first HARQ-ACK codebook group is determined. For example, if the CORESET belongs to the second TRP (or a second group), a second HARQ-ACK codebook group is determined. If the HARQ-ACK codebook group is associated with the first TRP or belongs to the first group, the wireless device may transmit a PUCCH via PCell (e.g., the first PUCCH group). Otherwise, the wireless device may transmit a PUCCH via SCell (e.g., the second PUCCH group).

In an example, a wireless device may receive one or more radio resource control (RRC) messages for a cell. The RRC messages may comprise one or more parameters indicating a first pucch-Cell for cell. The one or more parameters may further indicate a second pucch-Cell for the cell. The wireless device may determine a first HARQ-ACK codebook for one or more PDSCHs where the one or more PDSCHs may correspond to a first group. The wireless device may transmit the first HARQ-ACK codebook via a first PUCCH on the first pucch-Cell. The wireless device may determine a second HARQ-ACK codebook for one or more PDSCHs where the one or more PDSCHs may correspond to a second group. The wireless device may transmit the second HARQ-ACK codebook via a second PUCCH on the second pucch-Cell. For example, the wireless device may determine whether a PDSCH belongs to the first group or the second group based on a scheduling DCI schedules the PDSCH. When the scheduling DCI is transmitted via a CORESET belongs to the first group, the wireless device may determine the PDSCH belongs to the first group. For example, when the CORESET belongs to a first CORESET group, the wireless device may determine the PDSCH belongs to the first group. The CORESET belongs to a second CORESET group, the wireless device may determine the PDSCH belongs to the second group The first group may correspond to one or more CORESETs of the first CORESET group of the cell. The second group may correspond to one or more CORESETs of the second CORESET group of the cell. The first group may correspond to one or more cells associated with a first TRP of a base station. The second group may correspond to one or more cells associated with a second TRP of the base station.

The first pucch-Cell may be a PCell or SPCell. The second pucch-Cell may be a PUCCH SCell. The first pucch-Cell and the second pucch-Cell may be different or a same.

The wireless device may determine the first group or the second group based on the scheduling DCI or based on a TCI state associated with the PDSCH or the CORESET.

The wireless device may determine the first HARQ-ACK codebook comprising encoded bits of one or more HARQ-ACK bits of one or more PDSCHs. The one or more HARQ-ACK bits may comprise ACK or NACK of the one or more PDSCHs where the one or more PDSCHs may belong to the first group. The wireless device may determine a group for a PDSCH based on a scheduling DCI schedules the PDSCH. The wireless device may determine a group for a PDSCH based on a cell index where the PDSCH is transmitted on. The wireless device may determine a group for a PDSCH based on a cell index and a TRP where the PDSCH is transmitted from. The wireless device may determine a group for a PDSCH based on a TCI state associated with the PDSCH. The wireless device may determine a group for a PDSCH based on a TCI state associated with a DCI schedules the PDSCH.

In an example, a wireless device may receive one or more radio resource control (RRC) messages. The one or more RRC messages may comprise one or more parameters of a PUCCH SCell configuration. The one or more parameters may comprise a list of cells grouped with the PUCCH SCell at least for a HARQ-ACK feedback transmission or a PUCCH transmission. The one or more parameters may comprise a list of group identification of the list of cells. The wireless device may determine a second HARQ-ACK codebook based on the list of cells and the list of group identifications. For example, the wireless device may be configured with a first cell and a second cell for the PUCCH SCell. The wireless device may be configured with a second group for each the first cell and the second cell in the one or more parameters associated with the PUCCH SCell. The wireless device may determine the second HARQ-ACK codebook corresponding to one or more PDSCHs scheduled on the first cell associated with a second TRP or the second cell associated with the second TRP. For example, the wireless device may determine the second HARQ-ACK codebook corresponding to one or more PDSCHs scheduled by one or more DCIs that are scheduled by one or more CORESETs of the first cell associated with the second TRP or the second cell associated with the second TRP.

The group identification may indicate either a first group or the second group. The first group may correspond to a first TRP. The second group may correspond to the second TRP. The PUCCH SCell may be same as PCell or SPCell for the first group. The PUCCH SCell may be different from PCell or SPCell for the second group.

The wireless device may determine a second PUCCH group based on the PUCCH SCell configuration. The wireless device may determine a set of pairs {cell index, a group index} indicated in the list of cells and the list of group identification of the list of cells as the second PUCH group. The wireless device may determine a first PUCCH group based on the PUCCH SCell configuration. The wireless device may determine a set of pairs {cell index, a group index} which are not indicated in the PUCCH SCell configuration as the first PUCCH group. For example, the first cell with the first TRP and the second cell with the first TRP (when both cells are associated with both TRPs) may belong to the first PUCCH group. The first cell with the second TRP and the second cell with the second TRP may belong to the second PUCCH group. The wireless device may transmit a first HARQ-ACK codebook via PCell or SPCell of the first PUCCH group. The wireless device may transmit the second HARQ-ACK codebook via the PUCCH SCell of the second PUCCH group. The wireless device may determine the first HARQ-ACK codebook or the second HARQ-ACK codebook for a PDSCH based on a scheduling DCI. For example, the scheduling DCI is from a CORESET of a cell of a TRP in the first PUCCH group, the wireless device may select the first HARQ-ACK codebook.

In an example, a wireless device may receive one or more RRC messages for a cell. The one or more RRC messages may comprise one or more parameters. The one or more parameters may indicate a first pucch-cell for the cell. The one or more parameters may indicate a second pucch-cell for the cell. The wireless device may be configured with a PCell/SPCell (in MCG/SCG) or a PUCCH SCell for the first pucch-cell or the second pucch-cell. The wireless device may determine a first PUCCH group for a first TRP of the cell in response to the first pucch-cell being PCell/SPCell. The wireless device may determine a second PUCCH group for the first TRP of the cell otherwise. The wireless device may determine the first PUCCH group for a second TRP of the cell in response to the second pucch-cell being PCell/SPCell. The wireless device may determine the second PUCCH group for the second TRP of the cell otherwise. The wireless device may transmit a HARQ-ACK of a PDSCH of the first PUCCH group via PCell/SPCell. The wireless device may transmit a HARQ-ACK of a PDSCH of the second PUCCH group via the PUCCH SCell. The wireless device may determine a PDSCH belongs to the first PUCCH group based on a scheduling DCI of the PDSCH. For example, a CORESET scheduling the scheduling DCI may be associated with a cell of a TRP belonging to the first PUCCH group, the wireless device determines that the PDSCH belongs to the first PUCCH group.

In an example, a wireless device may receive one or more RRC messages for a cell. The one or more RRC messages may comprise one or more parameters. The one or more parameters may indicate a first pucch-cell for the cell. The one or more parameters may indicate a second pucch-cell for the cell. The wireless device may be configured with a PCell/SPCell (in MCG/SCG) or a PUCCH SCell for the first pucch-cell or the second pucch-cell. The wireless device may determine a first PUCCH group for a first TRP of the cell in response to the first pucch-cell being PCell/SPCell. The wireless device may determine a second PUCCH group for the first TRP of the cell otherwise. The wireless device may determine the first PUCCH group for a second TRP of the cell in response to the second pucch-cell being PCell/SPCell. The wireless device may determine the second PUCCH group for the second TRP of the cell otherwise. The wireless device may determine a first group or a second group of a PDSCH based on a DCI scheduling the PDSCH. When the scheduling DCI is transmitted via a CORESET belongs to the first group, the wireless device may determine the PDSCH belongs to the first group. For example, when the CORESET belongs to a first CORESET group, the wireless device may determine the PDSCH belongs to the first group. The CORESET belongs to a second CORESET group, the wireless device may determine the PDSCH belongs to the second group. The wireless device may transmit a corresponding HARQ-ACK of the PDSCH via the first PUCCH group in response to that the PDSCH belongs to the first group. The wireless device may transmit the corresponding HARQ-ACK of the PDSCH via the second PUCCH group in response to that the PDSCH belongs to the second group.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 30:
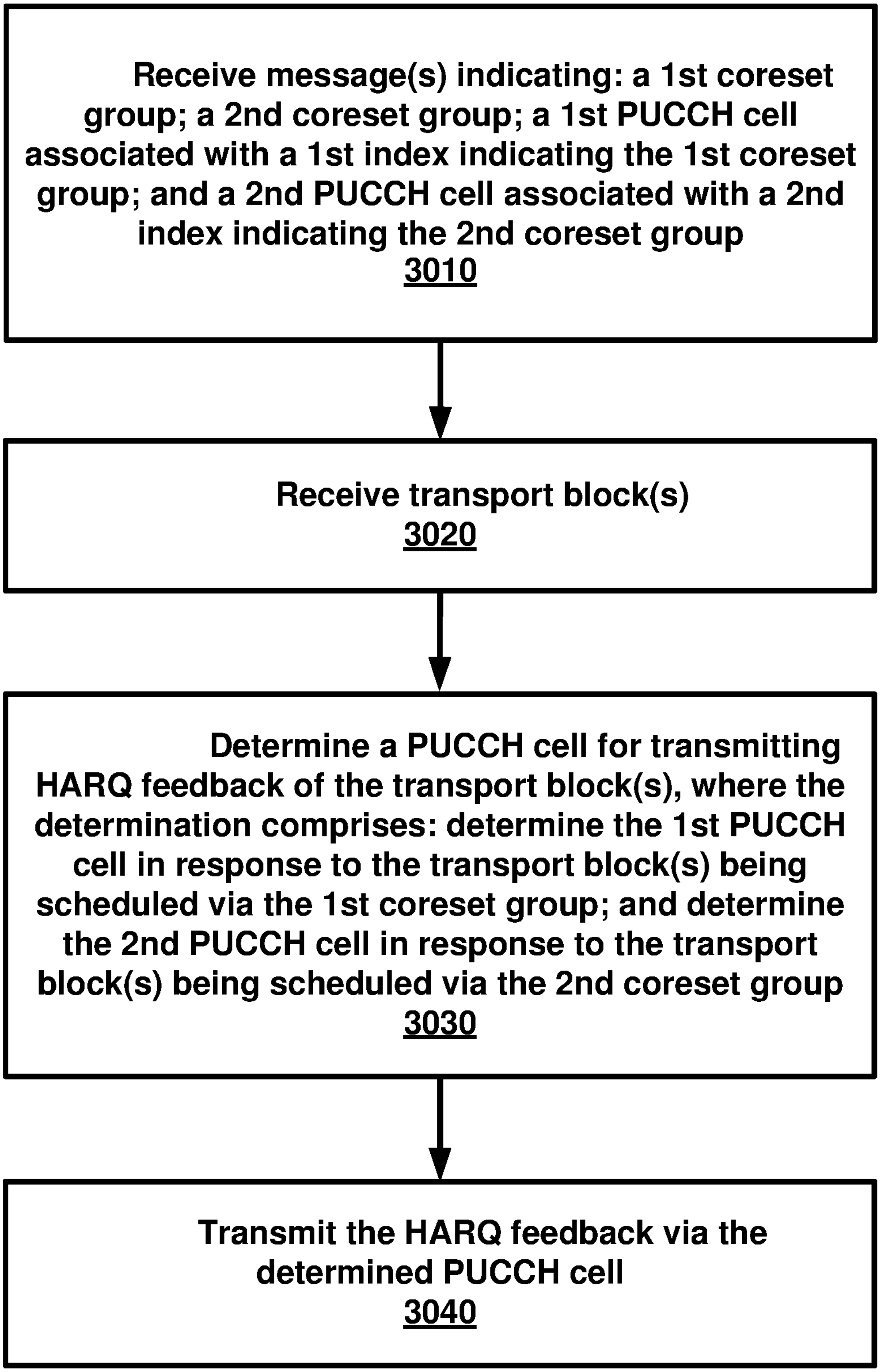
FIG. 30 is a flow diagram illustrating an aspect of an example embodiment of the current disclosure.

FIG. 30 is a flow diagram as per an aspect of an example embodiment of the present disclosure. At 3010, a wireless device may receive one or more radio resource control (RRC) messages. The one or more RRC messages may indicate a first control resource set (coreset) group; a second coreset group; a first physical uplink control channel (PUCCH) cell associated with a first index indicating the first coreset group; and a second PUCCH cell associated with a second index indicating the second coreset group. At 3020, the wireless device may receive one or more transport blocks. At 3030, the wireless device may determine a PUCCH cell for transmitting hybrid automatic repeat request (HARM) feedback of the one or more transport blocks. The wireless device may determine the first PUCCH cell in response to the one or more transport blocks being scheduled via the first coreset group or the wireless device may determine determining the second PUCCH cell in response to the one or more transport blocks being scheduled via the second coreset group. At 3040, the wireless device may transmit the HARQ feedback via the determined PUCCH cell.

According to an example embodiment, the one or more radio resource control (RRC) messages may comprise configuration parameters for a cell. For example, the configuration parameters may indicate the first coreset group of the cell; the second coreset group of the cell; the first PUCCH cell associated with the first index indicating the first coreset group of the cell; and the second PUCCH cell associated with the second index indicating the second coreset group of the cell. According to an example embodiment, the one or more radio resource control (RRC) messages may comprise configuration parameters for a cell. For example, the configuration parameters comprise at least one of the first PUCCH cell associated with the first index indicating the first coreset group; and the second PUCCH cell associated with the second index indicating the second coreset group. For example, the one or more radio resource control (RRC) messages may comprise configuration parameters of the first PUCCH cell associated with the first index indicating the first coreset group; and the second PUCCH cell associated with the second index indicating the second coreset group.

According an example embodiment, the first PUCCH cell may be different from the second PUCCH cell. For example, the one or more RRC messages may comprise configuration parameters. The configuration parameters may indicate an index of PUCCH secondary cell (SCell), a list of cells associated with the PUCCH SCell, and a list of group identification for the list of cells. According to an example embodiment, the wireless device may determine a first PUCCH group and a second PUCCH group based on the index of PUCCH SCell, the list of cells and the list of group identification. For example, the first PUCCH cell may be a primary cell for one or more first transport blocks being scheduled via the first coreset group of a cell, in response to the list of group identification may not comprise the first coreset group index corresponding to the cell. For example, the first PUCCH cell may be the PUCCH SCell for one or more second transport blocks being scheduled via the second coreset group of a cell, in response to the list of group identification may comprise the second coreset group index corresponding to the cell. According to an example embodiment, a transport block of the one or more transport blocks may be scheduled via the first coreset group, in response to receiving a downlink control information (DCI) scheduling the transport block via a coreset of the first coreset group.

According to an example embodiment, the first PUCCH cell may be a primary cell or a secondary cell. For example, the second PUCCH cell may be a primary cell or a secondary cell. For example, the first PUCCH cell may be associated with the first coreset group of index 0. For example, the second index is one. For example, the second PUCCH cell may be associated with the second coreset group of index 1. For example, the first PUCCH cell and the second PUCCH cell may belong to a cell group. For example, the cell group may be a master cell group or a secondary cell group. For example, at least one of the first PUCCH cell and the second PUCCH cell may be a primary cell of the cell group.

According to an example embodiment, a wireless device may receive one or more radio resource control messages comprising one or more parameters. The one or more parameters may indicate a plurality of control resource set (coreset) groups; one or more first cells associated with a first coreset group of the plurality of coreset groups; one or more second cells associated with a second coreset group of the plurality of coreset groups; a first physical uplink control channel (PUCCH)-cell associated with the first coreset group; and a second PUCCH-cell associated with the second coreset group. The wireless device may receive one or more transport blocks. The wireless device may select a PUCCH-cell for transmitting a hybrid automatic repeat request (HARQ) feedbacks of the one or more transport blocks. The wireless device may select the first PUCCH-cell in response to the one or more transport blocks being associated with the first coreset group or may select the second PUCCH-cell in response to the one or more transport blocks being associated with the second coreset group. The wireless device may transmit the HARQ feedbacks via the selected PUCCH-cell.

According to an example embodiment, a wireless device may receive one or more radio resource control messages comprising one or more parameters. The one or more parameters may indicate a first physical uplink control channel (pucch)-cell for the cell; and a second pucch-cell for the cell. The wireless device may determine a first hybrid automatic repeat request (HARQ)-acknowledge (ACK) feedback of one or more first transport blocks corresponding to a first group. The wireless device may transmit the first HARQ-ACK feedback via the first pucch-cell. The wireless device may determine a second HARQ-ACK feedback of one or more second transport blocks corresponding to a second group. The wireless device may transmit the second HARQ-ACK feedback via the second pucch-cell.

According to an example embodiment, a wireless device may receive one or more radio resource control messages comprising one or more parameters of a physical uplink control channel (PUCCH) secondary cell (SCell) configuration. The one or more parameters may comprise a list of cells grouped with the PUCCH SCell for hybrid automatic repeat request (HARQ)-acknowledge (ACK) feedbacks and a list of group identifications of the list of cells. For example, the wireless device may determine a first HARQ-ACK feedback for one or more transport blocks based on the list of cells and the list of group identifications of the list of cells. The wireless device may transmit the first HARQ-ACK feedback via the PUCCH SCell.

What is claimed is:

1. A method comprising:

receiving, by a wireless device, one or more radio resource control (RRC) messages indicating:

a first index indicating a first control resource set (coreset) group comprising one or more first coresets;

a second index indicating a second coreset group comprising one or more second coresets; and one or more parameters of a physical uplink control channel (PUCCH) secondary cell (SCell) configuration, wherein the one or more parameters, of the PUCCH SCell configuration, indicate:

a second PUCCH group of cells including a PUCCH SCell that is for hybrid automatic repeat request (HARQ) feedback transmission; and a group identifier identifying the second PUCCH group;

receiving, and via the one or more first coresets, one or more first downlink control information (DCIs) scheduling one or more first transport blocks, wherein the one or more first transport blocks are scheduled on a secondary cell (SCell) associated with a first transmission and reception point (TRP);

receiving, via the one or more second coresets, one or more second DCIs scheduling one or more second transport blocks, wherein:

the one or more second transport blocks are scheduled on the SCell associated with a second TRP; and the SCell associated with the second TRP is the PUCCH SCell;

determining one or more first cells as a first PUCCH group of cells, based on the one or more first cells not being indicated by the one or more parameters of the PUCCH SCell configuration, wherein the first PUCCH group comprises (i) the SCell associated with the first TRP and (ii) a primary cell (PCell);

determining one or more second cells as the second PUCCH group of cells, based on the one or more second cells being indicated by the one or more parameters of the PUCCH SCell configuration, wherein the second PUCCH group comprises the SCell associated with the second TRP;

determining a first HARQ-ACK codebook based on receiving the first DCI via the one or more first coresets;

determining a second HARQ-ACK codebook based on receiving the second DCI via the one or more second coresets;

transmitting, via the PCell, a first HARQ feedback, of the one or more first transport blocks, corresponding to the first HARQ-ACK codebook; and transmitting, via the PUCCH SCell, a second HARQ feedback, of the one or more second transport blocks, corresponding to the second HARQ-ACK codebook.

2. The method of claim 1, wherein the one or more RRC messages comprise configuration parameters for a plurality of cells, wherein the configuration parameters indicate:

the first index;

the second index;

the PCell being associated with the first index; and the PUCCH SCell being associated with the second index.

3. The method of claim 1, wherein the one or more RRC messages comprise configuration parameters of at least one of:

the PCell associated with the first index; or the PUCCH SCell associated with the second index.

4. The method of claim 1, wherein the one or more RRC messages comprise configuration parameters of:

the PCell associated with the first index; and the PUCCH SCell associated with the second index.

5. The method of claim 4, wherein the PCell is different from the PUCCH SCell.

6. The method of claim 1, wherein the one or more RRC messages comprise configuration parameters indicating an index of the PUCCH SCell, a list of cells associated with the PUCCH SCell, and a list of group identification for the list of cells.

7. The method of claim 6, further comprising determining a first PUCCH group and a second PUCCH group based on the index of PUCCH SCell, the list of cells, and the list of group identification.

8. The method of claim 7, wherein the PCell is a primary cell for one or more transport blocks being scheduled via one or more DCIs received via the one or more first coresets of the first coreset group in response to the list of group identification not comprising the first index.

9. The method of claim 7, wherein the PUCCH SCell is for one or more transport blocks being scheduled via one or more DCIs received via one or more second coresets of the second coreset group in response to the list of group identification comprising the second index.

10. A wireless device comprising:

one or more processors; and memory storing instructions that, when executed by the one or more processors, cause the wireless device to:

receive one or more radio resource control (RRC) messages indicating:

a first index indicating a first control resource set (coreset) group comprising one or more first coresets;

a second index indicating a second coreset group comprising one or more second coresets; and one or more parameters of a physical uplink control channel (PUCCH) secondary cell (SCell) configuration, wherein the one or more parameters, of the PUCCH SCell configuration, indicate:

a second PUCCH group of cells including a PUCCH SCell that is for hybrid automatic repeat request (HARQ) feedback transmission; and a group identifier identifying the second PUCCH group;

receive, via the one or more first coresets, one or more first downlink control information (DCIs) scheduling one or more first transport blocks, wherein the one or more first transport blocks are scheduled on a secondary cell (SCell) associated with a first transmission and reception point (TRP);

receive, via the one or more second coresets, one or more second DCIs scheduling one or more second transport blocks, wherein:

the one or more second transport blocks are scheduled on the SCell associated with a second TRP; and the SCell associated with the second TRP is the PUCCH SCell;

determine one or more first cells as a first PUCCH group of cells, based on the one or more first cells not being indicated by the one or more parameters of the PUCCH SCell configuration, wherein the first PUCCH group comprises (i) the SCell associated with the first TRP and (ii) a primary cell (PCell);

determine one or more second cells as the second PUCCH group of cells, based on the one or more second cells being indicated by the one or more parameters of the PUCCH SCell configuration, wherein the second PUCCH group comprises the SCell associated with the second TRP;

determine a first HARQ-ACK codebook based on receiving the first DCI via the one or more first coresets;

determine a second HARQ-ACK codebook based on receiving the second DCI via the one or more second coresets;

transmit, via the PCell, a first HARQ feedback, of the one or more first transport blocks, corresponding to the first HARQ-ACK codebook; and transmit, via the PUCCH SCell, a second HARQ feedback, of the one or more second transport blocks, corresponding to the second HARQ-ACK codebook.

11. The wireless device of claim 10, wherein the one or more RRC messages comprise configuration parameters for a plurality of cells, wherein the configuration parameters indicate:

the first index;

the second index;

the is PCell being associated with the first index; and the PUCCH SCell being associated with the second index.

12. The wireless device of claim 10, wherein the one or more RRC messages comprise configuration parameters of at least one of:

the PCell associated with the first index; or the PUCCH SCell associated with the second index.

13. The wireless device of claim 10, wherein the one or more RRC messages comprise configuration parameters of:

the PCell associated with the first index; and the PUCCH SCell associated with the second index.

14. The wireless device of claim 13, wherein the PCell is different from the PUCCH-cell SCell.

15. The wireless device of claim 10, wherein the one or more RRC messages comprise configuration parameters indicating an index of the PUCCH SCell, a list of cells associated with the PUCCH SCell, and a list of group identification for the list of cells.

16. The wireless device of claim 15, wherein the instructions, when executed by the one or more processors, further cause the wireless device to determine a first PUCCH group and a second PUCCH group based on the index of PUCCH SCell, the list of cells, and the list of group identification.

17. The wireless device of claim 16, wherein the PCell is a primary cell for one or more first transport blocks being scheduled via one or more DCIs received via the one or more first coresets of the first coreset group in response to the list of group identification not comprising the first index.

18. The wireless device of claim 16, wherein the PUCCH SCell is for one or more transport blocks being scheduled via one or more DCIs received via one or more second coresets of the second coreset group in response to the list of group identification comprising the second index.

19. A non-transitory computer-readable medium comprising instructions that, when executed by one or more processors of a wireless device, cause the wireless device to:

receive one or more radio resource control (RRC) messages indicating:

a first index indicating a first control resource set (coreset) group comprising one or more first coresets;

a second index indicating a second coreset group comprising one or more second coresets; and one or more parameters of a physical uplink control channel (PUCCH) secondary cell (SCell) configuration, wherein the one or more parameters, of the PUCCH SCell configuration, indicate:

a second PUCCH group of cells including a PUCCH SCell that is for hybrid automatic repeat request (HARQ) feedback transmission; and a group identifier identifying the second PUCCH group;

receive, via the one or more first coresets, one or more first downlink control information (DCIs) scheduling one or more first transport blocks, wherein the one or more first transport blocks are scheduled on a secondary cell (SCell) associated with a first transmission and reception point (TRP);

receive, via the one or more second coresets, one or more second DCIs scheduling one or more second transport blocks, wherein:

the one or more second transport blocks are scheduled on the SCell associated with a second TRP; and the SCell associated with the second TRP is the PUCCH SCell;

determine one or more first cells as a first PUCCH group of cells, based on the one or more first cells not being indicated by the one or more parameters of the PUCCH SCell configuration, wherein the first PUCCH group comprises (i) the SCell associated with the first TRP and (ii) a primary cell (PCell);

determine one or more second cells as the second PUCCH group of cells, based on the one or more second cells being indicated by the one or more parameters of the PUCCH SCell configuration, wherein the second PUCCH group comprises the SCell associated with the second TRP;

determine a first HARQ-ACK codebook based on receiving the first DCI via the one or more first coresets;

determine a second HARQ-ACK codebook based on receiving the second DCI via the one or more second coresets;

transmit, via the PCell, a first HARQ feedback, of the one or more first transport blocks, corresponding to the first HARQ-ACK codebook; and transmit, via the PUCCH SCell, a second HARQ feedback, of the one or more second transport blocks, corresponding to the second HARQ-ACK codebook.

20. The non-transitory computer-readable medium of claim 19, wherein the one or more RRC messages comprise configuration parameters of:

the PCell associated with the first index; and the PUCCH SCell associated with the second index.

* * * * *